United States Patent
Freel

(10) Patent No.: US 11,427,765 B2
(45) Date of Patent: Aug. 30, 2022

(54) SYSTEMS AND METHODS FOR PREPARING AND CO-PROCESSING BIOCRUDE OIL

(71) Applicant: Ensyn Renewables, Inc., Wilmington, DE (US)

(72) Inventor: Barry A. Freel, Ottawa (CA)

(73) Assignee: Ensyn Renewables, Inc., Wilmington, DE (US)

( * ) Notice: Subject to any disclaimer, the term of this patent is extended or adjusted under 35 U.S.C. 154(b) by 731 days.

(21) Appl. No.: 16/319,123

(22) PCT Filed: Jul. 19, 2017

(86) PCT No.: PCT/US2017/042782
§ 371 (c)(1),
(2) Date: Jan. 18, 2019

(87) PCT Pub. No.: WO2018/017664
PCT Pub. Date: Jan. 25, 2018

(65) Prior Publication Data
US 2021/0348065 A1   Nov. 11, 2021

Related U.S. Application Data

(60) Provisional application No. 62/364,682, filed on Jul. 20, 2016.

(51) Int. Cl.
*C10G 11/18* (2006.01)
*C10G 3/00* (2006.01)

(52) U.S. Cl.
CPC .............. *C10G 11/18* (2013.01); *C10G 3/42* (2013.01); *C10G 2300/1014* (2013.01); *C10G 2300/1074* (2013.01); *C10G 2300/80* (2013.01); *C10G 2400/02* (2013.01); *C10G 2400/04* (2013.01); *C10G 2400/06* (2013.01)

(58) Field of Classification Search
CPC .. C10G 11/18; C10G 3/42; C10G 2300/1014; C10G 2300/1074; C10G 2300/80; C10G 2400/02; C10G 2400/04; C10G 2400/06
See application file for complete search history.

(56) References Cited

U.S. PATENT DOCUMENTS

| | | |
|---|---|---|
| 2010/0083563 A1 | 4/2010 | Miller |
| 2012/0137571 A1* | 6/2012 | Brady .................. C10G 3/00 44/307 |
| 2012/0137572 A1 | 6/2012 | Bartek et al. |
| 2012/0204481 A1 | 8/2012 | Corredores et al. |
| 2016/0040080 A1* | 2/2016 | Freel .................. B01J 8/1827 585/240 |

OTHER PUBLICATIONS

Affan Ahmed, Rheological Changes in Crude Oil Diluted With Alcohols, Dalhousie University; Halifax, Nova Scotia; Feb. 2013 (Year: 2013).*
International Search Report dated Oct. 19, 2017 for PCT/US2017/042782.
Written Opinion dated Oct. 19, 2017 for PCT/US2017/042782.
Notice of Opposition to EP2852657 filed Oct. 21, 2019.
Addendum filed Oct. 23, 2019 to Notice of Opposition to EP2852657.
Marlon Brando Bezerra de Almeida, "Bio-óleo a partir da pirólise rápida, térmica ou catalítica, da palha da cana-de-açúcar e seu coprocessamento com gasóleo em craqueamento catalítico," Master's Thesis, Rio de Janeiro-RJ-Brasil (2008), available at http://epqb.eq.ufrj.br/download/bio-oleo-a-partir-da-pirolise-rapida.pdf.
Oasmaa et al., "Properties and fuel use of biomass-derived fast pyrolysis liquids: A guide," VTT Publication 731 (2010).
Ringer et al., "Large-Scale Pyrolysis Oil Production: A Technology Assessment and Economic Analysis," NREL/TP-510-37779 Technical Report (2006).
Shaddix, Christopher R. et al., "Combustion Properties of Biomass Flash Pyrolysis Oils: Final Project Report," Sandia Report SAND99-8238, Sandia National Laboratories (Apr. 1999).
Soldaini et al., "Testing of pyrolysis oil emulsions in small scale boiler pumps: preliminary results," *Science in Thermal and Chemical Biomass Conversion*. Vancouver, Canada, Aug. 29-Sep. 2, 2004.

* cited by examiner

*Primary Examiner* — Ellen M McAvoy
*Assistant Examiner* — Chantel L Graham
(74) *Attorney, Agent, or Firm* — Jones Day

(57) ABSTRACT

The present application generally relates to catalytically preparing liquid fuel products with an improved product mix by co-processing a plurality of reactants in in refinery or field-upgrading operations. The reactants may include, for example, petroleum fraction and a biocrude oil having an alcohol additive.

23 Claims, 7 Drawing Sheets

SYSTEMS AND METHODS FOR PREPARING AND CO-PROCESSING BIOCRUDE OIL

CROSS REFERENCE TO RELATED APPLICATIONS

Figure 1:
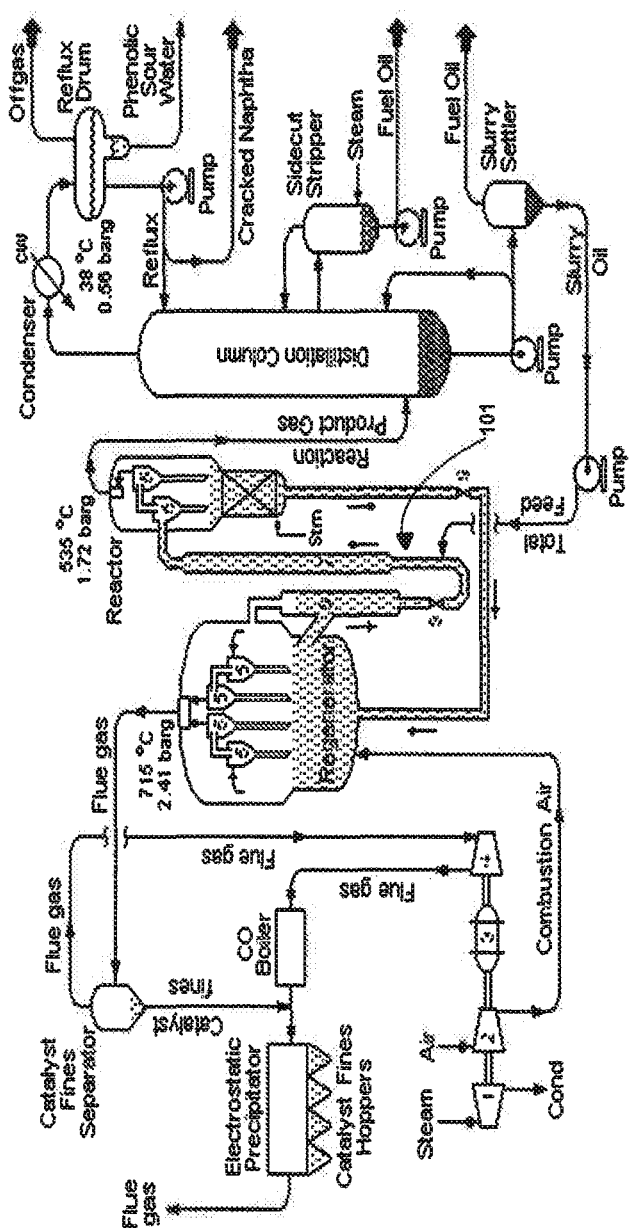

This application is the National Phase application of International Application No. PCT/US2017/042782, filed Jul. 19, 2017, which designates the United States and was published in English, and which further claims the benefit of priority from U.S. Provisional Application No. 62/364,682, filed Jul. 20, 2016. The foregoing related applications, in their entirety, are incorporated herein by reference.

The present disclosure also relates to the following: U.S. Pat. Nos. 7,905,990; 5,961,786; 5,792,340; U.S. Provisional Application No. 61/569,712, filed Dec. 12, 2011; U.S. Provisional Application No. 61/646,152, filed May 11, 2012; U.S. Provisional Application No. 61/673,683, filed Jul. 19, 2012; U.S. application Ser. No. 13/709,822, filed Dec. 10, 2012, now U.S. Pat. No. 9,109,177, granted Aug. 18, 2015; U.S. application Ser. No. 14/480,211, filed Sep. 8, 2014, now U.S. Pat. No. 9,127,223, granted Sep. 8, 2015; U.S. application Ser. No. 14/484,874, filed Sep. 12, 2014, now U.S. Pat. No. 9,102,888, granted Aug. 11, 2015; U.S. application Ser. No. 14/484,953, filed Sep. 12, 2014, now U.S. Pat. No. 9,127,224, granted Sep. 8, 2015; U.S. application Ser. No. 14/485,000, filed Sep. 12, 2014, now U.S. Pat. No. 9,102,889, granted Aug. 11, 2015; U.S. application Ser. No. 14/487,442, filed Sep. 12, 2014, now U.S. Pat. No. 9,120,988, granted Sep. 1, 2015; U.S. application Ser. No. 14/487,522, filed Sep. 16, 2014; U.S. application Ser. No. 14/487,575, filed Sep. 16, 2014, now U.S. Pat. No. 9,120,989; granted Sep. 1, 2015; U.S. application Ser. No. 14/490,116, filed Sep. 18, 2014; U.S. application Ser. No. 14/490,150, filed Sep. 18, 2014, now U.S. Pat. No. 9,120,990, granted Sep. 1, 2015; U.S. application Ser. No. 14/490,181, filed Sep. 18, 2014, now U.S. Pat. No. 9,102,890, granted Aug. 11, 2015; U.S. application Ser. No. 14/801,283, filed Jul. 16, 2015; U.S. Provisional Application No. 61/839,832, filed Jun. 26, 2013; U.S. application Ser. No. 14/314,785, filed Jun. 25, 2014; and International Application No. PCT/US2012/068876, filed Dec. 11, 2012. Each of the foregoing patents and patent applications, in their entirety, are hereby incorporated herein by reference.

FIELD OF THE INVENTION

The present disclosure generally relates to the production and utilization of biomass-derived oil to prepare liquid fuels by co-processing the oil with a petroleum fraction in the presence of a catalyst. For example, systems, methods, and apparatuses are disclosed for co-processing a biocrude oil with a petroleum fraction, wherein the biocrude oil comprises an additive, for example an alcohol or a vegetable oil. Certain embodiments, for example, may provide for co-processing a biocrude oil with a petroleum fraction in a fluidized catalytic cracker, whereby the yield of motor fuel and/or light cycle oil product fractions are increased by the use of a biocrude oil having an additive.

BACKGROUND OF THE INVENTION

To reduce greenhouse gases and decrease dependence on oil, government authorities around the world have mandated inclusion of renewable fuels derived from biomass in their national energy infrastructure. For example, the United States Environmental Protection Agency (EPA) has mandated 16B gallons of cellulose-derived bio-fuels be incorporated into transportation fuels by 2022. Given the limited capacity for producing such bio-fuels (for example, the EPA's cellulosic mandate in 2016 was only 230M gallons), significant progress must if EPA's future targets are going to be achieved.

One key technical hurdle is the need to remove on the order of 40 wt. % oxygen present in cellulosic feedstock to form suitable bio-fuels (petroleum and hydrocarbon fuels contain essentially no oxygen). Traditional biomass conversion processes produce liquid products rich in oxygen (for example, aldehydes and organic acids) that are prone to phase separation into organic and aqueous (polar) phases. U.S. Pat. Nos. 5,792,340; 5,961,786; Lappas et al., *Biomass Pyrolysis in a Circulating Fluid Bed Reactor for the Production of Fuels and Chemicals*, Fuel 81 (2002), 2087-2095); and Samolada et al., *Catalyst Evaluation for Catalytic Biomass Pyroloysis*, Fuel & Energy 2000, 14, 1161-1167, describe the direct processing of biomass or other oxygenated carbonaceous feedstocks in a circulating fluid bed reactor using a catalyst (specifically a zeolite catalyst utilized in fluidized catalytic cracking) as the solid circulating media in an effort to directly deoxygenate the biomass and produce transportation fuels or fuel blends, as well as other hydrocarbons. Although some hydrocarbon products were produced, the yields were unacceptably low, and there was a high yield of char or coke and by-product gas produced. In addition, there were frequent issues with reactor fouling and plugging, and other serious technical difficulties associated with catalyst performance. Not only were the liquid yields lower, much of liquid product produced would require further upgrading and treatment to enable any direct immediate use in place of fossil fuel-based hydrocarbons. Similarly, thermal pyrolysis products (i.e., products formed by conversion of biomass to a liquid and/or char by the action of heat with little or no direct combustion) tend to partially polymerize and to separate into multiple phases, including a predominant phase characterized as a viscous, tar-like liquor, due to the presence of water, organic acids, esters, ketones, esters, phenols, and other types of compounds.

Another approach taken has been to first convert a solid biomass into an oxygen-rich thermally-produced or thermocatalytically-produced liquid, followed by processing this neat liquid (i.e. 100% biocrude oil product) in the presence of a catalyst such as a fluidized catalytic cracking catalyst or other appropriate catalyst as the solid circulating media. Advances in pyrolysis, for example, have significantly improved the prospects for processing a liquid form of the cellulosic biomass. In particular, fast pyrolysis or rapid thermal processing ("RTP") was discovered in the late 1970's when researchers noted that an extremely high yield of a light, pourable liquid is possible from biomass when the pyrolysis is conducted under high temperatures and short residence times, for example a liquid yield of approximately 80% from woody biomass is achievable at a pyrolysis temperature of approximately 600° C. and a residence time of less than 5 seconds. The liquid product, which has the appearance of a light to medium petroleum fuel oil, may be suitable as a fuel for clean, controlled combustion (for example in boilers, or in diesel and stationary turbines) or as a feedstock in conversion processes. Rapid thermal processing of a biomass causes the major part of its organic material to be instantaneously transformed into a vapor phase. The vapor phase contains both non-condensable gases (including methane, hydrogen, carbon monoxide, carbon dioxide and olefins) and condensable vapors. It is the condensable vapors that constitute the final liquid product, when condensed and recovered, and the yield and value of this liquid is a strong function of the method and efficiency of the downstream capture and recovery system.

Even with improved liquid cellulosic feedstock, however, attempts to directly convert the liquid to useful fuels failed for a variety of reasons, including: unacceptably low hydrocarbon yields; excessive char/coke; gas and oxygen-rich liquid products that tended to separate into different liquid phases; and reactor plugging and fouling. (See, e.g., Adjaye et al., *Production of Hydrocarbons by Catalytic Upgrading of a Fast Pyrolysis Bio-oil*, Fuel Processing Technology 45 (1995), 185-192). As a result, researchers have further investigated stand-alone upgrading pathways where biomass-derived liquids could be converted to liquid hydrocarbons using hydrogen addition and catalyst systems in conversion systems that were tailored specifically for the processing of oxygenated materials (Elliott, *Historical Developments in Hydroprocessing Bio-oils*, Energy & Fuels 2007, 21, 1792-1815). Although technically feasible, the large economies-of-scale and the technical complexities and costs associated with high-pressure multi-stage hydrogen addition (required for complete conversion to liquid hydrocarbon fuels) are severely limiting and generally viewed as unacceptable.

As a means to overcome the technical and economic limitations associated with full stand-alone biomass upgrading to transportation fuels, researchers (de Miguel Mercader, *Pyrolysis Oil Upgrading for Co-Processing in Standard Refinery Units*, Ph.D Thesis, University of Twente, 2010 ("Mercader"); Fogassy et al., *Biomass Derived Feedstock Co-Processing with VGO for Hybrid Fule Production in FCC Units*, Institut de Recherches sur la Catalyse et l'Environnement de Lyon, UMR5236 CNRS-UCBL ("Fogassy"); Gutierrez et al., *Co-Processing of Upgraded Bio-Liquids in Standard Refinery Units—Fundamentals*, 15$^{th}$ European Biomass Conference & Exhibition, Berlin May 7-11, 2007) investigated various schemes for partial upgrading of the oxygenated biomass to reduce oxygen, followed by the co-processing of this intermediate biomass product with petroleum feedstocks in existing petroleum refinery operations. These initiatives are all focused on hydrodeoxygenation of the biomass-derived liquid prior to co-processing with petroleum, and are predicated on the consideration that hydrotreatment of the thermally produced liquid is necessary prior to petroleum co-processing in order to avoid rapid FCC catalyst deactivation and reactor fouling, and to preclude excessive coke and gas production.

One innovative embodiment that forms part of the present application may be to add a component additive (for example a vegetable oil, an alcohol, or mixtures thereof) to a biocrude oil prior to co-processing the biocrude oil in order to increase the yield of desireable liquid fuel products (for example, to increase the yield of products eligible for generating one or more Renewable Identification Number).

BRIEF SUMMARY OF THE INVENTION

Certain embodiments may provide, for example, methods, apparatuses, or systems for preparing one or more liquid fuel products, for example a C3-C4 fraction (i.e., a fraction containing three- and four-carbon alkanes and alkenes), a gasoline, a diesel fuel, a light cycle oil, a distillate oil, and/or a combination of two or more of the foregoing fuel products. In certain embodiments, the method may comprise, for example, co-processing a plurality of reactants in a petroleum conversion unit, for example a refinery fluid catalytic cracker (FCC), a coker, a field upgrader system, a hydrocracker, and/or a hydrotreating unit. In certain embodiments, for example, the plurality of reactants may comprise a petroleum fraction and a biocrude oil, for example the plurality of reactants may comprise in the range of 93-99.95 wt. % of the petroleum fraction and in the range of 0.05-7 wt. % of the biocrude oil, relative to the weight of the reactants, wherein the biocrude oil includes one or more component additives. For example, the one or more component additives may comprise stabilizing agent, a processing agent, a buffering agent, a pH adjuster, an acid scavenger agent, a yield enhancing agent, a neutralizing agent, a capping agent and/or a combination of one or more of the foregoing.

In certain embodiments, for example, the reactants may further comprise one or more component additives present in a range, for example, of 0.0005-0.4 wt. %, relative to the total weight of the reactants. In certain embodiments, for example, the one or more component additives may enhance the stability, processing qualities, and/or product yield obtained from the biocrude oil. In certain embodiments, for example, the one or more component additives may comprise a vegetable oil, an alcohol, and mixtures thereof. In certain embodiments, for example, the one or more component additives (for example an alcohol such as, for example, ethanol) may be capable of capping and/or neutralizing at least a portion of the organic acid present in the biocrude oil. In certain embodiments, for example, the component additive may be capable of altering the catalytic activity of a fluidized catalytic cracking catalyst. In certain embodiments, suitable component additives may include one or more of an alcohol, a ketone, an ester, a carbonyl-containing compound, a polar solvent, furfural, acetone, and 2-butanone.

Certain embodiments may provide, for example, methods, apparatuses, or systems for preparing one or more liquid fuel products, said methods, apparatuses, or systems comprising co-processing of a petroleum fraction with a biocrude oil and one or more component additivess, wherein the biocrude oil and one or more component additivess may be inclusive of, but not limited to, a biocrude oil mixed with, blended with, emulsified with, or at least partially reacted with, one or more component additivess. In certain embodiments, for example, the percentage of the one or more component additivess present as a reactant for co-processing may be based on the amount of the one or more component additives introduced to the biocrude oil.

In certain embodiments, for example, the method may comprise processing a petroleum fraction feedstock with a biocrude oil feedstock in the presence of a catalyst and, optionally, adjusting feed addition rates of the petroleum fraction feedstock, the biocrude oil feedstock, the component additive, or a combination thereof, to target a particular liquid fuel product profile (for example, a product mix), riser temperature, or reaction zone temperature; and/or, optionally, adjusting catalyst to combined petroleum fraction feedstock and biocrude oil feedstock ratio (catalyst:oil ratio) to target a particular fuel product profile, riser temperature, or reaction zone temperature; wherein the catalyst:oil ratio is a weight ratio or a volume ratio.

In certain embodiments, for example, the petroleum fraction may comprise a vacuum gas oil. In certain further embodiments, for example, the petroleum conversion unit may comprise a refinery fluid catalytic cracker (FCC) and the petroleum fraction may comprise a refinery vacuum gas oil.

In certain embodiments, for example, the biocrude oil may be derived from thermal processing, for example rapid thermal processing of a cellulosic biomass. In certain further embodiments, for example, the biocrude oil may be derived from a liquid product of non-catalytic rapid thermal processing, for example non-catalytic rapid thermal processing of the cellulosic biomass. In certain embodiments, for example, the biocrude oil may be derived from mechanical and thermal conversion of a cellulosic biomass comprising grinding and non-catalytic rapid thermal processing (i.e., unenhanced biocrude). In certain embodiments, for example, the biocrude oil may be a liquid product of non-catalytic rapid thermal processing, for example of a cellulosic biomass. In certain further embodiments, for example, the non-catalytic rapid thermal processing may comprise contacting the biocrude oil product with a chelating agent, for example oxalic acid. In certain embodiments, for example, the non-catalytic rapid thermal processing may comprise pre-treating the cellulosic biomass with a water wash. In certain further embodiments, the water wash may be effective to reduce one or more of the metal content, ash content, and chlorine content of the biocrude oil.

In certain embodiments, for example, the biocrude oil may comprise one or more of a vegetable oil, a slow pyrolysis oil, a fast pyrolysis oil, a lignosulfonate, a pulping liquor, a bio-based slurry and/or mixtures thereof.

In certain embodiments, for example, the one or more component additivess may be introduced directly into the petroleum conversion unit, i.e., without first being mixed with any of the other reactants. In certain embodiments, for example, the biocrude oil may contain, for example may be spiked with or may be pre-treated, with the one or more component additives. In certain embodiments, for example, the biocrude oil may contain, for example may be spiked with or may be pre-treated with, an alcohol additive, for example the biocrude oil may be spiked with an amount of an alcohol additive in an amount in the range of 0.1-20 wt. % (for example, in the range of 1-2 wt. %, 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, or in the range of 15-20 wt. % of alcohol additive, for example one or more isomers of methanol, ethanol, propanol, butanol, or pentanol), relative to the weight of the biocrude oil (inclusive of the added alcohol additive). In certain further embodiments, for example, the alcohol additive may have a molecular weight of less than 100 g/mol, for example a molecular weight in the range of 80-100 g/mol, 65-80 g/mol, 50-65 g/mol, 40-50 g/mol, or in the range of 35-40 g/mol, or less than 38 g/mol, less than 47 g/mol, less than 61 g/mol, less than 75 g/mol, or less than 89 g/mol. In certain embodiments, for example, at least 75 wt. % of the alcohol additive may comprise one or more primary and/or secondary alcohols with a molecular weight, for example, of less than 100 g/mol. In certain embodiments, for example, the alcohol additive may have a viscosity of less than 2 cP at a temperature of 27° C.

In certain further embodiments, for example, the total alcohol content (exclusive of phenols and alcohols with a molecular weight greater than 100 g/mol) of the biocrude oil (for example, a biocrude oil following addition of the alcohol additive; or a biocrude oil without addition of any alcohol additive), may be an amount in the range of 2-30 wt. % (for example, in the range of 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, 15-20 wt. %, or in the range of 20-30 wt. % total alcohol content, relative to the weight of the biocrude oil (inclusive of the total alcohol content).

In certain embodiments, the biocrude oil of one or more or all of the above-noted embodiments may be an enhanced-stability biocrude oil for its intended use as a co-processing feedstock. In certain further embodiments, for example, the enhanced-stability biocrude oil may have one or more features of low metal content (for example, in the range of 10-95% less metal content than an untreated biocrude oil), low ash content (for example, in the range of 10-95% less ash content than a typical renewable fuel oil), low suspended solids (for example, in the range of 10-95% less suspended solids than a typical renewable fuel oil), low polymer content (for example, in the range of 10-95% less polymer having a molecular weight of greater than 500 g/mol than a typical renewable fuel oil), greater thermal stability, greater shelf-life, lower viscosity, greater ester content, or a higher pH (for example a pH of more than 3.5). Other features of the enhanced-stability biocrude oil are contemplated herein.

In certain embodiments, for example when the biocrude oil is a liquid product of non-catalytic rapid thermal processing, at least a portion of the component additive may be added to the biocrude oil by adding the component additive to a condensing chamber used to form at least a portion of the liquid product, for example by adding the component additive to a condensing chamber or a quench tower of a rapid thermal processing process. In certain embodiments, for example when the biocrude oil is a liquid product of non-catalytic rapid thermal processing, at least a portion of the component additive may be added to the biocrude oil by adding the component additive to a fast pyrolysis upflow reactor of a rapid thermal process. In certain embodiments, for example, a first portion of the component additive may be added to the biocrude oil, optionally followed a period of time later, for example several days later, by addition of a second portion of the component additive to the biocrude oil prior to co-processing. In certain further embodiments, for example, the first portion may be added to the biocrude oil within a period of time of forming the biocrude oil, for example within one day of forming the biocrude oil. In certain embodiments, the biocrude oil may be co-processed within a period of time, for example within 2 weeks, following addition of at least a portion of the component additive (e.g., vegetable oil additive, alcohol additive or mixtures thereof).

In certain embodiments, at least one of the one or more component additives may be added, for example, during preparation of the biocrude oil, for example by a method comprising: rapidly pyrolyzing a cellulosic biomass in the presence of one or more component additives, at least one of said one or more component additives capable of capping and/or neutralizing at least one type of organic acid within the biocrude oil. Alternatively, or in addition, in certain embodiments at least one of the one or more component additives may be added, for example, during preparation of the biocrude oil, for example by a method comprising: (i) rapidly pyrolyzing a cellulosic feedstock to form a vapor stream; and (ii) contacting the stream with a quench media to form a liquid product, said quench media comprising one or more additives capable of capping and/or neutralizing at least one type of organic acid present in the liquid product. In certain further embodiments, for example, the vapor stream may be quenched by the quench media to a temperature of less than 100° C. in less than 1 second, for example less than 50° C. in less than 100 milliseconds. In certain embodiments, the method may further comprise pre-treating the cellulosic biomass with a water wash. In certain embodiments, the method may further comprise contacting the liquid product with a chelating agent, for example oxalic acid. In certain further embodiments, for example, the liquid product contacted with a chelating agent may be filtered.

In certain embodiments, for example, co-processing one unit volume of the component additive-containing biocrude oil may account for (for example may produce, may be attributable to, or may result in) at least 0.7 volume units of the following liquid fuel products combined: (i) a motor fuel fraction having a boiling point up to 430° F.; (ii) a light cycle oil having a boiling point up in the range of 430-650° F.; and (iii) a distillate oil having a boiling point of at least 650° F.

In certain embodiments, for example, co-processing one unit volume of the component additive-containing biocrude oil may account for (for example may produce, may be attributable to, or may result in) the following liquid fuel composition: (i) 0.4 volume units of a motor fuel fraction having a boiling point up to 430° F.; (ii) 0.2 volume units of a light cycle oil having a boiling point up in the range of 430-650° F.; and/or (iii) 0.1 units of a distillate oil having a boiling point of at least 650° F.

In certain embodiments, for example, the liquid fuel volume produced by co-processing one unit volume of a biocrude oil may be increased by at least 10%, for example by 10-20%, as a result of adding the component additive, for example adding in the range of 2-20 wt. % ethanol, said increase relative to co-processing one unit volume of a biocrude oil under the same conditions but not containing the component additive. In certain further embodiments, for example, the liquid fuel volume may be inclusive of, for example, a C3-C4 fraction, a gasoline, a light cycle oil, and a distillate oil.

In certain embodiments, for example, the liquid product mix accounted for by a co-processed biocrude may be adjusted by adding the component additive to the biocrude. In certain further embodiments, for example, the added component additive may: (i) decrease the volume fraction of a C3-C4 fraction; (ii) decrease the volume fraction of a distillate oil fraction; (iii) increase the volume fraction of a gasoline fraction; and/or (iv) increase the volume fraction of a light cycle oil, produced per unit volume of co-processed biocrude oil. In certain embodiments, for example, the liquid product mix attributable to a co-processed biocrude may be adjusted by adding the component additive to the biocrude. In certain further embodiments, for example, addition of 2-20 wt. % ethanol to the biocrude may: (i) decrease the volume fraction of a C3-C4 fraction accounted for by a unit volume of the biocrude oil by at least 50%; (ii) decrease the volume fraction of a distillate oil fraction accounted for by a unit volume of the biocrude oil by at least 50%; (iii) increase the volume fraction of a gasoline fraction accounted for by a unit volume of the biocrude oil by at least 70%; and/or (iv) increase the volume fraction of a light cycle oil accounted for by a unit volume of the biocrude oil by at least 100%.

Certain embodiments may provide, for example, a method to preparing one or more liquid fuel products, wherein said method may comprise: coprocessing in a fluidized catalytic cracking unit: (i) 98-99.95 wt. % of a vacuum gas oil; and (ii) 0.05-2 wt. % of a biocrude oil pre-treated with at least 2 wt. % ethanol relative to the total weight of the biocrude oil and the ethanol, said biocrude oil produced by a process comprising grinding and non-catalytic rapid thermal processing of a cellulosic biomass.

Certain embodiments may provide, for example, a method for preparing one or more liquid fuel product, wherein said method may comprise: co-processing a plurality of reactants in a catalytic cracker, said plurality of reactants comprising: (i) 93-99.95 wt. % of a petroleum fraction; and (ii) 0.05-7 wt. % of a biocrude oil, wherein forming said biocrude oil may comprise grinding and non-catalytic rapid thermal processing of a cellulosic biomass, said biocrude oil product having: (a) a non-phenolic alcohol content of at least 7 wt. %; and (b) a viscosity reducing component of at least 2 wt. % comprising one or more sub-components having a molecular weight of less than 100 g/mole. In certain further embodiments, for example, the cellulosic biomass may have a holocellulose content of at least 65 wt. % and/or a lignin content of not more than 30 wt. %.

Certain embodiments may provide, for example, a method for generating at least one Cellulosic-Renewable Identification Number, comprising: co-processing a plurality of reactants in at least one approved fuel pathway under the Renewable Fuel Standard program, for example at least one approved pathway comprising fluidized catalytic cracking for making a D-code 3 or D-code 7 compliant fuel, said plurality of reactants comprising: (i) 93-99.95 wt. % of a petroleum fraction; and (ii) 0.05-7 wt. % of a biocrude oil derived from a liquid product of rapid thermal processing of a cellulosic biomass, said biocrude oil having a component additive, for example an ethanol additive. In certain embodiments, for example, the co-processing may form a Cellulosic-Renewable Identification Number-compliant gasoline or diesel fuel. In certain embodiments, the computation of the at least one Cellulosic-Renewable Identification Number may utilize at least a measure of a portion of the component additive as an input to the computation to increase the value of the at least one Cellulosic-Renewable Identification Number.

Certain embodiments may provide, for example, a method for preparing a fuel, comprising: co-processing a plurality of reactants in a catalytic cracker (for example, in the presence of a catalytic cracking catalyst), said plurality of reactants comprising: i) a petroleum fraction; ii) a biocrude oil derived from non-catalytic rapid thermal processing of a cellulosic biomass; and iii) an alcohol.

Certain embodiments may provide, for example, a method for preparing liquid fuel products, comprising: co-processing a plurality of reactants in a catalytic cracker, said plurality of reactants comprising: i) 93-99.95 wt. % of a petroleum fraction; and ii) 0.05-7 wt. % of a biocrude oil derived from a cellulosic biomass, said biocrude oil having an alcohol additive.

Certain embodiments may provide, for example, a method for preparing a fuel, comprising: co-processing a plurality of reactants in a catalytic cracker, said plurality of reactants comprising: i) 93-99.95 wt. % of a petroleum fraction; and ii) 0.05-7 wt. % of a biocrude oil product of a mechanical and thermal conversion of a cellulosic biomass comprising grinding and non-catalytic rapid thermal processing, said biocrude oil product having: a) a non-phenolic alcohol content of at least 7 wt. %; and b) a viscosity reducing component of at least 2 wt. % comprising one or more sub-components having a molecular weight of less than 100 g/mole.

Certain embodiments may provide, for example, a method for generating at least one Cellulosic-Renewable Identification Number, comprising: co-processing a plurality of reactants in at least one approved fuel pathway comprising fluidized catalytic cracking under the Renewable Fuel Standard program, said plurality of reactants comprising: i) 93-99.95 wt. % of a petroleum fraction; and ii) 0.05-7 wt. % of a biocrude oil derived from a liquid product of rapid thermal processing of a cellulosic biomass, said biocrude oil having an alcohol additive.

Certain embodiments may provide, for example, a process for preparing a liquid biocrude oil, said process comprising: i) rapidly pyrolyzing a cellulosic feedstock to form a vapor stream; and ii) introducing one or more component additives capable of capping/and or neutralizing at least one organic acid present in the vapor stream by: a) contacting the vapor stream with a quench media to form a liquid product, said quench media comprising at least one of the one or more component additives capable of neutralizing at least one type of organic acid; and/or b) adding at least one of the one or more component additives to a rapid pyrolysis reactor (for example, an upflow reactor).

Certain embodiments may provide, for example, a method to retrofit a rapid thermal process to add one or more component additives to a biocrude oil. In certain embodiments, for example, the retrofit may comprise retrofitting a fast pyrolysis reactor (for example, an upflow fast pyrolysis reactor) to facilitate addition of the component additive to the fast pyrolysis reactor, for example by integrating a component additive inlet port to the fast pyrolysis reactor, supply pump(s), and supply tankage. In certain embodiments, for example, the retrofit may comprise retrofitting a pyrolysis vapor condenser unit of the rapid thermal process, for example by adding a component additive inlet port to the condenser unit, supply pump(s), and supply tankage.

Certain embodiments may provide, for example, a method to retrofit a rapid thermal process comprising adding a chelating system (for example, a chelating system comprising at least one mixing vessel and, an oxalic acid chelating agent, and at least one filter to process the liquid from the vapor condensing unit).

Certain embodiments may provide, for example, a method to retrofit a rapid thermal process comprising adding a biomass wash system (for example, a system providing a water wash of solid biomass prior to fast pyrolysis of the solid biomass) effective to reduce the chlorine and/or metals content of a biocrude oil product.

Certain embodiments may provide, for example, for production of a biocrude oil proximate a refinery, for example a refinery utilizing the biocrude oil in a fluidized catalytic cracker. In certain further embodiments, the produced biocrude oil is utilized relatively quickly after it is produced (for example within one week or within 3 days; for example with less than one week of intermediate storage capacity). In certain embodiments, the biocrude oil may be produced in a rapid thermal processing system. In certain further embodiments, the rapid thermal processing system may be adjacent to, integral to, and/or a part of the refinery. In certain embodiments, the rapid thermal processing system is a retrofitted rapid thermal processing system retrofitted according to one or more or all of the above retrofitting methods.

In certain embodiments, for example, methods, apparatuses, or systems are provided that may improve petroleum conversion in a refinery, comprising processing a petroleum fraction substituted with a biocrude oil (for example, on an equivalent energy basis and/or carbon content basis) in the presence of a catalyst. In certain embodiments, for example, methods are provided that may increase fuel yield (for example the yield of one or more of a product containing propanes and butanes (for example a liquefied petroleum gas), a gasoline, a diesel fuel, a total motor gas, a light cycle oil, a heating oil, a jet fuel, and/or a distillate oil) from conversion of a petroleum fraction feedstock, comprising processing a petroleum fraction feedstock with a biocrude oil feedstock, and, optionally, a component additive (for example ethanol) in the presence of a catalyst.

In certain embodiments, for example, a fluidized catalytic cracker apparatus is provided having a petroleum fraction injection port and a biocrude oil injection port and, optionally a component additive port, or a riser that has been retro-fitted to add an element to allow for the injection of the biocrude oil and, optionally, the component additive. In certain embodiments, a refinery system is provided, comprising a first assembly for introduction of a petroleum fraction feedstock; and a second assembly for introduction of a biocrude oil feedstock and, optionally, the component additive or has been retro-fitted to add the same. In certain embodiments, the invention relates a refinery system, comprising a first assembly for introduction of a petroleum fraction feedstock; and a second assembly for introduction of a biocrude oil feedstock into the conversion unit of the refinery or has been retro-fitted or adapted to add the same.

Certain embodiments may provide, for example, one or more units (for example a conversion unit) in a refinery system suitable for accepting a biocrude oil feedstock and, optionally, a component additive, comprising an installed independent port for introducing the biocrude oil feedstock and/or the component additive. In certain embodiments, the invention relates to refinery system comprising an additional or modified riser assembly suitable for accepting the biocrude oil and/or the component additive, for example an independent port comprising a nozzle; a separate or independent tankage for introducing the biocrude oil feedstock; an installed, re-calibrated, or modified or independent control or control system; and/or an installed live-tap for introducing the biocrude oil feedstock and/or the component additive.

Certain embodiments may provide, for example, a method of increasing mix-zone temperature in an FCC unit comprising injecting between 0.05-15 wt. % biocrude oil feedstock and/or a component additive (for example injecting a component additive (either as part of the biocrude oil or separately injecting) in the range of 2-20 wt. % of the component additive relative to the total weight of the biocrude oil feedstock) via a quench riser system downstream (after) of the introduction of a petroleum fraction feedstock injection nozzle.

Certain embodiments may provide, for example, a method of co-processing (a) a biocrude oil, wherein the biocrude oil has a carbon content level in the range of 35-80 wt. %, on a moisture-free basis and/or an energy content level of at least 30% of the energy content contained in the biomass from which it is derived; and (b) a petroleum fraction feedstock comprising a gas oil (GO) feedstock, a vacuum gas oil (VGO) feedstock, a heavy gas oil (HGO) feedstock, a middle distillate feedstock, a heavy-middle distillate feedstock, a hydrocarbon-based feedstock, or combinations thereof. In certain embodiments, the method may comprise introducing the biocrude oil and/or a component additive (for example, the biocrude oil may comprise the component additive or the component additive may be introduced to the conversion unit) with the petroleum fraction feedstock as reactants into a conversion unit wherein the reactants are contacted with a catalyst.

Certain embodiments may provide, for example, a fuel (for example diesel fuel and/or gasoline) producing pathway for generating cellulosic renewable identification numbers comprising converting a cellulosic feedstock via rapid thermal processing to form a biocrude oil and co-processing a petroleum fraction feedstock with the biocrude oil and/or a component additive in the presence of a catalyst to produce a cellulosic renewable identification number-compliant fuel. In certain embodiments, the invention relates a diesel fuel and/or gasoline producing pathway for generating cellulosic renewable identification numbers comprising thermally converting a renewable [cellulosic] biomass feedstock to form a biocrude oil and co-processing a petroleum fraction feedstock with the biocrude oil and/or the component additive in a refinery to produce a diesel fuel and/or gasoline that complies with a fuel pathway specified in U.S. renewable fuel standard program (RFS) regulations for generating the cellulosic renewable identification number. In certain embodiments, the invention relates to a fuel producing pathway for generating cellulosic renewable identification numbers comprising thermally processing a cellulosic feedstock via rapid thermal processing to form an unenriched biocrude oil and processing a petroleum fraction feedstock with the unenriched biocrude oil and/or the component additive in a refinery to produce a unit of diesel fuel sufficient to generate greater than 0.3 units (for example 0.5-1.5 units) of a cellulosic renewable identification number-compliant fuel. In certain further embodiments, for example, the component additive may increase the number of cellulosic renewable identification numbers generated.

Certain embodiments may provide, for example, a method of preparing a cellulosic renewable identification number qualifying-fuel comprising, optionally, forming a biocrude oil via rapid thermal processing of a renewable cellulosic biomass feedstock; injecting greater than 90 wt. % of a petroleum fraction feedstock into a refinery process; spiking the biocrude oil with 2-5 wt. % ethanol (relative to the combined weight of the biocrude oil and the ethanol), injecting less than 10 wt. % of the spiked biocrude oil (for example in the range of 0.25-2 wt. % of the spiked biocrude oil) into the refinery process proximate the injection point of the petroleum fraction feedstock; and co-processing the petroleum fraction feedstock and biocrude oil to produce the cellulosic-renewable identification number qualifying-fuel; wherein the biocrude oil has a pH of 1.5-6, a solids content of less than 2.5 wt. %, and a water content of 20-45 wt. %.

Certain embodiments may provide, for example, a method of preparing a fuel derived at least in part from a biocrude oil (for example a biocrude oil spiked with 2-10 wt. % of a component additive capable of capping at least one organic acid (for example a carboxylic acid) present in the biocrude oil) processed through a refinery conversion unit, for example an FCC. In certain embodiments, the invention relates to a method of preparing a fuel derived at least in part from a biocrude fuel having a pH of 1.5-6 and a water content of 20-45 wt. %, that has been processed through a refinery conversion unit, for example an FCC.

Certain embodiments may provide, for example, a method of producing a combustible fuel via a fuel pathway compliant with U.S. renewable fuel standard program regulations for generating renewable identification numbers, wherein the method comprises thermally converting cellulosic-based biomass into a biocrude oil such that the carbon content of the biocrude oil is less than 60 wt. % and has a pH of 1.5-8. In certain embodiments, the invention relates to a method of producing a combustible fuel via a fuel pathway compliant with U.S. renewable fuel standard program regulations for generating renewable identification numbers, wherein the method comprises thermally converting cellulosic-based biomass into a biocrude oil such that the carbon content of the biocrude oil is greater than at least 80 wt. % of the carbon content of the cellulosic-based biomass. In certain embodiments, the invention relates to a method of producing a combustible fuel via a fuel pathway compliant with U.S. renewable fuel standard program regulations for generating renewable identification numbers, wherein the method comprises thermally converting cellulosic-based biomass into a biocrude oil and co-processing a portion of the biocrude oil with an additional alcohol-containing biofuel (e.g., a renewable identification number qualifying additional biofuel) with greater than 90 wt. % of a non-hydrotreated vacuum gas oil feedstock to produce the combustible fuel.

Certain embodiments may provide, for example, a fuel composition derived at least in part from a petroleum fraction feedstock and a biocrude oil feedstock wherein the petroleum feedstock and biocrude oil feedstock have been co-processed in the presence of a catalyst and one or more component additives (for example 2-10 wt. % ethanol relative to the combined weight of the ethanol and the biocrude oil feedstock). In certain embodiments, the fuel composition has an equivalent or greater yield of fuel product (for example, a greater yield of a gasoline, a diesel, a light cycle oil, or a combination thereof; or a lower yield of a C3-C4 fraction, a distillate oil, or a coke fraction, or a combination thereof) resulting from running the process with no biocrude oil feedstock and/or no component additive, on an equivalent energy input basis of the total feedstock.

Certain embodiments may provide, for example, a method of preparing a fuel comprising processing a petroleum fraction feedstock with a biocrude oil feedstock and/or a component additive in the presence of a catalyst wherein the fuel obtain from the process is completely compatible with fuel derived with no biocrude oil feedstock.

Certain embodiments may provide, for example, a method of improving an amount of valuable fuel components (for example, a motor gas and/or a light cycle oil component) derived from the conversion of a petroleum fraction feedstock comprising introducing the petroleum fraction feedstock into a refinery system comprising an FCC catalyst and adding at least 2 wt. % biocrude oil feedstock containing an alcohol additive, relative to the total amount feedstock (for example petroleum fraction feedstock plus biocrude oil feedstock) and co-processing, in the presence of the FCC catalyst, the combined feedstock in the FCC for at least 2 seconds.

Certain embodiments may provide, for example, a method of trading renewable identification numbers, comprising co-processing petroleum fraction feedstock with a biocrude oil and/or a further component additive to form a fuel compliant with one or more compliant fuel pathways in accordance with the U.S. renewable fuel standard program (and, optionally, wherein the further component additive is formed with one or more compliant fuel pathways), and transferring the rights of at least a portion of the one or more U.S. renewable identification numbers from the owner or purchaser of the fuel.

Certain embodiments may provide, for example, a biocrude oil compliant with a fuel pathway specified in U.S. renewable fuel standard program regulations for generating a cellulosic renewable identification number, derived by thermally processing cellulosic biomass and pre-treating the thermal product with one or more component additives capable of capping and/or neutralizing at least one organic acid present in the thermal product. In certain embodiments, for example, the biocrude oil may be co-processed to produce an internal combustion engine fuel compliant with a fuel pathway specified in U.S. renewable fuel standard program regulations for generating the cellulosic renewable identification number.

Certain embodiments may provide, for example, a computer system configured to monitor an amount of throughput in an FCC unit (for example, monitoring an amount of one or more pre-determined liquid fuel products produced relative to production targets for the one or more liquid fuel products) and controlling the amount of a biocrude oil and/or a further component additive to introduce for co-processing with a petroleum feedstock (for example, a vacuum gas oil).

Certain embodiments may provide, for example, a computer system configured to monitor an amount of throughput in an FCC unit inclusive of a quantity of biocrude oil and/or an alcohol additive being processed and calculating the cellulosic-renewable identification numbers generated.

Certain embodiments may provide, for example, co-processing a biocrude oil (inclusive of component additives, for example 2 wt. % ethanol present in the biocrude oil) pre-mixed with petroleum based materials and subsequently mixed or introduced into a second petroleum based feed for an FCC or field upgrader operations. In certain embodiments, for example, the co-processing may comprise mixing of the biocrude oil with VGO to form a mixture that may be subsequently co-processed with a second VGO stream in the FCC or field upgrader operations. The mixtures of BCO and VGO may be suspensions, dispersions, colloidal mixtures or other two part systems and may be created, for example, with blenders, high shear mixers, in-line mixers, static mixers, recycle systems (inclusive of other recycle streams including other product streams such as heavy cycle oil, DCO, and/or light cycle oil), ultrasonic mixers, mix atomizers, surfactants, emulsifiers and/or other mixing aids and combinations of one or more of theses techniques.

Certain embodiments may provide, for example, co-processing a biocrude oil (inclusive of component additives, for example 2 wt. % ethanol present in the biocrude oil) derived from one or more fractions or portions of thermally-produced liquids in a mixture or emulsion with VGO. In certain embodiments, for example, the biocrude oil may comprise a low molecular weight fraction of a product liquid produced by rapid thermal processing, a primary condenser fraction of a product liquid produced by rapid thermal processing and/or a secondary condenser fraction of a product liquid produced by rapid thermal processing.

Certain embodiments may provide, for example, co-processing a biocrude oil (inclusive of component additives, for example 2 wt. % ethanol present in the biocrude oil) derived from in a mixture or emulsion with VGO. In certain embodiments, for example, these fractions may be formed by mechanical separation of portions of the biocrude oil prior to introduction to the feedstream or pre-mixture. The mechanical separation may include, for example, centrifugation, continuous centrifugation, filtration, high-pressure filtration, vacuum filtration, settling, decanting, phase separation and/or combinations of one or more of these techniques. In certain embodiments, co-processing may comprise co-processing certain fractions or portions of thermally-produced liquids in a mixture or emulsion with VGO prior to introduction into a petroleum-containing feedstream for an FCC or field upgrader operations to obtain minimal or no oxygenats in the liquid product resulting from FCC or field upgrader operations.

Certain embodiments may provide, for example, co-processing thermally-produced liquids derived from rapid thermal processing of a cellulosic biomass having a relatively high holocellulosic content (for example, in the range of 65-99 wt. % holocellulosic content) and/or a low lignin content (for example, in the range of 0.01-30 wt. % lignin content) pre-mixed with petroleum-based materials with a second petroleum based feed. In certain embodiments, for example, the thermally-produced liquid may be an alcohol-rich biocrude oil. In certain further embodiments, for example, the alcohol rich biocrude oil may have an alcohol content in the range of 0.1-20 wt. % (for example, in the range of 1-2 wt. %, 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, or in the range of 15-20 wt. % of an alcohol, for example one or more isomers of methanol, ethanol, propanol, butanol, or pentanol.

Certain embodiments may provide, for example, a method for preparing liquid fuel products, comprising: co-processing a plurality of reactants in a catalytic cracker, said plurality of reactants comprising: co-processing a plurality of reactants in a catalytic cracker, said plurality of reactants comprising: 93-99.95 vol. % of a petroleum fraction and 0.05-7 vol. % of a biocrude oil derived from a cellulosic biomass, said biocrude oil having an alcohol additive.

Certain embodiments may provide, for example, method for preparing a fuel, comprising: co-processing a plurality of reactants in a catalytic cracker, said plurality of reactants comprising: 93-99.95 vol. % of a petroleum fraction and 0.05-7 vol. % of a biocrude oil product of a mechanical and thermal conversion of a cellulosic biomass comprising grinding and non-catalytic rapid thermal processing, said biocrude oil product having: a non-phenolic alcohol content of at least 7 vol. % and a viscosity reducing component of at least 2 vol. % comprising one or more sub-components having a molecular weight of less than 100 g/mole.

Certain embodiments may provide, for example, a method of co-processing a biocrude oil in a pilot scale rapid thermal processing reactor, comprising: contacting a biocrude oil with a viscosity-reducing agent; passing the reduced-viscosity biocrude oil through a feed line into the pilot scale reactor; and co-processing the reduced-viscosity with a petroleum fraction. In certain embodiments, the viscosity of the reduced-viscosity biocrude oil may be selected to match one or more design parameters between the pilot scale reactor and a larger reactor. In certain further embodiments, for example, the viscosity of the reduced-viscosity biocrude oil may be selected so that the Reynold's number of the reduced-viscosity biocrude oil in the feed line matches the Reynold's number of a biocrude oil being injected into a commercial scale rapid thermal processing unit.

DETAILED DESCRIPTION OF THE DRAWINGS

Figure 2A:
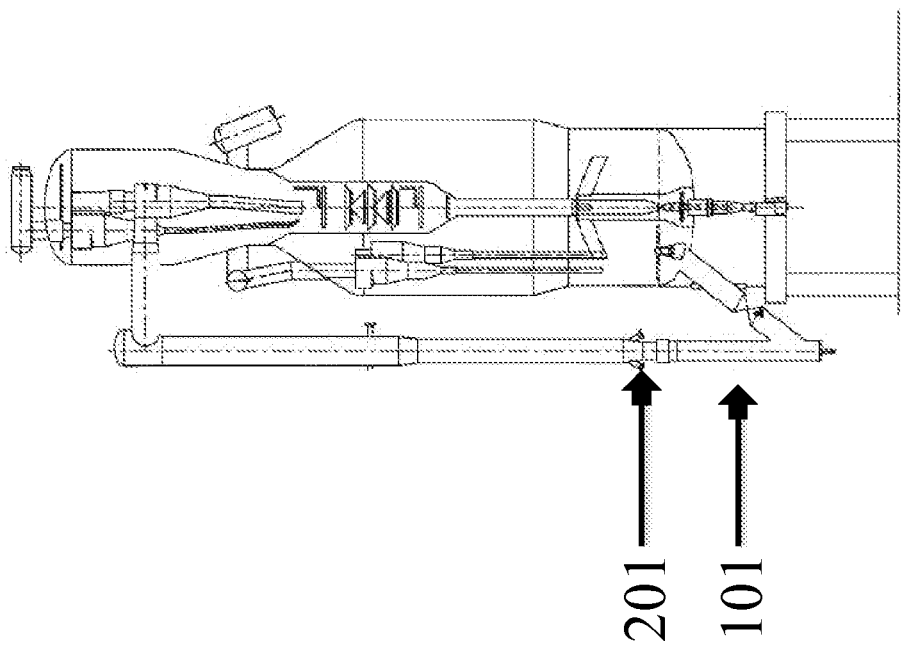
Figure 2B:
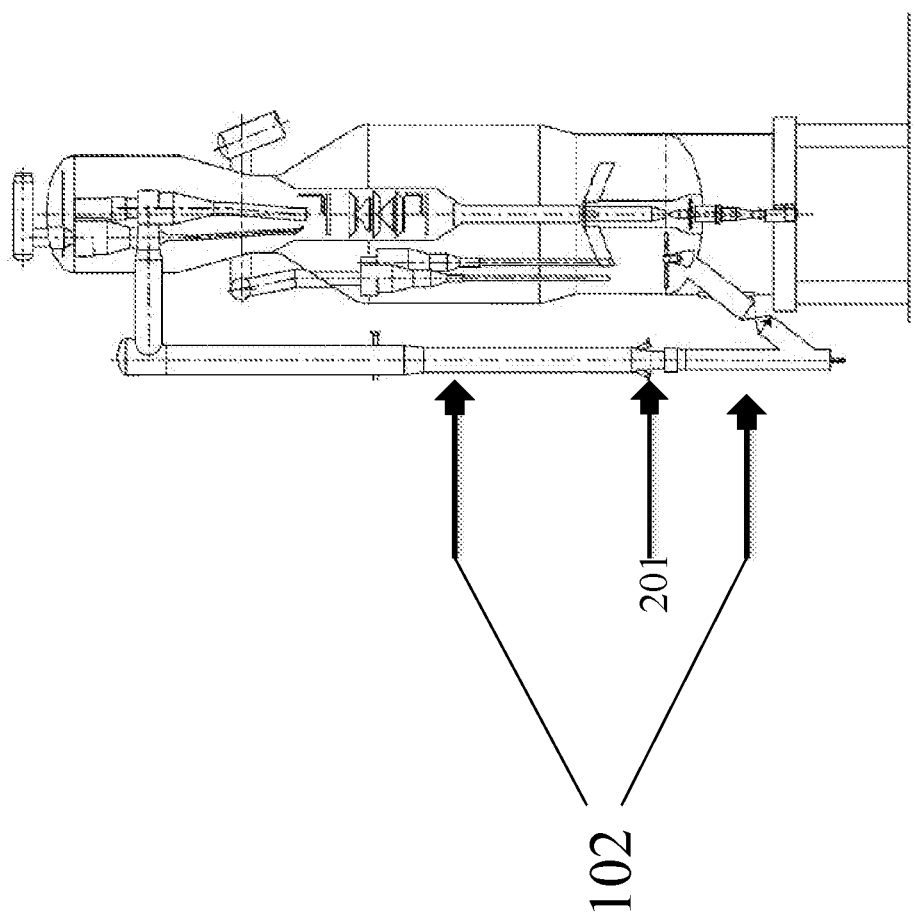
Figure 3:
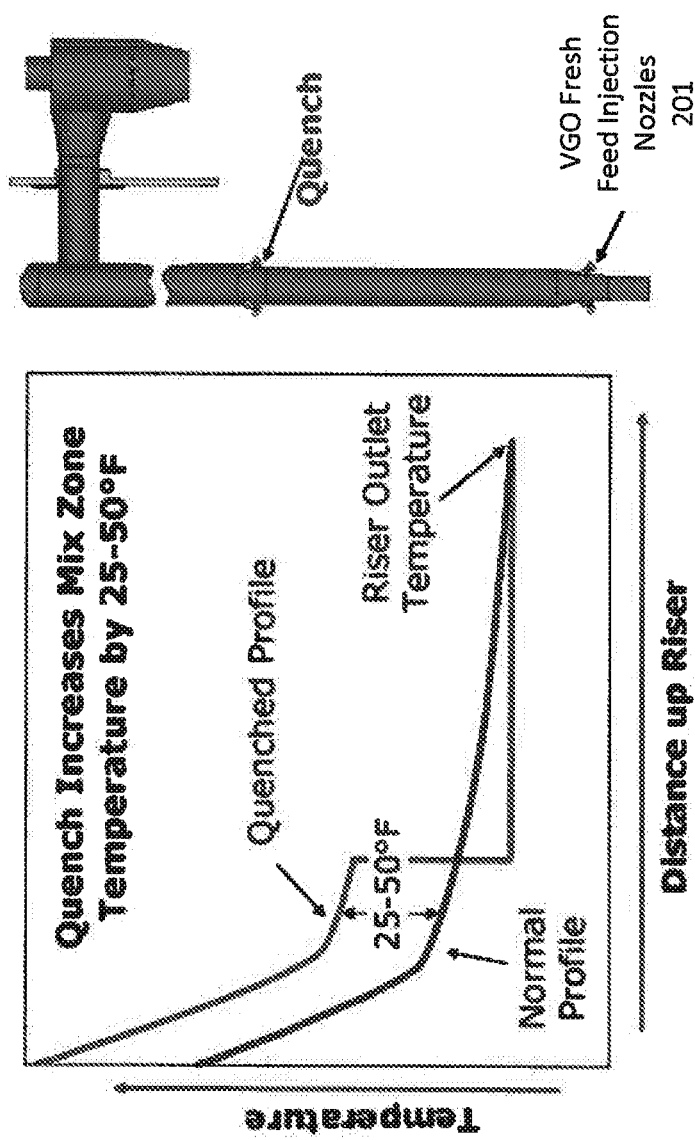
Figure 4:
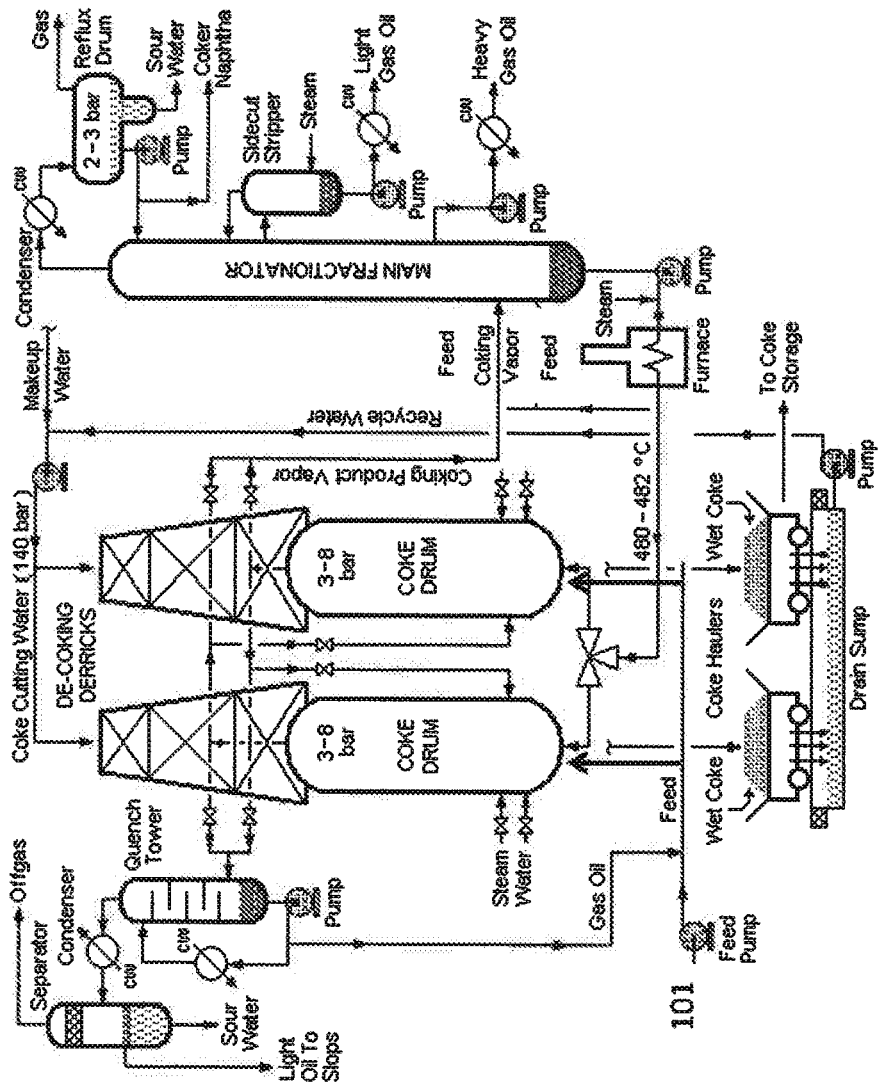
Figure 5:
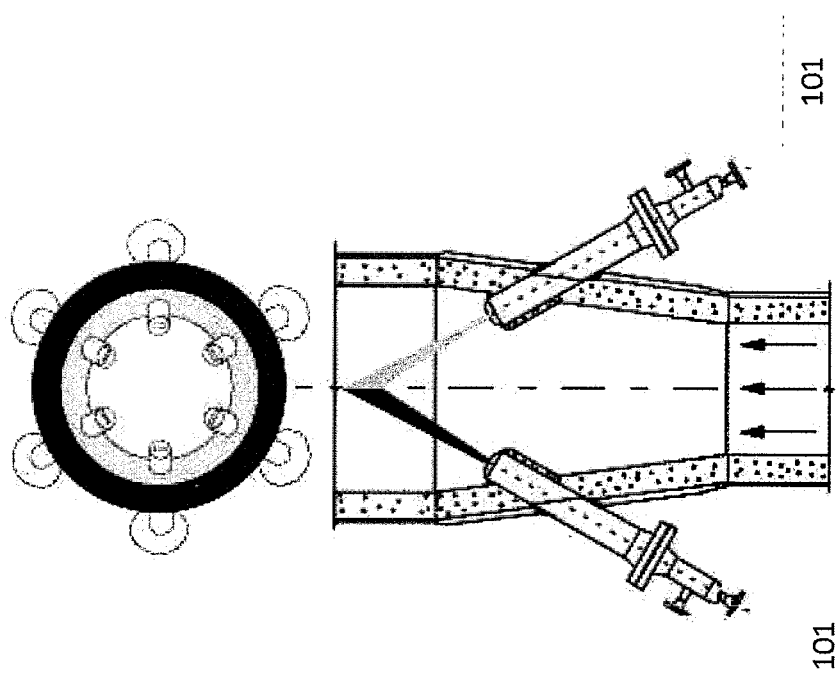
Figure 6:
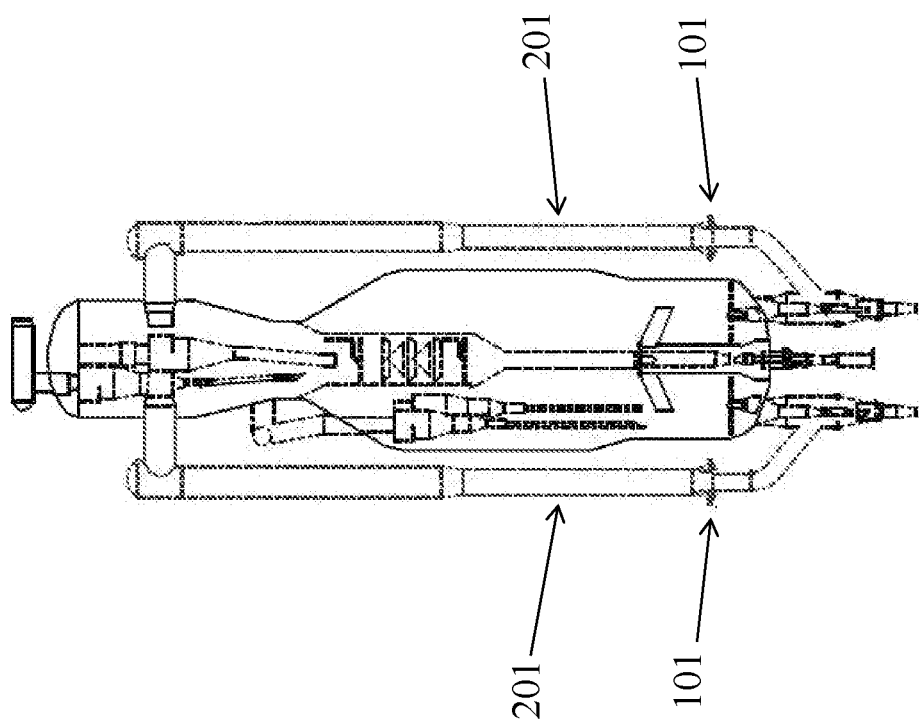

Many of the benefits of the materials, systems, methods, products, uses, and applications among others may be readily appreciated and understood from consideration of the description and details provided in this application inclusive of the accompanying drawings and abstract, wherein:

FIG. 1: illustrates a fluid catalytic cracking (FCC) unit.
FIG. 2A: illustrates a exemplary converter.
FIG. 2B: illustrates a exemplary converter that has been retro-fitted with an injection port or two (102), with two different locations (which may be alternative locations or both used) suitable for introducing a biocrude oil (BCO) feedstock.
FIG. 3: illustrates a riser quench technology.
FIG. 4: illustrates a coking unit.
FIG. 5: illustrates a feed injection system.
FIG. 6: illustrates a FCC unit with dual risers.

DETAILED DESCRIPTION OF THE INVENTION

Certain embodiments may provide, for example, methods, processes, apparatuses, and/or systems for preparing one or more fuel product, for example a product containing C3-C4 compounds (for example a liquefied petroleum gas), a gasoline, a diesel fuel, a total motor gas, a light cycle oil, a distillate oil, a heating oil, a jet fuel, a coke fraction, or a combination of two or more of the foregoing fuel products. In certain embodiments, for example, the one or more product may be a liquid fuel product. In certain embodiments, for example, the one or more product may be a power fuel and/or a transportation fuel. In certain embodiments, for example, the one or more product may be a renewable fuel derived at least in part from a biomass, for example a cellulosic fuel derived at least in part from a cellulosic biomass. In certain embodiments, the one or more fuel product may be derived from one or more product stream from a conversion unit. In certain further embodiments, the one or more product stream may be characterized by: (a) a total C3 and C4 fraction; (b) a motor gas fraction having a distillation range in the range of the boiling point of n-pentane to 430° F.; (c) a light cycle oil fraction having a distillation range of 430-650° F.; and/or (d) a distillate oil fraction having a distillation range of greater than 650° F.

In certain embodiments, the method includes processing or co-processing a petroleum fraction feedstock, a biocrude oil, and at least one component additive (for example a component additive such as alcohol or a vegetable oil) in the presence of a catalyst (for example in a conversion unit in a refinery) to produce one or more fuel product, such as a renewable identification number-compliant fuel product. For example, the one or more fuel product from processing or co-processing a petroleum fraction feedstock with a biocrude oil in a refinery may include a distillated fuel or distillate fuel oil, a heating oil, refined-heating oil, heating oil distillate, or a refined-heating oil distillate. In certain embodiments, the one or more fuel product may include one or more of a transportation fuel, such as a high-value transportation liquid, a gasoline, a light cycle oil, a diesel fuel, a jet fuel, a liquefied petroleum gas, a heating oil distillate, a middle distillate, a high-value middle distillate, a combustible fuel, a power fuel, a generator fuel, a generator-compliant fuel, an internal combustion engine-combustible fuel, a valuable fuel or valuable fuel component, a cellulosic fuel, a cellulosic-renewable index number-compliant fuel, or a D-code-compliant fuel, in accordance with U.S. renewable fuel standard program (RFS) regulations (such as a D-code 1-compliant fuel, a D-code 2-compliant fuel, a D-code 3-compliant fuel, a D-code 4-compliant fuel, a D-code 5-compliant fuel, a D-code 6-compliant fuel, and/or a D-code 7-compliant fuel). In certain embodiments, the one or more fuel product may be a cellulosic-renewable index number-compliant fuel, or a heating oil. For example, the one or more fuel product may be a cellulosic fuel, such as a diesel fuel, a cellulosic-renewable index number qualifying-diesel fuel, a gasoline, a cellulosic-renewable identification number qualifying-gasoline, a heating oil, cellulosic-renewable index number qualifying-heating oil, a cellulosic fuel qualifying for cellulosic renewable identification numbers, or a D-code 7-compliant fuel.

In certain embodiments, the one or more fuel products may be produced via a fuel pathway specified in U.S. renewable fuel standard program (RFS) regulations for generating cellulosic renewable identification numbers. For example, the pathway may include a transportation fuel pathway, a diesel fuel pathway, a gasoline pathway, a heating oil pathway, a cellulosic fuel pathway, a cellulosic renewable identification number-compliant pathway, a pathway compliant in generating, producing, preparing, or making, a cellulosic renewable identification number-compliant fuel, or a pathway that complies with a fuel pathway specified in U.S. renewable fuel standard program (RFS) regulations for generating the cellulosic renewable identification number. For example, the one or more fuel product may be a fuel compliant with U.S. renewable fuel standard program (RFS) regulations for generating a cellulosic-renewable index number, such as a cellulosic fuel compliant with U.S. renewable fuel standard program (RFS) regulations for generating a cellulosic-renewable index number, or a co-processed refinery product suitable for substantially generating a cellulosic renewable identification number. In certain embodiments, the one or more fuel product may be prepared according to a method that may be compliant with generating one or more, such as a plurality, of cellulosic-renewable index numbers. For example, the processed fuel product may qualify for, be capable of producing, or may aid in generating, a cellulosic renewable identification number. In certain embodiments, the one or more fuel product may be exchangeable, tradable, or sellable, for a obtaining one or more cellulosic renewable identification numbers. The one or more fuel product, and the method of preparing the same, may be capable of satisfying renewable volume obligations established by U.S. renewable fuel standard program (RFS) regulations. For example, the one or more fuel product may be compliant with meeting U.S. renewable volume obligations. In certain embodiments, the one or more fuel product may be produced via a method comprising obtaining one or more cellulosic-renewable identification numbers based on the amount of fuel produced complying with, or meeting, the definition of a cellulosic fuel. For example, the cellulosic fuel may be a gasoline, a diesel, an light cycle oil, a liquefied petroleum gas, a jet fuel, or a heating oil. In certain embodiments, the method may comprise trading, selling, or exchanging one or more cellulosic-renewable identification numbers obtained from the one or more fuel product, such as a cellulosic-renewable identification number-compliant fuel having a D-code of 7, in accordance with US regulations.

In certain embodiments, a pathway for preparing a cellulosic renewable identification number-compliant fuel may comprise processing a petroleum fraction feedstock with a biocrude oil feedstock in the presence of a catalyst and one or more component additives (for example ethanol). In certain embodiments, a method for meeting renewable volume obligations (RVO) according to US RFS regulations may comprise processing a petroleum fraction feedstock with a biocrude oil feedstock in the presence of the catalyst and the one or more component additives.

In certain embodiments, for example, one or more fuel product capable of generating a cellulosic renewable identification number and/or helping meet a renewable fuel obligation may be produced according to a fuel pathway specified in U.S. Renewable Fuel Standard program regulations for generating cellulosic renewable identification numbers and may comprise, for example, processing, or co-processing, a component additive, for example a vegetable oil or an alcohol, for example ethanol. In certain further embodiments, for example, said fuel pathway may comprise processing, or co-processing, a component additive that would itself qualify under a government renewable energy program (for example a program for generating cellulosic renewable identification numbers and/or helping to meet renewable energy volume requirements) if utilized as a fuel in its own right or if blended with one or more other components to form a fuel. In certain further embodiments, for example, the use of said qualifying component additive (for example ethanol) may increase (for example proportionately increase or directly increase) a number of cellulosic renewable identification numbers generated per unit mass or per unit volume of the one or more fuel, or may increase the portion of a renewable volume obligation satisfied per unit mass or per unit volume or the one or more fuel. In certain further embodiments, for example, the renewable identification numbers (for example cellulosic renewable identification numbers) may be generated by and/or renewable energy volume obligations may be met (for example expressly met) by utilizing processing or co-processing said one or more component additives in a refinery conversion unit or other hydrocarbon conversion unit.

Certain embodiments may provide, for example, a method, a process, an apparatus, and/or a system for co-processing a plurality of reactants (for example a biocrude oil derived from a cellulosic biomass and a petroleum fraction) in a conversion unit (for example, a catalytic cracker) in the presence of one or more component additives such as ethanol. In certain embodiments, for example, the biocrude oil may be inclusive of, but not limited to, a liquid derived from thermal processing of one or more biomass, cellulosic biomass, biomass material, or biomass component. In certain embodiments, for example, the one or more component additives may comprise a fuel produced from a non-renewable resource. In certain embodiments, for example, the one or more component additives may comprise a fuel produced from a renewable resource, for example fuel such as a vegetable oil fuel, a biofuel, a biodiesel, an alcohol (for example methanol, ethanol, propanol, butanol, or pentanol), a biomass-derived ethanol, or a biomass-derived hydrogen fuel, a thermochemically produced liquid fuel, a catalytically converted biomass, or a combination of one or more of the foregoing.

In certain further embodiments, for example, the one or more biomass, cellulosic biomass, biomass materials, or biomass component, may include, but is not limited to, wood, wood residues, sawdust, slash bark, thinnings, forest cullings, begasse, corn fiber, corn stover, empty fruit bunches (EFB), fronds, palm fronds, flax, straw, low-ash straw, energy crops, palm oil, non-food-based biomass materials, crop residue, slash, pre-commercial thinnings and tree residue, annual covercrops, switchgrass, miscanthus, cellulosic containing components, cellulosic components of separated yard waste, cellulosic components of separated food waste, cellulosic components of separated municipal solid waste (MSW), or combinations thereof. Other suitable biomass materials may include, for example, those having high holocellulosic content, for example, glucose, fructose, maltose, grasses, straw, paper, pulp, pulp residues, whitewood, softwood, or partially de-lignified wood. Cellulosic biomass, for example, may include biomass derived from or containing cellulosic materials. The suitable biomass, for example, may be characterized as being compliant with U.S. renewable fuel standard program (RFS) regulations, or a biomass suitable for preparing a cellulosic-renewable identification number-compliant fuel. In certain embodiments, the biomass may be characterized as being compliant with those biomass materials specified in the pathways for a D-code 1, 2, 3, 4, 5, 6, or 7-compliant fuel, in accordance with the U.S. renewable fuel standard program (RFS) regulations. For example, the biomass may be characterized as being compliant with those biomass materials suitable for preparing a D-code 3 or 7-compliant fuel, in accordance with the U.S. renewable fuel standard program (RFS) regulations or the biomass may be characterized as being composed of only hydrocarbons (or renewable hydrocarbons).

In certain embodiments, for example, the cellulosic biomass may have a cellulosic content in the range of 15-95 wt. % cellulose, for example a cellulosic content in the range of 25-30 wt. %, 30-40 wt. %, 40-50 wt. %, 50-60 wt. %, 60-70 wt. %, 70-80 wt. %, 20-75 wt. %, 20-50 wt. %, 25-50 wt. %, 25-35 wt. %, 25-95 wt. %, 30-95 wt. %, 35-95 wt. %, or a cellulosic content in the range of 40-95 wt. % cellulose. In certain embodiments, for example, the cellulosic biomass may have a cellulosic content in the range of 95-100 wt. % cellulose. In certain further embodiments, for example, said cellulosic biomass may be a pre-processed cellulosic biomass, for example a cellulosic biomass pre-processed to enrich its cellulosic content, for example to enrich its cellulosic content by 1-10%, 10-25%, 25-50%, or to enrich its cellulosic content by 50-75%.

In certain embodiments, for example, the cellulosic biomass may have a hemicellulosic content in the range of 15-95 wt. % hemicellulose, for example a hemicellulosic content in the range of 25-30 wt. %, 30-40 wt. %, 40-50 wt. %, 50-60 wt. %, 60-70 wt. %, 70-80 wt. %, 20-75 wt. %, 20-50 wt. %, 25-50 wt. %, 25-35 wt. %, 25-95 wt. %, 30-95 wt. %, 35-95 wt. %, or a hemicellulosic content in the range of 40-95 wt. % hemicellulose. In certain embodiments, for example, the cellulosic biomass may have a hemicellulosic content in the range of 95-100 wt. % hemicellulose. In certain further embodiments, for example, said cellulosic biomass may be a pre-processed cellulosic biomass, for example a cellulosic biomass pre-processed to enrich its hemicellulosic content, for example to enrich its hemicellulosic content by 1-10%, 10-25%, 25-50%, or to enrich its holocellulosic content by 50-75%.

In certain embodiments, for example, the cellulosic biomass may have a holocellulosic content in the range of 25-99 wt. % holocellulose, for example a holocellulosic content in the range of 25-30 wt. %, 30-40 wt. %, 40-50 wt. %, 50-60 wt. %, 60-70 wt. %, 70-80 wt. %, 25-75 wt. %, 25-65 wt. %, 30-65 wt. %, 50-75 wt. %, 30-95 wt. %, 35-95 wt. %, 40-95 wt. %, or a holocellulosic content in the range of 50-95 wt. % holocellulose. In certain embodiments, for example, the cellulosic biomass may have a holocellulosic content in the range of 90-100 wt. % holocellulose. In certain further embodiments, for example, said cellulosic biomass may be a pre-processed cellulosic biomass, for example a cellulosic biomass pre-processed to enrich its holocellulosic content, for example to enrich its holocellulosic content by 1-10%, 10-25%, 25-50%, or to enrich its holocellulosic content by 50-75%.

In certain embodiments, for example, the cellulosic biomass may have a lignin content in the range of 2-25 wt. % lignin, for example a lignin content in the range of 2-5 wt. %, 5-9 wt. %, 10-15 wt. %, 15-18 wt. %, 18-20 wt. %, 20-22 wt. %, 22-25 wt. %, 2-20 wt. %, 10-20 wt. %, or a lignin content in the range of 20-25 wt. % lignin. In certain embodiments, for example, the cellulosic biomass may have a lignin content in the range of 0-2 wt. % lignin. In certain further embodiments, for example, said cellulosic biomass may be a pre-processed cellulosic biomass, for example a cellulosic biomass pre-processed to reduce its lignin content, for example to reduce its lignin content by 1-10%, 10-25%, 25-50%, 50-75%, or to reduce its lignin content by 75-99.9%.

In certain embodiments, for example, the cellulosic biomass may have a relatively high holocellulosic content (for example, in the range of 50-60 wt. % holocellulose, for example 60-70 wt. %, 70-80 wt. %, 25-75 wt. % or in a high holocellusoic content in the range of 50-99 wt. % holocellulosic) and/or a low lignin content (for example, in the range of 0.01-15 wt. % lignin, for example 0.01-10 wt. %, 3-15 wt. %, 5-15 wt. %, 5-10 wt. %, 8-12 wt. %, or a lignin content in the range of 5-12 wt. % lignin). In certain further embodiments, for example, said cellulosic biomass may be pre-mixed with a petroleum-based material prior to co-processing with a petroleum fraction.

In certain embodiments, for example, the cellulosic biomass may be relatively rich in sugars and or alcohols. In certain further embodiments, for example, a sugar rich cellulosic biomass may have a sugar content in the range of 0.1-30 wt. % of one or more sugar, for example a sugar content in the range of 1-4 wt. %, 4-7 wt. %, 7-10 wt. %, 10-13 wt. %, 13-17 wt. %, 17-20 wt. %, 20-23 wt. %, 23-25 wt. %, 25-28 wt. %, 28-30 wt. %, 5-10 wt. %, 5-20 wt. %, or in the range of 15-25 wt. % of one or more sugar, including, but not limited to, for example, sucrose, glucose, and/or fructose. In certain further embodiments, the one or more sugar may be present in the cellulosic biomass when harvested. In certain embodiments, the one or more sugar may form in the cellulosic biomass due to aging and/or treatment of the cellulosic biomass.

In certain embodiments, for example, an alcohol rich cellulosic biomass oil may have an alcohol content in the range of 0.1-20 wt. % of one or more alcohol, for example an alcohol content in the range of 1-2 wt. %, 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, or in the range of 15-20 wt. % of one or more alcohol. In certain further embodiments, the one or more alcohol may be methanol, ethanol, propanol, butanol, or pentanol. In certain further embodiments, the one or more alcohol may be present in the cellulosic biomass when harvested. In certain embodiments, the one or more alcohol may form in the cellulosic biomass due to aging and/or treatment of the cellulosic biomass. In certain embodiments, the one or more alcohol may be added to the cellulosic biomass, for example by soaking the cellulosic biomass in a liquid containing said one or more alcohol (for example, a liquid consisting of the one or more alcohol).

In certain embodiments, for example, a biocrude oil co-processed with a petroleum fraction and a component additive in a catalytic cracker may be derived from the conversion (for example thermal or catalytic conversion) of a biomass. In certain embodiments, for example, the biocrude oil may be a cellulosic biocrude oil derived or prepared from the conversion of cellulosic-containing biomass. In certain embodiments, for example, the conversion may comprise one or more of thermal conversion (for example fast pyrolysis); thermo-mechanical conversion (for example grinding a solid biomass followed by fast pyrolysis); thermo-catalytic conversion; or catalytic conversion. In certain embodiments, for example, a cellulosic biocrude oil feedstock for co-processing with a petroleum fraction and one or more component additives may comprise a blend of two or more biocrude oils derived from conversion according to one or more of the foregoing conversion methods.

In certain embodiments, for example, the biocrude oil may be non-hydrodeoxygenated (non-HDO), non-deoxygenated, non-upgraded, thermally-processed, rapid thermally-processed, thermo-mechanically-processed, rapid thermo-mechanically-processed, non-hydrotreated, conditioned, and/or combinations thereof. In certain embodiments, for example, the biocrude oil may be a non-hydrodeoxygenated (non-HDO) biocrude oil; a non-HDO, non-deoxygenated biocrude oil; a rapid thermo-mechanically-processed, non-hydrotreated biocrude oil; or a non-deoxygenated, non-upgraded, thermally-processed biocrude oil. In certain embodiments, for example, the biocrude oil may be a non-hydrodeoxygenated, non-deoxygenated, non-hydrotreated, non-upgraded, non-catalytically processed, thermo-mechanically-processed biocrude oil, said biocrude oil formed by mechanically grinding a biomass (for example a cellulosic biomass) and then thermally processing the ground biomass (for example by rapid thermal processing) to derive a liquid with no further processing steps to substantially alter the oxygen content, the water content, the sulfur content, the nitrogen content, the solids content or to otherwise enrich the biocrude oil for processing and/or co-processing into one or more fuel products. In certain further embodiments, for example, said non-hydrodeoxygenated, non-deoxygenated, non-hydrotreated, non-upgraded, non-catalytically processed, thermo-mechanically-processed biocrude oil may be blended with other batches of non-hydrodeoxygenated, non-deoxygenated, non-hydrotreated, non-upgraded, non-catalytically processed, thermo-mechanically-processed biocrude oil and/or other non-hydrodeoxygenated, non-deoxygenated, non-hydrotreated, non-upgraded, non-catalytically processed, thermo-mechanically-processed biocrude oil derived from one or more other biomass to form a blended feedstock for co-processing with a petroleum fraction and one or more component additives (for example ethanol).

In certain embodiments, the biomass may be pre-treated prior to conversion (said conversion inclusive of any one or more of the foregoing conversion methods), for example pre-treatment of a cellulosic biomass by one or more of water washing, drying, and mixing with an alcohol. In certain further embodiments, for example, the water wash may be effective to reduce one or more of the metal content, the ash content, and the chlorine content of the biocrude oil. In certain further embodiments, for example, the water wash pre-treatment may be effective to reduce the metal content of the biocrude oil by 1-99%, for example by 1-10%, 10-25%, 25-50%, 50%-75%, or the water wash pre-treatment may be effective to reduce the metal content of the biocrude oil by 75-99%. In certain embodiments, for example, the water wash pre-treatment may be effective to reduce the chlorine content of the biocrude oil by 1-99%, for example by 1-10%, 10-25%, 25-50%, 50%-75%, or the water wash pre-treatment may be effective to reduce the chlorine content of the biocrude oil by 75-99%. In certain embodiments, for example, the pre-treatment may be effective to reduce the ash content of the biocrude oil by 1-99%, for example by 1-10%, 10-25%, 25-50%, 50%-75%, or the water wash pre-treatment may be effective to reduce the ash content of the biocrude oil by 75-99%.

In certain embodiments, for example, the biocrude oil formed by any one or more of the foregoing conversion methods may be conditioned for introduction to a petroleum conversion unit, for example a catalytic cracker, for example for co-processing with a petroleum fraction in a catalytic cracker. In certain further embodiments, said biocrude oil (or biocrude oil blend) may be conditioned by mixing with one or more component additives, for example an alcohol (such as ethanol, for example) or a vegetable oil. In certain further embodiments, said biocrude oil (or biocrude oil blend) may be conditioned by addition of a chelating agent (for example oxalic acid) followed by filtration.

In certain embodiments, for example, the biocrude oil may be an unenriched liquid formed by non-catalytic processing of a cellulosic biomass, wherein each processing step is thermal and/or mechanical in nature. In certain embodiments, for example, the process may be a therma-mechanical process (for example specifically comprising grinding and rapid thermal processing, with no post processing or enrichment of the liquid prior to introduction into petroleum conversion unit and exclusive of hydrodeoxygenation, hydrotreating, and catalytic exposure). In certain further embodiments, the cellulosic biomass may undergo one or more of the foregoing pre-treatment methods, and/or the unenriched liquid may undergo one of the foregoing conditioning steps, and the resulting unenriched liquid may be considered an unenriched liquid biocrude oil.

In certain embodiments, for example, the biocrude oil may be derived from rapid thermal processing of one or more cellulosic biomass. In certain further embodiments, for example, the rapid thermal processing may utilize a reactor, for example a reactor selected from among an upflow reactor, an entrained down-flow reactor, an ablative reactor, a transport bed reactor, a fluidized bed reactor, a screw reactor, an auger-type reactor, and a rotating cone reactor. Other reactor configurations are contemplated herein.

In certain embodiments, the biocrude oil may be derived from catalytic rapid thermal processing (for example heating under low oxygen conditions in the presence of a catalyst) of one or more cellulosic biomass (for example one or more type of cellulosic biomass, such as two types of wood or two different portions of a wood source). In certain embodiments, the biocrude oil may be derived from non-catalytic rapid thermal processing of one or more cellulosic biomass (for example one or more type of cellulosic biomass, such as two types of wood or two different portions of a wood source). For example, U.S. Pat. No. 7,905,990 entitled "Rapid Thermal Conversion of Biomass," which is hereby incorporated by reference in its entirety into this specification as if stated in full, describes non-catalytic rapid thermal processing of a biomass. FIG. 1 of U.S. Pat. No. 7,905,990 illustrates a rapid thermal process system including biomass feed system 15 that injects biomass into reactor 30, heat carrier separation system 43 that separates the heat carrier from product vapour and recycles the heat carrier to reheating/regenerating system 47, particulate inorganic heat carrier reheating system 47 that reheats and regenerates the heat carrier, and primary condenser 50 and optionally secondary condenser (50) that may provide a primary condenser biocrude oil and a secondary condenser biocrude oil, respectively. In certain further embodiments, the rapid thermal process system may further comprise demister(s) 70, filter(s) 80, and/or an electrostatic precipitator. In certain further embodiments, a biocrude oil fraction may be obtained from one or more of the demister, filter, and/or electrostatic precipitator. In certain embodiments, a component additive may be added to one or more biocrude oil fraction obtained from the rapid thermal process, for example one or more of the foregoing biocrude oil fraction. In certain embodiments, for example, the component additive may comprise an alcohol component additive such as ethanol added at 2-12 wt. % or a vegetable oil, for example a vegetable oil added at 5-30 wt. %, said weight percentages relative to the weight of the one or more biocrude oil fraction).

In certain embodiments, for example, the primary condenser biocrude oil may be co-processed with one or more component additives and a petroleum fraction in a catalytic cracker or other petroleum conversion unit. In certain embodiments, for example, the secondary condenser biocrude oil may be co-processed with one or more component additives and a petroleum fraction in a catalytic cracker or other petroleum conversion unit. In certain embodiments, for example, a portion of the primary condenser biocrude oil may be blended with a portion of the secondary condenser biocrude oil, and the blended biocrude oil may be co-processed with one or more component additives and a petroleum fraction in a catalytic cracker. In certain further embodiments, said blended biocrude oil has a primary condenser biocrude oil to secondary condenser biocrude oil ratio in the range of 0.05:1-20:1, for example a ratio in the range of 0.05:1-0.1:1, 0.1:1-0.25:1, 0.25:1-0.5:1, 0.5:1-0.75:1, 0.8:1-1.2:1, 0.95:1-1.05:1, 1:1-1.3:1, 1.3:1-2:1, 2:1-4:1, 4:1-10:1, or a ratio in the range of 10:1-20:1. In certain embodiments, for example, a component additive may be mixed with the primary, secondary, or blended biocrude oil (for example a component additive such as ethanol may be mixed with a biocrude oil, such as for example 0.5-5 wt. % ethanol relative to the weight of the biocrude with which it is mixed).

In certain embodiments, for example, a biocrude oil may be formed by non-catalytic rapid thermal processing according to one or more of the procedures described in U.S. Pat. Nos. 7,905,990, 5,961,786, and 5,792,340, each of which is incorporated by reference in their entirety. In certain embodiments, for example, rapid thermal processing (for example non-catalytic rapid thermal processing) of a cellulosic biomass feedstock (for example a ground cellulosic biomass) may yield a liquid biocrude oil having a weight percentage of at least 50 wt. %, for example at least 60 wt. %, at least 70 wt. %, at least 75 wt. %, at 80 wt. % or at least 85 wt. %, relative to the total weight of the processed biomass. In certain embodiments, for example, rapid thermal processing (for example non-catalytic rapid thermal processing) of a cellulosic biomass feedstock (for example a ground cellulosic biomass) may yield a liquid biocrude oil having a weight percentage in the range of 50-95 wt. %, for example 50-60 wt. %, 60-70 wt. %, 70-75 wt. %, 75-80 wt. %, 80-85 wt. % or in the range of 85-95 wt. %, relative to the total weight of the processed biomass.

In certain embodiments, for example, one or more components of a liquid biocrude oil product (for example the whole liquid biocrude oil product, a portion of the whole liquid biocrude oil product, a primary condenser biocrude oil liquid product, or a secondary condenser biocrude oil liquid product) of the rapid thermal processing may undergo mechanical separation to obtain a biocrude oil feedstock for use in co-processing with one or more component additives and a petroleum fraction. In certain further embodiments, the mechanical separation may comprise, for example, centrifugation, continuous centrifugation, filtration, high-pressure filtration, vacuum filtration, settling, decanting, phase separation and/or a combinations of one or more of the foregoing. In certain further embodiments, for example, said mechanical separation may yield a low molecular weight biocrude oil, a reduced viscosity biocrude oil, and/or a biocrude oil that is more thermally labile than the one or more components of the liquid biocrude oil product from which it is derived.

In certain embodiments, for example, a liquid biocrude oil product (for example, a whole liquid product of rapid thermal processing or catalytic processing) may be phase separated to provide a predominately non-aqueous biocrude oil fraction that may be coprocessed with one or more component additives and a petroleum fraction in a conversion unit (for example a refinery conversion unit).

In certain embodiments, for example, rapid thermal processing (for example catalytic or non-catalytic rapid thermal processing) may comprise, for example, forming a reduced-volatility biocrude oil by passing a biocrude oil through one or more of a wiped film evaporator, a falling film evaporator, a flash column, a packed column, and a devolatilization vessel or tank. In certain further embodiments, the reduced-volatility biocrude oil may have a reduced content of one or more select component (for example one or more phenolic compound) relative to the content of said one or more component present in the biocrude oil. In certain further embodiments, for example, the reduced-volatility biocrude oil may have a total content of phenolic compounds that is reduced by an amount in the range of 10-25 wt. %, 25-50 wt. %, 50-75 wt. %, or a total content of phenolic compounds content that is reduced by an amount in the range of 75-95 wt. %, relative to the total content of phenolic compounds of the biocrude oil. In certain embodiments, for example, the reduced volatility biocrude oil may have a flash point of greater than 60° C. as measured by the Pensky-Martens closed cup flash point tester (e.g. ASTM D-93), for example a flash point greater than 65° C., 70° C., 75° C., 80° C., 85° C., 90° C., or a flash point greater than 100° C. as measured by the Pensky-Martens closed cup flash point tester (e.g. ASTM D-93). In certain embodiments, for example, the reduced volatility biocrude oil may have a flash point in the range of 60-100° C. as measured by the Pensky-Martens closed cup flash point tester (e.g. ASTM D-93), for example a flash point in the range of 65-100° C., 70-100° C., 75-100° C., 80-100° C., 85-100° C., 90-100° C., or a flash point greater than 75-90° C. as measured by the Pensky-Martens closed cup flash point tester (e.g. ASTM D-93).

In certain embodiments, for example, a biocrude oil suitable for co-processing with one or more component additives and a petroleum fraction may be formed by rapid thermal processing of a cellulosic biomass, for example forming the biocrude oil by catalytic or non-catalytic rapid thermal processing of the cellulosic biomass. In certain embodiments, for example, the rapid thermal processing may comprise pre-treating the cellulosic biomass. In certain further embodiments, for example, the pre-treatment of the cellulosic biomass may comprise one or more mechanical pre-treatment, said one or more mechanical pre-treatment may be inclusive of, but may not be limited to drying at least a portion of the cellulosic biomass; grinding at least a portion of the cellulosic biomass; removing fines from at least a portion of the cellulosic biomass; removing tramp metal from at least a portion of the cellulosic biomass; sizing at least a portion of the cellulosic biomass; removing ferrous metals from at least a portion of the cellulosic biomass; removing portions of ash from at least a portion of the cellulosic biomass; filtering at least a portion of the cellulosic biomass; screening at least a portion of the cellulosic biomass; cycloning at least a portion of the cellulosic biomass; mechanically manipulating at least a portion of the cellulosic biomass to remove a substantial portion of solid content therefrom; contacting at least a portion of the cellulosic biomass with a magnet; passing at least a portion of the cellulosic biomass through a magnetic field; or combinations of two or more of the foregoing. Other mechanical pre-treatments of the cellulosic biomass are contemplated herein.

In certain further embodiments, for example, incorporating the one or more mechanical pre-treatment in rapid thermal processing may be effective to reduce the water content of the cellulosic biomass by an amount in the range of 1-99%, for example in the range of 1-10%, 10-25%, 25-50%, 50%-75%, or incorporating the one or more mechanical pre-treatment in rapid thermal processing may be effective to reduce the water content of the cellulosic biomass by an amount in the range of 75-99%. In certain further embodiments, for example, incorporating the one or more mechanical pre-treatment in rapid thermal processing may be effective to reduce the average particle size of the cellulosic biomass by an amount in the range of 1-99%, for example in the range of 1-10%, 10-25%, 25-50%, 50%-75%, or incorporating the one or more mechanical pre-treatment in rapid thermal processing may be effective to reduce the average particle size of content of the cellulosic biomass by an amount in the range of 75-99%. In certain further embodiments, for example, incorporating the one or more mechanical pre-treatment in rapid thermal processing may be effective to reduce the fines content of the cellulosic biomass by an amount in the range of 1-99%, for example in the range of 1-10%, 10-25%, 25-50%, 50%-75%, or incorporating the one or more mechanical pre-treatment in rapid thermal processing may be effective to reduce the fines content of the cellulosic biomass by an amount in the range of 75-99%. In certain further embodiments, for example, incorporating the one or more mechanical pre-treatment in rapid thermal processing may be effective to reduce the tramp metal content of the cellulosic biomass by an amount in the range of 1-99%, for example in the range of 1-10%, 10-25%, 25-50%, 50%-75%, or incorporating the one or more mechanical pre-treatment in rapid thermal processing may be effective to reduce the tramp metal content of the cellulosic biomass by an amount in the range of 75-99%. In certain further embodiments, for example, incorporating the one or more mechanical pre-treatment in rapid thermal processing may be effective to reduce the ferrous metal content of the cellulosic biomass by an amount in the range of 1-99%, for example in the range of 1-10%, 10-25%, 25-50%, 50%-75%, or incorporating the one or more mechanical pre-treatment in rapid thermal processing may be effective to reduce the ferrous metal content of the cellulosic biomass by an amount in the range of 75-99%.

In certain embodiments, the pre-treatment of the cellulosic biomass may comprise contacting the cellulosic biomass with water and/or one or more alcohol, said one or more alcohol inclusive of but not limited to methanol, ethanol, propanol, isopropyl alcohol, glycerol, butanol, and a combination of two or more of the foregoing. In certain further embodiments, the pre-treated cellulosic biomass may be partially or completely saturated with the one or more alcohol (for example in the range of 5-100% saturated, for example 5-10%, 10-25%, 25-50%, 50-75%, or in the range of 75-100% saturated at ambient conditions) by addition of the on or more alcohol.

In certain embodiments, the pre-treatment of the cellulosic biomass may comprise washing the cellulosic biomass with water. In certain further embodiments, for example, the water wash pre-treatment may be effective to reduce one or more of the metal content, the ash content, and the chlorine content of the biocrude oil. In certain embodiments, for example, incorporating the water wash pre-treatment in the rapid thermal processing may be effective to reduce the metal content of the biocrude oil by an amount in the range of 1-99%, for example by an amount in the range of 1-10%, 10-25%, 25-50%, 50%-75%, or incorporating the water wash pre-treatment in the rapid thermal processing may be effective to reduce the metal content of the biocrude oil by an amount in the range of 75-99%. In certain further embodiments, for example, incorporating the water wash pre-treatment in the rapid thermal processing may be effective to reduce the chlorine content of the biocrude oil by an amount in the range of 1-99%, for example by an amount in the range of 1-10%, 10-25%, 25-50%, 50%-75%, or incorporating the water wash pre-treatment in the rapid thermal processing may be effective to reduce the chlorine content of the biocrude oil by an amount in the range of 75-99%. In certain further embodiments, incorporating the water wash pre-treatment in the rapid thermal processing may be effective to reduce the ash content of the biocrude oil by an amount in the range of 1-99%, for example by an amount in the range of 1-10%, 10-25%, 25-50%, 50%-75%, or incorporating the water wash pre-treatment in the rapid thermal processing may be effective to reduce the ash content of the biocrude oil by an amount in the range of 75-99%.

In certain embodiments, for example, a biocrude oil suitable for co-processing with one or more component additives and a petroleum fraction may be formed by rapid thermal processing of a cellulosic biomass, for example forming the biocrude oil catalytic or non-catalytic rapid thermal processing of the cellulosic biomass. In certain embodiments, for example, the rapid thermal processing may comprise conditioning a biocrude oil with a metal chelating agent, for example oxalic acid. In certain embodiments, for example, the biocrude oil contacted with the chelating agent may be a biocrude oil vapor. In certain embodiments, for example, the biocrude oil contacted with the chelating agent may be a liquid biocrude oil formed by liquefying a biocrude oil vapor (for example by condensing and/or quenching) or solubilizing the a biocrude oil vapor. In certain embodiments, for example, the biocrude oil contacted with the chelating agent may be a liquid biocrude oil fraction obtained from a first condenser, a second condenser, a quencher, a filter, a demister, a storage tank, or other unit operation present in a rapid thermal processing system, or a mixture or blend of one or more of the foregoing fractions. In certain embodiments, for example, the chelating agent contacted with the biocrude oil may have a weight percentage in the range of 0.05-5 wt. % relative to the weight of the biocrude oil, for example a weight percentage in the range of 0.05-0.1 wt. %, 0.1-0.25 wt. %, 0.25-0.5 wt. %, 0.5-0.75 wt. %, 0.75-1.0 wt. %, 1.0-1.5 wt. %, 1.5-2.5 wt. %, or a weight percentage in the range of 2.5-5 wt. % relative to the weight of the biocrude oil.

In certain embodiments, for example, incorporating the chelating agent conditioning in the rapid thermal processing may be effective to reduce the metal content of the biocrude oil by an amount in the range of 1-99%, for example by an amount in the range of 1-10%, 10-25%, 25-50%, 50%-75%, or incorporating the chelating agent conditioning in the rapid thermal processing may be effective to reduce the metal content of the biocrude oil by an amount in the range of 75-99%.

In certain embodiments, for example, incorporating the chelating agent conditioning in the rapid thermal processing may be effective to reduce the ash content of the biocrude oil by an amount in the range of 1-99%, for example by an amount in the range of 1-10%, 10-25%, 25-50%, 50%-75%, or incorporating the chelating agent conditioning in the rapid thermal processing may be effective to reduce the ash content of the biocrude oil by an amount in the range of 75-99%.

In certain further embodiments, for example, the chelating agent contacted biocrude oil may be filtered to remove solids (for example complexed metal flocculant solids). In certain embodiments, a rapid thermal processing system may comprise a chelating system, said chelating system comprising a chelating agent (for example oxalic acid), at least one chelating agent mixing vessel, and at least one filter positioned downstream of at least one of the at least one chelating agent mixing vessel.

In certain embodiments, for example, a biocrude oil suitable for co-processing with one or more component additives and a petroleum fraction may be formed by rapid thermal processing of a cellulosic biomass, for example forming the biocrude oil catalytic or non-catalytic rapid thermal processing of the cellulosic biomass. In certain embodiments, for example, the rapid thermal processing may comprise conditioning a biocrude oil by mixing the biocrude oil with one or more alcohol, for example ethanol. In certain embodiments, for example, the biocrude oil contacted with the one or more alcohol a biocrude oil vapor. In certain further embodiments, the one or more alcohol may be added to one or more of a rapid thermal processing reactor (for example an upflow reactor or any of the other types of reactors contemplated herein), a pyrolysis gases transfer line, a condensing chamber, or a quench tower present in the rapid thermal process. In certain embodiments, for example, the biocrude oil contacted with the one or more alcohol may be a liquid biocrude oil formed by liquefying a biocrude oil vapor (for example by condensing and/or quenching) or solubilizing the a biocrude oil vapor. In certain embodiments, for example, the biocrude oil contacted with the one or more alcohol may be a liquid biocrude oil fraction obtained from a first condenser, a second condenser, a quencher, a filter, a demister, a storage tank, or other unit operation present in the rapid thermal process, or a mixture or blend of one or more of the foregoing fractions. In certain further embodiments, the one or more alcohol may be introduced to one or more of the first condenser, the second condenser, the quencher, the filter, the demister, the storage tank, or other unit operation present in the rapid thermal process.

In certain embodiments, the weight percentage of the one or more alcohol added to the biocrude oil may be in the range of 0.1-20 wt. %, for example, in the range of 1-2 wt. %, 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, or in the range of 15-20 wt. % of the one or more alcohol, for example one or more isomers of methanol, ethanol, propanol, butanol, or pentanol, relative to the weight of the biocrude oil (inclusive of the added one or more alcohol). In certain further embodiments, for example, the one or more alcohol may have a molecular weight of less than 100 g/mol, for example a molecular weight in the range of 80-100 g/mol, 65-80 g/mol, 50-65 g/mol, 40-50 g/mol, or in the range of 35-40 g/mol, or less than 38 g/mol, less than 47 g/mol, less than 61 g/mol, less than 75 g/mol, or less than 89 g/mol. In certain embodiments, for example, at least 75 wt. % of the one or more alcohol may comprise one or more primary and/or secondary alcohols with a molecular weight, for example, of less than 100 g/mol. In certain embodiments, for example, the one or more alcohol may have a viscosity of less than 2 cP at a temperature of 27° C.

In certain embodiments, for example, the addition of the one or more alcohol may be effective to cap at least a portion of the organic acids present in the biocrude oil. In certain embodiments, for example, the addition of the one or more alcohol may be effective to increase the pH of the biocrude oil, for example from a pH in the range of 1.5-3 to a pH in the range of 3-8, for example a pH in the range of 3-5.

Certain embodiments, for example, may provide a method comprising one or more of the following steps: pre-treating a cellulosic biomass (for example by water washing the cellulosic biomass); forming a biocrude oil by rapid thermal processing of the cellulosic biomass (for example a whole biocrude oil or a fractional oil obtained from a condenser); conditioning the biocrude oil (for example by adding one or more alcohol to the biocrude oil); and/or forming one or more fuel product (for example a cellulosic renewable identification number eligible fuel product) comprising co-processing the pre-treated, conditioned biocrude oil with a petroleum fraction (for example a vacuum gas oil) in the presence of a component additive (for example ethanol and/or a vegetable oil) in a conversion unit (for example a catalytic cracker in a refinery). In certain further embodiments, for example, the rapid thermal processing may comprise controlling pre-treatment of the biomass and/or the conditioning of the biocrude oil to form a biocrude oil compliant with a specification, said specification comprising an ash content in a range of between 0.005 wt. % and 0.5 wt. %; a pH in a range of 3-8, for example a pH in the range of 3-5; and a water content in a range of 0.05-30 wt. %, for example a water content in a range of 5-10 wt. %, 10-15 wt. %, or a water content in the range of 15-25 wt. %, relative to the weight of the biocrude oil inclusive of the water content. In certain embodiments, the petroleum fraction may be a vacuum gas oil.

Certain embodiments, for example, may provide methods, systems, and/or apparatuses for co-processing a biocrude oil with a petroleum fraction in the presence of a component additive in a conversion unit. In certain embodiments, for example, the biocrude oil may have a pH in the range of 0.5-8, for example the biocrude oil may have a pH in the range of 0.5-7, 0.5-6.5, 1-6, 2-5, 3-7, 1 to 4, or 2 to 3.5. In certain embodiments, for example, the pH of the biocrude oil may be less than 8, for example less than 7, less than 6.5, less than 6, less than 5.5, less than 5, less than 4.5, less than 4, less than 3.5, less than 3, less than 2.5, or less than 2. In certain embodiments, for example, the pH of the biocrude oil may be altered or modified by the addition of an external, non-biomass derived material or pH altering agent, for example ethanol. In certain embodiments, for example, the biocrude oil may be acidic, for example the biocrude oil may have a pH in the range of 0.5-7, for example 1-7, 1-6.5, 2-5, 2-3.5, 1-4, 2-6, or the biocrude oil may have a pH in the range of 2-5. In certain embodiments, the biocrude oil has the pH resulting from the conversion of the biomass from which it may be derived, such as a biomass-derived pH.

In certain embodiments, the biocrude oil may have a solids content of less than 5 wt. % on a moisture-free basis, for example the biocrude oil may have a solids content of less than 4 wt. %, less than 3 wt. %, less than 2.5 wt. %, less than 2 wt. %, less than 1 wt. %, less than 0.5 wt. %, or less than 0.1 wt. % on a moisture-free basis. In certain embodiments, the biocrude oil may have a solids content in the range 0.005-5 wt. % on a moisture-free basis, for example the biocrude oil may have a solids content in the range of 0.005-4 wt. %, 0.005-3 wt. %, 0.005-2.5 wt. %, 0.005-2 wt. %, 0.005-1 wt. %, 0.005-0.5 wt. %, 0.05-4 wt. %, 0.05-2.5 wt. %, 0.05-1 wt. %, 0.05-0.5 wt. %, 0.5-3 wt. %, 0.5-1.5 wt. %, or the biocrude oil may have a solids content in the range of 0.5-1 wt. % on a moisture-free basis.

In certain embodiments, the biocrude oil may have an ash content of less than 0.5 wt. % on a moisture-free basis, for example the biocrude oil may have an ash content of less than 0.4 wt. %, less than 0.3 wt. %, less than 0.2 wt. %, less than 0.1 wt. %, less than 0.05 wt. %, less than 0.005 wt. %, or the biocrude oil may have an ash content of less than 0.0005 wt. % on a moisture-free basis. In certain embodiments, the biocrude oil may have an ash content in the range of 0.0005-0.5 wt. % on a moisture-free basis, for example the biocrude oil may have an ash content in the range of 0.0005-0.2 wt. %, 0.0005-0.05 wt. %, or the biocrude oil may have an ash content in the range of 0.0005-0.1 wt. % on a moisture-free basis.

In certain embodiments, the biocrude oil may comprise a water content in the range of 5-40 wt. %, for example the biocrude oil may comprise a water content in the range of 5-35 wt. %, 5-15 wt. %, 5-10 wt. %, 10-15 wt. %, 15-35 wt. %, 15-30 wt. %, 20-35 wt. %, 20-30 wt. %, 30-35 wt. %, 25-30 wt. %, or a water content in the range of 20-27 wt. %. In certain embodiments, the biocrude oil may comprise a water content of less than 40 wt. %, for example less than 35 wt. %, or a water content of less than 30 wt. %. In certain embodiments, the biocrude oil may comprise a water content of at least 10 wt. %, such as at least 15 wt. %, at least 20 wt. %, or a water content of at least 25 wt. %. In certain embodiments, for example, the biocrude oil may comprise a water content of less than 20 wt % (for example a water content in the range of 10-20 wt. % and a total content of methanol, ethanol, butanol, and pentanol of at least 5 wt. % (for example a total content in the range of 5-10 wt. %). In certain further embodiments, for example, the biocrude oil may comprise a water content in the range of less than 15 wt. % (for example a water content in the range of 5-15 wt. %) and a total content of methanol, ethylene glycol, ethanol, butanol, and pentanol of at least 2 wt. % (for example a total content in the range of 3-8 wt. %).

In certain embodiments, the biocrude oil may comprise an oxygen content level higher than that of a petroleum fraction feedstock. For example, the biocrude oil may have an oxygen content level of greater than 20 wt. %, on a dry basis or moisture-free basis, such as an oxygen content level in the range of between 20-50 wt. %, between 35-40 wt. %, between 25-35 wt. %, between 20-30 wt. %, between 25-50 wt. %, between 20-40 wt. %, or between 20-35 wt. %, on a moisture-free basis.

In certain embodiments, the biocrude oil may comprise a greater oxygen content level than carbon content level. For example, the biocrude oil may have a greater oxygen content level than carbon content level, on a moisture-containing basis. In certain embodiments, the biocrude oil may have in the range of between 35-80 wt. % carbon content and in the range of between 20-50 wt. % oxygen content, on a dry basis or moisture-free basis. For example, the biocrude oil may have in the range of between 50-60 wt. % carbon content and in the range of between 35-40 wt. % oxygen content, on a dry basis or moisture-free basis.

In certain embodiments, for example, the biocrude oil may comprise a carbon content level of at least 40 wt. % of the carbon content contained in the biomass from which it may be derived. For example, the biocrude oil may comprise a carbon content level of at least 45 wt. %, such as at least 50 wt. %, at least 55 wt. %, at least 60 wt. %, at least 65 wt. %, at least 70 wt. %, at least 75 wt. %, at least 80 wt. %, at least 85 wt. %, at least 90 wt. %, or at least 95 wt. % of the carbon content contained in the biomass from which it may be derived. In certain embodiments, the biocrude oil may comprise a carbon content level in the range of between 40 wt. % and 100 wt. % of the carbon content contained in the biomass from which it may be derived. For example, the biocrude oil may comprise a carbon content level in the range of between 40 wt. % and 95 wt. %, between 40 wt. % and 90 wt. %, between 40 wt. % and 80 wt. %, between 50 wt. % and 90 wt. %, between 50 wt. % and 75 wt. %, between 60 wt. % and 90 wt. %, between 60 wt. % and 80 wt. %, between 70 wt. % and 95 wt. %, between 70 wt. % and 80 wt. %, or between 70 wt. % and 90 wt. % of the carbon content contained in the biomass from which it may be derived. In certain embodiments, the biocrude oil may comprise a carbon content level lower than that of a petroleum fraction feedstock. For example, the biocrude oil may comprise a carbon content level in the range of between 35-80 wt. %, on a dry basis moisture-free basis, such as between 40-75 wt. %, between 45-70 wt. %, between 50-65 wt. %, between 50-60 wt. %, or between 54-58 wt. %, on a dry basis or moisture-free basis.

In certain embodiments, for example, the biocrude oil may have an alcohol content of less than 10 wt. % on a moisture-free basis, for example the biocrude oil may have an alcohol content of less than 8 wt. %, less than 6 wt. %, less than 5 wt. %, less than 4 wt. %, less than 3 wt. %, less than 2 wt. %, or the biocrude oil may have an alcohol content of less than 1 wt. % on a moisture-free basis. In certain embodiments, for example, the biocrude oil may have an alcohol content in the range of 0.5-10 wt. % on a moisture-free basis, for example an alcohol content in the range of 1-8 wt. %, 1-6 wt. %, 1-3.5 wt. %, 2-4 wt. %, or an alcohol content in the range of 2-3 wt. % on a moisture-free basis. In certain embodiments, for example, the biocrude oil may have an alcohol content of at least 1 wt. % on a moisture-free basis, for example the biocrude oil may have an alcohol content of at least 2 wt. %, at least 3 wt. %, at least 4 wt. %, at least 5 wt. %, at least 6 wt. %, at least 7 wt. %, or the biocrude oil may have an alcohol content of at least 8 wt. % on a moisture-free basis. In certain embodiments, for example, the alcohol content measurement may be exclusive of phenols. In certain embodiments, for example, the alcohol content may be measured as the total content of methanol, ethanol, ethylene glycol, propanol, butanol, and pentanol present in the biocrude oil, on a moisture-free basis. In certain embodiments, for example, the alcohol content may be measured as the alcohol content (exclusive of phenols) on a moisture-free basis having a molecular weight of less than 100 Daltons.

In certain embodiments, for example, the biocrude oil may have a combined content of esters, ketones, furans, and pyrans of less than 30 wt. % on a moisture-free basis, for example the biocrude oil may have a combined content of esters, ketones, furans, and pyrans of less than 25 wt. %, less than 23 wt. %, less than 20 wt. %, less than 15 wt. %, less than 12 wt. %, less than 10 wt. %, or the biocrude oil may have a combined content of esters, ketones, furans, and pyrans of less than 8 wt. % on a moisture-free basis. In certain embodiments, for example, the biocrude oil may have a combined content of esters, ketones, furans, and pyrans in the range of 5-30 wt. % on a moisture-free basis, for example a combined content of esters, ketones, furans, and pyrans in the range of 5-25 wt. %, 10-25 wt. %, 15-25 wt. %, 18-24 wt. %, or a combined content of esters, ketones, furans, and pyrans in the range of 14-21 wt. % on a moisture-free basis. In certain embodiments, for example, the biocrude oil may have a combined content of esters, ketones, furans, and pyrans of at least 10 wt. % on a moisture-free basis, for example the biocrude oil may have a combined content of esters, ketones, furans, and pyrans of at least 15 wt. %, at least 20 wt. %, at least 22 wt. %, at least 25 wt. %, at least 28 wt. %, at least 30 wt. %, or the biocrude oil may have a combined content of esters, ketones, furans, and pyrans of at least 35 wt. % on a moisture-free basis.

In certain embodiments, for example, the biocrude oil may have an ketone content of less than 20 wt. % on a moisture-free basis, for example the biocrude oil may have an ketone content of less than 18 wt. %, less than 15 wt. %, less than 12 wt. %, less than 8 wt. %, less than 6 wt. %, less than 5 wt. %, less than 4 wt. %, less than 3 wt. %, or the biocrude oil may have an ketone content of less than 2 wt. % on a moisture-free basis. In certain embodiments, for example, the biocrude oil may have an ketone content in the range of 1-20 wt. % on a moisture-free basis, for example an ketone content in the range of 3-17 wt. %, 4-17 wt. %, 4-14 wt. %, 4-12 wt. %, or an ketone content in the range of 4-8 wt. % on a moisture-free basis. In certain embodiments, for example, the biocrude oil may have an ketone content of at least 3 wt. % on a moisture-free basis, for example the biocrude oil may have an ketone content of at least 4 wt. %, at least 5 wt. %, at least 7 wt. %, at least 9 wt. %, at least 12 wt. %, at least 14 wt. %, or the biocrude oil may have an ketone content of at least 16 wt. % on a moisture-free basis.

In certain embodiments, for example, the biocrude oil may have an ester content of less than 20 wt. % on a moisture-free basis, for example the biocrude oil may have an ester content of less than 18 wt. %, less than 15 wt. %, less than 12 wt. %, less than 8 wt. %, less than 6 wt. %, less than 5 wt. %, less than 4 wt. %, less than 3 wt. %, or the biocrude oil may have an ester content of less than 2 wt. % on a moisture-free basis. In certain embodiments, for example, the biocrude oil may have an ester content in the range of 1-20 wt. % on a moisture-free basis, for example an ester content in the range of 3-17 wt. %, 4-17 wt. %, 4-14 wt. %, 4-12 wt. %, or an ester content in the range of 4-8 wt. % on a moisture-free basis. In certain embodiments, for example, the biocrude oil may have an ester content of at least 3 wt. % on a moisture-free basis, for example the biocrude oil may have an ester content of at least 4 wt. %, at least 5 wt. %, at least 7 wt. %, at least 9 wt. %, at least 12 wt. %, at least 14 wt. %, or the biocrude oil may have an ester content of at least 16 wt. % on a moisture-free basis.

In certain embodiments, for example, the biocrude oil may have an organic acid content (for example, including but not limited to, formic acid, acetic acid, propionic acid, and glycolic acid) of less than 15 wt. % on a moisture-free basis, for example the biocrude oil may have an organic acid content of less than 13 wt. %, less than 12 wt. %, less than 11 wt. %, less than 10 wt. %, less than 9 wt. %, less than 8 wt. %, less than 7 wt. %, less than 6 wt. %, less than 5 wt. %, less than 4 wt. %, less than 3 wt. %, less than 2 wt. %, or the biocrude oil may have an organic acid content of less than 1 wt. % on a moisture-free basis. In certain embodiments, for example, the biocrude oil may have an organic acid content in the range of 1-15 wt. % on a moisture-free basis, for example an organic acid content in the range of 1-12 wt %, 1-10 wt. %, 2-12 wt. %, 2-10 wt. %, 1-8 wt. %, 3-12 wt. %, or an organic acid content in the range of 4-10 wt. % on a moisture-free basis. In certain embodiments, for example, the biocrude oil may have an organic acid content of at least 1 wt. % on a moisture-free basis, for example the biocrude oil may have an organic acid content of at least 2 wt. %, at least 3 wt. %, at least 4 wt. %, at least 5 wt. %, at least 6 wt. %, or the biocrude oil may have an organic acid content of at least 16 wt. % on a moisture-free basis.

In certain embodiments, for example, the biocrude oil may have an ester content of less than 10 wt. % on a moisture-free basis, for example the biocrude oil may have an ester content of less than 9 wt. %, less than 8 wt. %, less than 7 wt. %, less than 6 wt. %, less than 5 wt. %, less than 4 wt. %, less than 3 wt. %, less than 2 wt. %, or the biocrude oil may have an ester content of less than 1 wt. % on a moisture-free basis. In certain embodiments, for example, the biocrude oil may have an ester content in the range of 0.5-10 wt. % on a moisture-free basis, for example an ester content in the range of 2-10 wt. %, 0.5-3 wt. %, 1-7 wt. %, 0.5-8 wt. %, or an ester content in the range of 2-8 wt. % on a moisture-free basis. In certain embodiments, for example, the biocrude oil may have an ester content of at least 0.5 wt. % on a moisture-free basis, for example the biocrude oil may have an ester content of at least 0.75 wt. %, at least 1 wt. %, at least 2 wt. %, at least 3 wt. %, at least 4 wt. %, at least 7 wt. %, or the biocrude oil may have an ester content of at least 10 wt. % on a moisture-free basis.

In certain embodiments, for example, the biocrude oil (for example a biocrude oil pretreated with a conditioning agent and/or a component additive) may have a high ratio of ester content to organic acid content, for example a ratio in the range of 0.25:1-0.5:1, 0.5:1-1:1, 1:1-1.5-1, 1.5:1-2:1, 2:1-2.5:1, 2.5:1-3:1, ora high ratio of ester content to organic acid content in the range of greater than 3:1.

In certain embodiments, for example, the biocrude oil may have a phenolic compounds content of less than 4 wt. % on a moisture-free basis, for example the biocrude oil may have a phenolic compounds content of less than 3 wt. %, less than 2 wt. %, less than 1 wt. %, less than 0.5 wt. %, less than 0.25 wt. %, less than 0.1 wt. %, or the biocrude oil may have a phenolic compounds content of less than 0.05 wt. % on a moisture-free basis. In certain embodiments, for example, the biocrude oil may have a phenolic compounds content in the range of 0.05-4 wt. % on a moisture-free basis, for example a phenolic compounds content in the range of 0.1-4 wt. %, 0.5-4 wt. %, 1-3 wt. %, 1-2 wt. %, or a phenolic compounds content in the range of 2-4 wt. % on a moisture-free basis. In certain embodiments, for example, the biocrude oil may have a phenolic compounds content of at least 0.05 wt. % on a moisture-free basis, for example the biocrude oil may have a phenolic compounds content of at least 0.1 wt. %, at least 0.25 wt. %, at least 0.5 wt. %, at least 1 wt. %, at least 2 wt. %, at least 3 wt. %, or the biocrude oil may have a phenolic compounds content of at least 4 wt. % on a moisture-free basis. In certain embodiments, for example, the phenolic compounds content may be measured as the phenolic compounds content on a moisture-free basis having a molecular weight of less than 150 Daltons.

In certain embodiments, for example, the biocrude oil may have a metals content of less than 5000 ppm on a moisture-free basis, for example the biocrude oil may have a metals content of less than 4000 ppm, less than 3000 ppm, less than 2000 ppm, less than 1000 ppm, less than 500 ppm, less than 50 ppm, or the biocrude oil may have a metals content of less than 5 ppm on a moisture-free basis. In certain embodiments, for example, the biocrude oil may have a metals content in the range of 5-5000 ppm on a moisture-free basis, for example a metals content in the range of 5-50 ppm, 50-500 ppm, 500-1250 ppm, 1250-2500 ppm, 2500-4000 ppm, or a metals content in the range of 4000-5000 wt. % on a moisture-free basis. In certain embodiments, for example, the biocrude oil may have a metals content of at least 5 ppm on a moisture-free basis, for example the biocrude oil may have a metals content of at least 50 ppm, at least 500 ppm, at least 1250 ppm, at least 2500 ppm, at least 3750 ppm, or the biocrude oil may have a metals content of at least 4000 wt. % on a moisture-free basis.

In certain embodiments, for example, the biocrude oil may have a chlorine content of less than 100 ppm on a moisture-free basis, for example the biocrude oil may have a chlorine content of less than 80 ppm, less than 60 ppm, less than 40 ppm, less than 20 ppm, less than 10 ppm, less than 1 ppm, or the biocrude oil may have a chlorine content of less than 0.1 ppm on a moisture-free basis. In certain embodiments, for example, the biocrude oil may have a chlorine content in the range of 0.1-100 ppm on a moisture-free basis, for example a chlorine content in the range of 0.1-1 ppm, 1-10 ppm, 10-25 ppm, 25-50 ppm, 50-75 ppm, or a chlorine content in the range of 2-3 wt. % on a moisture-free basis. In certain embodiments, for example, the biocrude oil may have a chlorine content in the range of 75-100 ppm on a moisture-free basis, for example the biocrude oil may have a chlorine content of at least 0.1 ppm, at least 1 ppm, at least 10 ppm, at least 25 ppm, at least 50 ppm, at least 75 ppm, or the biocrude oil may have a chlorine content of at least 8 wt. % on a moisture-free basis.

In certain embodiments, for example, the biocrude oil may have an initial kinematic viscosity in the range of 15-180 cSt at 40° C., for example 15-30 cSt, 30-40 cSt, 40-80 cSt, 50-70 cSt, 55-65 cSt, or an initial kinematic viscosity in the range of 80-200 cSt at 40° C. In certain further embodiments, for example, the initial kinematic viscosity is determined according to ASTM D445 within one hour of production.

In certain embodiments, for example, the biocrude oil may experience an average increase in viscosity following production at a rate in the range of 0.05-5 cSt/day at a temperature of 20° C., for example an average increase in viscosity at a rate of 0.1-0.2 cSt/day., 0.2-0.4 cSt/day, 0.4-0.6 cSt/day, 0.6-0.8 cSt/day, 0.8-1 cSt/day, 1-1.25 cSt/day, 1.25-2 cSt/day, 2-3 cSt/day or an average increase in viscosity at a rate of 3-5 cSt/day following production. In certain further embodiments, for example, the average increase in viscosity is determined over a period of 1 week, 2 weeks, 3 weeks, 1 month, 2 months, or 3 months.

In certain embodiments, for example, one or more additive (for example a vegetable oil, an alcohol or mixtures thereof) may be added to the biocrude oil, for example as one or more conditioning agents during rapid thermal processing or as one or more component additives following production of the biocrude oil. In certain further embodiments, for example, the one or more component additives (for example ethanol) may be added to the biocrude oil within 10 days of production of the biocrude oil, for example within 8 days, 6, days, 4, days, 2 days, 1 day, 12 hours, 8 hours, 4 hours, 1 hour, 30 minutes, 10 minutes, or within 1 minute of production of the biocrude oil. In certain embodiments, for example, the one or more conditioning agent and/or components additive may comprise an alcohol, for example methanol, ethanol, ethylene glycol, propanol, butanol, or pentanol. In certain embodiments, for example, the one or more conditioning agent and/or component additive may comprise methyl iso-butyl ester. In certain embodiments, for example, the one or more conditioning agent and/or component additive may comprise acetone. In certain embodiments, for example, the one or more conditioning agent and/or component additive may comprise ethyl acetate.

In certain embodiments for example, the composition of the one or more conditioning agent and/or component additive in the biocrude oil may be in the range of 0.1-20 wt. %, for example, in the range of 1-2 wt. %, 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, or in the range of 15-20 wt. % relative to the weight of the biocrude oil (inclusive of the added one or more conditioning agent and/or component additive). In certain embodiments, for example, the composition of the one or more conditioning agent and/or component additive in the biocrude oil may be based on the amount of the one or more component additives introduced to the biocrude oil. In certain embodiments, for example, the biocrude oil containing the added conditioning agent and/or component additive may experience a reduced rate of increase in viscosity relative to a similarly aged biocrude oil not having the added conditioning agent and/or component additive. In certain embodiments for example, the rate of increase in kinematic viscosity may be reduced by a percentage in the range of 10-99%, for example the rate of increase may be reduced by a percentage in the range of 10-20%, 20-30%, 30-40%, 40-50%, 50-60%, 60-70%, 70-80%, or the rate of increase in kinematic viscosity may be reduced by a percentage in the range of 80-99% relative to a similarly aged biocrude oil not having the added conditioning agent and/or component additive. In certain embodiments, for example, the biocrude oil containing the added conditioning agent and/or component additive may have a reduced kinematic viscosity relative to a similarly aged biocrude oil not containing the one or more conditioning agent and/or one or more component additives. In certain further embodiments, for example, the kinematic viscosity of the biocrude oil having the one or more conditioning agent and/or component additive may by smaller by a percentage in the range of 10-75%, for example the rate of increase may be reduced by a percentage in the range of 10-20%, 20-30%, 30-40%, 40-50%, 50-60%, 60-70%, or the kinematic viscosity may be reduced by a percentage in the range of 70-75% relative to a similarly aged biocrude oil not having the added conditioning agent and/or component additive. In certain further embodiments, for example, the average kinematic viscosity of the biocrude oil having the one or more conditioning agent and/or component additive may be in the range of 5-50 cSt at 40° C., for example 5-10 cSt, 10-15 cSt, 15-20 cSt, 20-30 cSt, 30-40 cSt, or an kinematic viscosity in the range of 40-50 cSt at 40° C. In certain further embodiments, for example, the average kinematic viscosity is determined over a period of 1 week, 2 weeks, 3 weeks, 1 month, 2 months, or 3 months.

In certain embodiments, for example, the biocrude oil having the one or more conditioning agent and/or component additive may experience an average increase in viscosity at a rate in the range of 0.01-3 cSt/day, for example an average increase in viscosity at a rate of 0.01-0.05 cSt/day., 0.05-0.1 cSt/day, 0.1-0.15 cSt/day, 0.15-0.25 cSt/day, 0.25-0.5 cSt/day, 0.5-1 cSt/day, 1-1.5 cSt/day, 1.5-2 cSt/day or an average increase in viscosity at a rate of 2-3 cSt/day following production. In certain further embodiments, for example, the obtained rate of viscosity increase of the biocrude oil having the one or more conditioning agent and/or component additive is achieved when the one or more conditioning agent and/or component additive is added within 10 days of production of the biocrude oil, for example when the one or more conditioning agent and/or component additive is added within 8 days, 6, days, 4, days, 2 days, 1 day, 12 hours, 8 hours, 4 hours, 1 hour, 30 minutes, 10 minutes, or within 1 minute of production of the biocrude oil.

In certain embodiments, for example, the biocrude oil may have a flash point a flash point of greater than 60° C. as measured by the Pensky-Martens closed cup flash point tester (e.g. ASTM D-93), for example a flash point greater than 65° C., 70° C., 75° C., 80° C., 85° C., 90° C., or a flash point greater than 100° C. as measured by the Pensky-Martens closed cup flash point tester (e.g. ASTM D-93). In certain embodiments, for example, the reduced volatility biocrude oil may have a flash point in the range of 60-100° C. as measured by the Pensky-Martens closed cup flash point tester (e.g. ASTM D-93), for example a flash point in the range of 65-100° C., 70-100° C., 75-100° C., 80-100° C., 85-100° C., 90-100° C., or a flash point greater than 75-90° C. as measured by the Pensky-Martens closed cup flash point tester (e.g. ASTM D-93).

In certain embodiments, for example, the biocrude oil may comprise an energy content level of at least 30% of the energy content contained in the biomass from which it may be derived. For example, the biocrude oil may comprise a energy content level of at least 45%, such as at least 55%, at least 60%, at least 65%, at least 70%, at least 75%, at least 80%, at least 85%, at least 90%, or at least 95% of the energy content contained in the biomass from which it may be derived. In certain embodiments, for example, the biocrude oil may comprise a energy content level in the range of between 50% and 98% of the energy content contained in the biomass from which it may be derived, for example the biocrude oil may comprise a energy content level in the range of between 50% and 90%, between 50% and 75%, between 60% and 90%, between 60% and 80%, between 70% and 95%, between 70% and 80%, or between 70% and 90% of the energy content contained in the biomass from which it may be derived.

In certain embodiments, for example, the biocrude oil may comprise a energy content level lower than that of a petroleum fraction feedstock, for example the biocrude oil may have an energy content level in the range of 30-95% on a moisture-free basis, relative to the energy content of a petroleum feedstock, such as in the range of 40-90%, 45-85%, 50-80%, 50-60%, or an energy content level in the range of 54-58%, on a moisture-free basis, relative to the energy content of a petroleum feedstock. In certain embodiments, the biocrude oil may have an energy content in the range of between 30-90%, relative to the petroleum fraction feedstock energy content. For example, the biocrude oil may have an energy content of 35%, 40%, 45%, 50%, 55%, 60%, 65%, 70%, 75%, 80%, 85%, relative to the petroleum fraction feedstock energy content. In certain embodiments, a unit of the biocrude oil may have an energy content suitable to generate in the range of 0.5-2.0 units of cellulosic-renewable index number-compliant fuel, for example an energy content suitable to generate in the range of 0.5-0.7, 0.7-0.9, 0.9-1.1, 1.1-1.3, 1.3-1.5, 1.5-1.7, 1.7-1.8, 0.9-1.1, or an energy content suitable to generate in the range of in the units, between 1.8-2 units of cellulosic-renewable index number-compliant fuel.

In certain embodiments, for example, a unit of the biocrude oil may have an energy content suitable to generate in the range of 0.5-2.0 volume units of ethanol, for example an energy content suitable to generate in the range of 0.5-0.7, 0.7-0.9, 0.9-1.1, 1.1-1.3, 1.3-1.5, 1.5-1.7, 1.7-1.8, 0.9-1.1, or an energy content suitable to generate in the range of in the units, between 1.8-2 volume units of ethanol.

By way of example, Tables 1-3 present certain properties of fast pyrolysis oil oils prepared according to one or more of the procedures described in U.S. Pat. Nos. 7,905,990, 5,961,786, and 5,792,340, each of which is incorporated by reference in their entirety.

TABLE 1

Fast Pyrolysis Oil Produced from Wood Residue Feedstock

| Parameter | Test Method | RFO |
| --- | --- | --- |
| Water Content, wt. % | ASTM E203 | 26.98% |
| Viscosity @ 40° C., cSt | ASTM D445 | 58.9 |
| Ash Content, wt. % | EN 055 | 0.02% |
| Solids Content, wt. % | ASTM D7579 | 0.04% |
| Density @ 20° C., kg/dm$^3$ | EN 064 | 1.1987 |
| pH | ASTM E70-07 | 2.44 |
| Carbon Content, wt. % as is | ASTM D5291 | 41.80% |
| Hydrogen Content, wt. % as is | ASTM D5291 | 7.75% |

TABLE 1-continued

Fast Pyrolysis Oil Produced from Wood Residue Feedstock

| Parameter | Test Method | RFO |
|---|---|---|
| Nitrogen Content, wt. % as is | ASTM D5291 | 0.28% |
| Sulfur Content, wt. % as is | ASTM D5453 | 0.01% |
| Oxygen Content, wt. % as is | By Difference | 50.14% |
| HHV (as is), cal/g | ASTM D240 | 4093.8 |
| HHV (as is), MJ/kg | ASTM D240 | 17.1 |
| HHV (as is), BTU/lb | ASTM D240 | 7369 |

TABLE 2

Analytical Results for Alcell Lignin - Mild Run (LS-3) & Severe Run (LS-4)

| | LS-3 | LS-4 |
|---|---|---|
| Volatiles (wt %) | 14.7 | 27.9 |
| Moisture Content (wt %) | 1.0 | 0.9 |
| Ash content (wt %) | 0.05 | 1.00 |
| Elemental (wt %, MAF) | | |
| Carbon | 68.68 | 73.04 |
| Hydrogen | 7.16 | 6.52 |
| Nitrogen | 0.00 | 0.01 |
| Oxygen (difference) | 24.16 | 20.43 |
| Hydroxyl (wt %) | 7.54 | 7.50 |
| Methoxyl (wt %) | 15.68 | 1.02 |
| Sequential Solubility (wt %) | | |
| Diethyl Ether | 41.8 | 40.3 |
| Ethyl Acetate | 48.9 | 42.4 |
| Methanol | 0.2 | 0.6 |
| Residue | 9.1 | 16.7 |
| Fractionation (wt %) | | |
| Organic Acids | 31.7 | 3.6 |
| Phenols & Neutrals | 45.0 | 81.7 |
| Residue | 23.3 | 14.1 |

TABLE NOTE:
Mild Run (LS-3) was rapid thermal processed at about 500° C. and the Severe Run (LS-4) was rapid thermal processed ar about 700° C.

TABLE 3

Analytical Results of Biocrude oil Derived from Wood Biomass

| Laboratory | 1) | 1) | 2) | 3) | 3) | 4) | 5) | Average |
|---|---|---|---|---|---|---|---|---|
| Specific Gravity | 1.19 | 1.20 | 1.21 | 1.217 | 1.226 | 1.186 | 1.188 | 1.20 |
| Water Content (% by wt) | 26 | 27 | 21 | 20.5 | 21 | 28.1 | | 23.9 |
| Char Content (% by wt) | 2.0 | 0.6 | | 1.4 | 2.2 | 5.5 | 2.2 | 2.3 |
| Higher Heating (BTU/lb) | 7267 | 7310 | 9245 | 7525 | 7955 | 6536 | 6880 | 7525 |
| Elemental (%, MAF) | | | | | | | | |
| Carbon | 55.1 | | 53.63 | 55.5 | 52.8 | 58.27 | 51.5 | 54.5 |
| Hydrogen | 6.7 | | 6.06 | 6.7 | 6.9 | 5.5 | 6.8 | 6.4 |
| Nitrogen | 0.15 | | 0.24 | 0.1 | <0.1 | 0.39 | 0.17 | 0.18 |
| Sulfur | | | 0.02 | | | <0.14 | 0.07 | <.001 |
| ASH (% by wt) | | | | 0.13 | 0.15 | 0.22 | 0.13 | 0.16 |

TABLE NOTES:
The biocrude oil derived from the Wood Biomass was analyzed by the following labs:
1) Universite Catholique de Louvain, Belgium;
2) ENEL, Centro Ricerca Termica, Italy;
3) VTT, Laboratory of Fuel and Process Technology, Finland;
4) CANMET, Energy Research Laboratories, Canada;
5) Commercial Testing and Engineering Co., U.S.A.

Table 4 presents a typical composition of a fast pyrolysis oil (See Energy & Fuels, 2003, vol. 17, 2, pp. 433-443; Energy & Fuels, 2008, vol. 22, 6, pp. 4245-4248).

TABLE 4

Typical Chemical Distribution of Fast Pyrolysis Oil Obtained from Pine Wood

| Compounds | Wet Basis (includes water), wt. % | Moisture-Free Basis, wt. % |
|---|---|---|
| Water | 23.0 | 0 |
| Acids | 4.3 | 5.6 |
| Acetic acid | | 3.4 |
| Formic acid | | 1.5 |
| Other | | 0.7 |
| Alcohols | 2.2 | 2.9 |
| Methanol | | 2.6 |
| Ethylene glycol | | 0.3 |
| Aldehydes, Ketones, Furans, and Pyrans | 15.4 | 20.3 |
| Non-aromatic aldehydes | | 9.7 |
| Non-aromatic ketones | | 5.4 |
| Furans | | 3.4 |
| Other | | 0.9 |
| Sugars | 34.4 | 45.3 |
| LMM Lignin | 13.4 | 17.7 |
| HMM Lignin | 1.95 | 2.6 |
| Extractives (e.g., fatty acids) | 4.35 | 5.7 |

In certain embodiments, for example, the biocrude oil (for example a biocrude oil pretreated with a conditioning agent and/or a component additive) may have a relatively high concentration of esters and a relatively high pH. In certain embodiments, for example, the biocrude oil may have an ester content of at least 3 wt. % and a pH of at least 3.0, for example an ester content of at least 3 wt. % and a pH of at least 3.5, an ester content of at least 3 wt. % and a pH of at least 4.0, an ester content of at least 3 wt. % and a pH of at least 5, an ester content of at least 4 wt. % and a pH of at least 3.0, an ester content of at least 5 wt. % and a pH of at least 3.0, an ester content of at least 6 wt. % and a pH of at least 3.0, an ester content of at least 4 wt. % and a pH of at least 4.0, or the biocrude oil may have an ester content of at least 5 wt. % and a pH of at least 5.0.

In certain embodiments, for example, a biocrude oil may be an unenriched liquid formed by rapid thermal processing of ground cellulosic biomass, wherein the resulting liquid may be at least 50 wt. %, for example at least 60 wt. %, at least 70 wt. %, at least 75 wt. %, at least 80 wt. % or at least 85 wt. % of the total weight of the processed biomass. In other words, the liquid yield from the processed biomass may be at least 50 wt. %, for example at least 60 wt. %, at least 70 wt. %, at least 75 wt. %, at least 80 wt. % or at least 85 wt. % of the total weight of the ground biomass being processed.

In certain embodiments, for example, a biocrude oil may be prepared and then transported and/or stored for future co-processing with a petroleum fraction and one or more component additives. In certain embodiments, for example, the biocrude oil may be transported and/or stored under low oxygen conditions, for example under an inert gas blanket. In certain embodiments, for example, the biocrude oil may be transported and/or stored under low light conditions. In certain embodiments, for example, the biocrude oil temperature may be maintained in a target temperature range during transportation and/or storage, for example the biocrude oil temperature may be maintained in a target temperature range of 35-150° F., for example in a target temperature range of 50-150° F., 75-150° F., 75-120° F., 75-100° F., 85-125° F., 85-100° F., or the biocrude oil temperature may be maintained in a target temperature range of 100-120° F. In certain further embodiments, for example, the biocrude oil may be a conditioned biocrude oil (for example the biocrude oil may have been conditioned by treatment with a chelating agent). In certain further embodiments, for example, the biocrude oil mixture may comprise a component additive (for example 2-20 wt. % ethanol or 10-30 wt. % vegetable oil, relative to the total weight of the biocrude oil (inclusive of the component additive)).

In certain embodiments, for example, an unenriched biocrude oil to be co-processed with a petroleum fraction and one or more component additives may comprise a mixture of two or more unenriched biocrude oil batches, for example batches derived from two or more different cellulosic biomasses (for example, several different types of cellulosic biomasses). In certain further embodiments, for example, greater than 80 wt. % of the unenriched biocrude oil mixture is formed from the two or more unenriched biocrude oil batches, for example greater than 90 wt. %, greater than 95 wt. %, greater than 98 wt. %, or greater than 99 wt. % of the unenriched biocrude oil mixture is formed from the two or more unenriched biocrude oil batches. In certain further embodiments, for example, each of the two or more unenriched biocrude oil batches may a non-HDO, non-deoxygenated biocrude oil, a rapid thermo-mechanically-processed, non-hydrotreated biocrude oil; or a non-deoxygenated, non-upgraded, thermally-processed biocrude oil. In certain further embodiments, for example, the unenriched biocrude oil mixture may be a conditioned unenriched biocrude oil mixture (for example one or more of the biocrude oil batches may have been conditioned by treatment with a chelating agent). In certain further embodiments, for example, the unenriched biocrude oil mixture may comprise a component additive (for example 2-20 wt. % ethanol or 10-30 wt. % vegetable oil, relative to the total weight of the biocrude oil (inclusive of the component additive)), wherein the component additive was added to one or more of the biocrude oil batches and/or to the biocrude oil mixture.

In certain embodiments, for example, the biocrude oil may include all of the whole liquid produced from the thermal or catalytic conversion (for example thermal or catalytic rapid thermal processing) of a biomass (for example a cellulosic biomass), wherein the biocrude oil has a low water content. In certain further embodiments, for example, the water content may be less than 20 wt. %, for example the water content may be less than 17 wt. %, 15 wt. %, 12 wt. %, 10 wt. %, 7 wt. %, 5 wt. %, or the water content may be less than 3 wt. %, relative to the weight of the biocrude oil inclusive of water. In certain embodiments, for example, the water content may be in the range of 1-20 wt. %, for example the water content may be in the range of 1-17 wt. %, 1-15 wt. %, 1-12 wt. %, 1-10 wt. %, 1-7 wt. %, 1-5 wt. %, 1-3 wt. %, 10-20 wt. %, 5-15 wt. %, 10-15 wt %, or the water content may be in the range of 12-18 wt. %, relative to the weight of the biocrude oil inclusive of water. In certain embodiments, for example, a low-water biocrude oil may be a conditioned low water biocrude oil and/or may be combined with a component additive. In certain further embodiments, the conditioned low water biocrude oil and/or biocrude oil combined with a component additive may have a water content in the range of 5-20 wt. % and an additive (for example ethanol or vegetable oil) in the range of 2-20 wt. %, for example a water content in the range of 5-15 wt. % and an additive in the range of 2-15 wt. %, a water content in the range of 5-10 wt. % and an additive in the range of 2-10 wt. %, or a water content in the range of 10-15 wt. % and an additive in the range of 2-10 wt. %. In certain further embodiments, the additive may include may include one or more of alcohol (for example methanol, ethanol, ethylene glycol, propanol, butanol, or pentanol), a ester, an ester, a carbonyl-containing compound, a polar solvent, furfural, acetone, and 2-butanone.

In certain embodiments, for example, the biocrude oil may comprise only thermally converted biomass or only thermo-mechanically converted biomass. Suitable biocrude oils may include a pyrolytic liquid, a thermo-pyrolytic liquid, a thermo-mechanical-pyrolytic liquid, a rapid thermo-pyrolytic liquid, or a rapid thermo-pyrolytic-mechanical liquid, derived or prepared from the conversion of biomass or cellulosic biomass. In certain embodiments, the biocrude oil may include a non-hydrodeoxygenated (non-HDO) biocrude oil; a non-deoxygenated biocrude oil; a non-upgraded biocrude oil; a thermally-processed cellulosic biocrude oil; a thermally-processed, non-upgraded-cellulosic biocrude oil; a thermally-processed biomass liquid; a thermally-processed, non-upgraded-biomass liquid; a thermally processed non-food-based biomass liquid; a thermally-processed non-food, cellulosic-based biomass liquid; a thermally-processed non-food, renewable liquid; a thermally-processed cellulosic liquid; a rapid thermal-processed cellulosic liquid; a rapid thermal-processed bio-oil; a rapid thermal processed biomass liquid or thermo-pyrolytic liquid having less than 5 wt. % solid content, such as less than 4 wt. %, 3 wt. %, 2.5 wt. %, 2 wt. %, 1 wt. %, or less than 0.5 wt. % solid content; a conditioned biocrude oil; a non-hydrotreated, non-upgraded biocrude oil; a pyrolysis oil or pyrolytic liquid; a thermo-pyrolysis oil or a thermo-pyrolytic liquid; a biooil or a bio-oil liquid; a biocrude oil or biocrude liquid; a thermo-catalytic pyrolysis oil or a thermo-catalytic pyrolytic oil; a catalytic pyrolysis oil; a catalytic pyrolytic liquid; or combinations thereof. For example, in certain embodiments, the biocrude oil may comprise one or more of a non-hydrodeoxygenated (non-HDO) biocrude oil; a non-deoxygenated biocrude oil; a non-upgraded biocrude oil; a thermally-processed cellulosic biocrude oil; a rapid thermo-mechanically-processed biocrude oil; a non-hydrotreated, non-upgraded biocrude oil; a pyrolysis oil or pyrolytic liquid; or a thermo-pyrolysis oil or a thermo-pyrolytic liquid.

In certain embodiments, for example, a petroleum fraction may be co-processed with a biocrude oil and optionally one or more component additives in a conversion unit. In certain further embodiments, the petroleum fraction may comprise one or more of a high-boiling, high-molecular weight hydrocarbon fractions of petroleum crude oil, a gas oil (GO) feedstock, a vacuum gas oil (VGO) feedstock, a heavy gas oil (HGO) feedstock, a middle distillate feedstock, a heavy-middle distillate feedstock, or a hydrocarbon-based feedstock. For example, the petroleum fraction feedstock comprises a gas oil feedstock, a vacuum gas oil (VGO) feedstock, a heavy gas oil (HGO) feedstock, or a middle distillate feedstock.

In certain embodiments, for example, a petroleum fraction may be co-processed with a biocrude oil and one or more component additives in a conversion unit. In certain embodiments, for example, the one or more component additives (for example an alcohol such as methanol, ethanol, propanol, butanol, or pentanol) may be capable of capping and/or neutralizing at least organic acid present in the biocrude oil, for example by esterification, aldol condensation, and/or acylation (for example acetylation). In certain embodiments, for example, the one or more component additives may be capable of altering the catalytic activity of a fluidized catalytic cracking catalyst.

In certain embodiments, the weight ratio of the one or more component additives to biocrude oil (inclusive of any component additive present in the biocrude oil) may be in the range of 0.1-20 wt. %, for example, in the range of 1-2 wt. %, 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, or a weight ratio in the range of 15-20 wt. % of the one or more component additives, relative to the weight of the biocrude oil (inclusive of any of the one or more component additives present in the biocrude oil). In certain embodiments, for example, the weight ratio of the one or more component additives in the biocrude oil may be based on the amount of the one or more component additives introduced to the biocrude oil. In certain embodiments, for example, the one or more component additives may comprise ethanol present at a weight ratio to biocrude oil (inclusive of any of the one or more component additives present in the biocrude oil) in the range of 0.5-10 wt. %, for example in the range of 2-10 wt. %, 2-8 wt. %, 2-5 wt. %, 2-4 wt. %, or in the range of 2-3 wt. % ethanol, inclusive of any of the one or more component additives present in the biocrude oil.

In certain embodiments, for example, one or more component additives (for example an alcohol) may have a molecular weight of less than 100 g/mol, for example a molecular weight in the range of 80-100 g/mol, 65-80 g/mol, 50-65 g/mol, 40-50 g/mol, or in the range of 35-40 g/mol, or less than 38 g/mol, less than 47 g/mol, less than 61 g/mol, less than 75 g/mol, or less than 89 g/mol. In certain embodiments, for example, at least 75 wt. % of one or more component additives may comprise one or more primary and/or secondary alcohols with a molecular weight, for example, of less than 100 g/mol.

In certain embodiments, for example, one or more component additives (for example an alcohol) may have a viscosity of less than 10 cP at a temperature of 27° C., for example a viscosity of less than 8 cP, less than 6 cP, less than 5 cP, less than 4 cP, less than 3 cP, less than 2 cP, or the one or more component additives may have a viscosity of less than 1 cP. In certain embodiments, for example, the one or more component additives may have a viscosity in the range of 0.1-10 cP at a temperature of 27° C., for example a viscosity in the range of 0.1-2 cP, 0.1-1 cP, 1-8 cP, 1-6 cP, 1-8, 1-5 cP, 1-4 cP, 1-3 cP, 1-2.5 cP, 1-2 cP, or the one or more component additives may have a viscosity in the range of 0.5-1.5 cP.

In certain embodiments, for example, one or more component additives may comprise an alcohol, a ester (for example acetone or 2-butanone), an ester, a carbonyl-containing compound, a polar solvent, or furfural.

In certain embodiments, for example, one or more component additives may comprise a component having a fat component derived from plant oil (for example a vegetable oil) or an animal oil. In certain further embodiments, for example, one or more component additives may comprise triglycerides and/or free fatty acids, including but not limited to, for example, canola oil, corn oil, soy oils, rapeseed oil, soybean oil, palm oil, colza oil, sunflower oil, hemp seed oil, olive oil, linseed oil, coconut oil, castor oil, peanut oil, mustard oil, cotton seed oil, inedible tallow, inedible oil (jatropha oil), yellow and brown greases, lard, train oil, fats in milk, fish oil, algal oil, tall oil, sewage sludge, and a combination of two or more of the foregoing. In certain embodiments, for example, one or more of the foregoing animal- or plant-derived oil may be present at a weight ratio relative to the biocrude oil of 0.5-50 wt. %, for example the one or more of the foregoing animal- or plant-derived oil may be present at a weight ratio in the range of 0.5-25 wt. %, 0.5-20 wt. %, 0.5-15 wt. %, 0.5-10 wt. % 0.5-5 wt. %, 0.5-2 wt. %, 2-20 wt. %, 2-5 wt. %, 5-20 wt. %, 5-15 wt. %, 5-10 wt. %, or at a weight ratio in the range of 2-10 wt. %, relative to the weight of the biocrude oil.

In certain embodiments, for example, one or more component additives may be mixed with the biocrude oil to reduce the average oxygen content of the mixture. In certain further embodiments, for example, a cellulosic biocrude oil having an oxygen content in the range of 30-50 wt. % (on a moisture free basis) may be mixed with an animal or vegetable-derived fatty oil (for example, in a ratio of 2-25 wt. % animal- or vegetable-derived oil) having an oxygen content (on a moisture free basis) in the range of 1-20 wt. %, for example an oxygen content in the range of 2-15 wt. %, 2-12 wt. %, 5-15 wt. %, 7-15 wt. %, 8-15 wt. %, or an oxygen content in the range of 9-11 wt. %, on a moisture free basis. In certain embodiments, for example, the mixture may have an oxygen content reduced by a percentage in the range of 5-50% relative to the oxygen content of the biocrude oil alone, for example a percentage in the range of 5-10%, 10-15%, 15-20%, 20-30%, 30-40%, or an oxygen content reduced by a percentage in the range of 40-50% relative to the oxygen content of the biocrude oil alone.

In certain embodiments, one or more component additives may be mixed with the biocrude oil to reduce the average water content of the mixture. In certain further embodiments, for example, a cellulosic biocrude oil having a water content in the range of 15-30 wt. % may be mixed with an animal or vegetable-derived fatty oil (for example, in a ratio of 2-25 wt. % animal- or vegetable-derived oil) having a water content in the range of 0-10 wt. %, for example a water content in the range of 0.001-8 wt. %, 0.001-5 wt. %, 0.001-2 wt. %, 0.001-1 wt. %, 0.001-0.5 wt. %, or a water content in the range of 0.001-1 wt. %.

In certain embodiments, for example, one or more component additives may be mixed with the biocrude oil to increase the miscibility of the biocrude oil with a petroleum fraction (for example a vacuum gas oil fraction). In certain further embodiments, for example, a cellulosic biocrude oil having an oxygen content in the range of 30-50 wt. % (on a moisture free basis) may be mixed with an animal or vegetable-derived fatty oil (for example, in a ratio of 2-25 wt. % animal- or vegetable-derived oil) to form a mixture with an increased miscibility in the range of 5-50% relative to the miscibility of the biocrude oil in a vacuum gas oil, for example an increased miscibility in the range of 5-10%, 10-15%, 15-20%, 20-30%, 30-40%, or an increased miscibility in the range of 40-50% relative to the miscibility of the biocrude oil in a vacuum gas oil.

In certain embodiments, one or more component additives may be mixed with the biocrude oil to increase the flash point of the biocrude oil with a petroleum fraction (for example a vacuum gas oil fraction). In certain further embodiments, for example, a cellulosic biocrude oil having a flash point of greater than 25° C. may be mixed with an animal or vegetable-derived fatty oil (for example, in a ratio of 2-25 wt. % animal- or vegetable-derived oil) to form a mixture with an increased flash point in the range of 25-1000% higher, on a ° C./° C. basis, relative to the flash point of the biocrude oil alone, for example an increased flash point in the range of 25-50%, 50-100%, 100-250%, 250-500%, 500-750%, or an increased flash point in the range of 750-1000% relative to the flash point of the biocrude oil alone.

In certain embodiments, for example, a petroleum fraction may be co-processed with a biocrude oil and one or more component additives in a conversion unit (for example a fluidized catalytic cracker) located in a facility (for example in a refinery). In certain further embodiments, for example, prior to the introduction of the biocrude oil into the facility, the biocrude oil feedstock may be mixed (for example blended or emulsified) with one or more component additives (for example ethanol and/or a vegetable oil, or any other component additive described herein). In certain further embodiments, for example, the biocrude oil feedstock may be mixed with one or more component additives (for example ethanol and/or a vegetable oil, or any other component additive described herein) after the biocrude oil has entered the facility but before the biocrude oil is introduced into the conversion unit. In certain embodiments, for example, the mixed biocrude oil may have a water content of less than 20 wt. %, such as less than 15 wt. %, 10 wt. %, or less than 5 wt. %. In certain further embodiments, for example, the unmixed biocrude oil having a water content less than 20 wt. % or less than 15 wt. %, and may be mixed with one or more alcohols, such as methanol, ethanol, propanol, isopropyl alcohol, glycerol, or butanol, prior to introduction into the conversion unit.

In certain embodiments, for example, a petroleum fraction (for example a vacuum gas oil) may be co-processed with a mixture of a biocrude oil and one or more component additives in a conversion unit. In certain further embodiments, for example, the one or more component additives may comprise a surfactant and/or emulsifier and one or more other component additive (for example an alcohol or a vegetable oil). In certain further embodiments, for example, the one or more mixed component additive may comprise a surfactant and/or emulsifier and an alcohol (for example ethanol). In certain further embodiments, for example, the one or more mixed component additive may comprise a surfactant and/or emulsifier and a vegetable oil (for example tall oil and/or soybean oil). In certain embodiments, for, example, the mixed biocrude oil may comprise in the range of 0.05-5 wt. % surfactant and/or emulsifier, inclusive of the weight of the surfactant and/or emulsifier, for example in the range of 0.05-2 wt %, 0.05-1 wt %, 0.5-4 wt. %, 0.5-3 wt. %, 0.5-2 wt. %, 0.5-1 wt. %, or in the range of 1-3 wt. % surfactant and/or emulsifier, inclusive of the weight of the surfactant and/or emulsifier. In certain embodiments, the surfactant and/or emulsifier may comprise, for example, a non-ionic surfactant, a non-ionic polymeric surfactant, Hypermer 1083SF, an amine compound, Monoamine ADD, a diamine compound, Incromide, Chemax EM-1160, Tween 80, sorbitan esters of fatty acids, polyglycerol esters of fatty acids, mono-glycerides, di-glycerides, mixtures of mono-glycerides and di-glycerides, esters of mono functional fatty acids with poly-12-hydroxystearic acid, esters of mono functional alcohols with poly-12-hydroxystearic acid, polymeric esters of difunctional fatty acids, polymeric esters of difunctional alcohols, esters of fatty acids with polyethylene glycol of up to 5 repeat polyoxyethylene units, esters of hydroxyacids with polyethylene glycol of up to 5 repeat polyoxyethylene units, or a combination of two or more of the foregoing.

In certain embodiments, a biocrude oil and component additive may be contacted to form a blend. In certain embodiments, the blend may be formed inline, for example with a stream of the petroleum material, for example using one or more of a blender, a high shear mixer, an in-line mixer, a static mixer, an ultrasonic mixer, a mix atomizer, a surfactant, an emulsifier and/or other another mixing aid. In certain embodiments, the blend may be formed using one or more of a blender, a high shear mixer, an in-line mixer, a static mixer.

In certain embodiments, for example, a petroleum fraction (for example a vacuum gas oil) may be co-processed with a biocrude oil and one or more component additives in conversion unit (for example a fluidized catalytic cracker or a field upgrading unit). In certain embodiments, for example, at least a portion of the one or more component additives may be introduced directly into the petroleum conversion unit (i.e., without first being mixed with any of the other reactants).

In certain embodiments, for example, a petroleum fraction (for example a vacuum gas oil) may be co-processed with a mixture of a biocrude oil and one or more component additives in a conversion unit. In certain embodiments, for example, at least a portion of at least a first of a plurality of component additives may be introduced directly into the conversion unit (i.e., without first being mixed with any of the other reactants), and at least a portion of at least a second of the plurality of component additives may be mixed with the biocrude oil prior to introduction to the conversion unit. In certain embodiments, for example, the biocrude oil may be mixed with a vegetable oil (for example, mixed with a vegetable oil in a quantity sufficient to increase the miscibility of the biocrude oil with the petroleum fraction) and an alcohol (for example, ethanol, for example in a quantity sufficient to reduce the rate of viscosity increase by at least 25%), and the mixture may be subsequently co-processed in a conversion unit with the petroleum fraction (for example a vacuum gas oil) and a further quantity of an alcohol (for example ethanol).

In certain embodiments, for example, at least a portion of at least a first of the one or more component additives may be mixed with the biocrude oil at a facility (for example a refiner) housing the conversion unit (for example a fluidized catalytic cracker or a hydrocracker) prior to introducing the mixture to the conversion unit. In certain embodiments, for example, at least a portion of at least a first of the one or more component additives may be mixed with the biocrude oil prior to introduction to a facility housing the conversion unit. In certain embodiments, for example, at least a portion of at least a first of the one or more component additives may be mixed with the biocrude oil prior to transportation of the biocrude oil from a rapid thermal processing facility or a biocrude oil storage facility to a facility housing the conversion unit.

In certain embodiments, for example, at least a portion of at least a first of the one or more component additives may be mixed with the biocrude oil within a period of time after it is produced in order to control one or more of the viscosity, rate of viscosity increase, average molecular weight, rate of average molecular weight increase, pH, rate of pH change, ester content, rate of change of ester content, ester content, rate of change of ester content, ester content, rate of change of ester content, polymer content, rate of change of polymer content, color, rate of color change, turbidity, rate of turbidly change, phase separation, and rate of phase separation. In certain embodiments, for example, at least a first portion of the at least a first of the one or more component additives may be mixed with the biocrude oil within 10 days of production of the biocrude oil, for example within 8 days, 7 days, 6 days, 4 days, 2 days, 1 day, 12 hours, 8 hours, 4 hours, 1 hour, 30 minutes, 10 minutes, or within 1 minute of production of the biocrude oil. In certain further embodiments, for example, at least a first portion of the at least a first of the one or more component additives may be mixed with the biocrude oil, optionally followed a period of time later (for example several days later) by addition of at least a first portion of the at least a first of the one or more component additives to the biocrude oil prior to co-processing. In certain embodiments, for example, additional portions (for example at least a second portion) of the least a first of the one or more component additives may be mixed with the biocrude oil according to a schedule, for example a schedule of every 7 days, 6 days, 4 days, 2 days, 1 day, 12 hours, 8 hours, 4 hours, 1 hour, or a schedule of every 30 minutes following addition of the at least a first portion of the at least a first of the one or more component additives.

In certain embodiments, for example, the biocrude oil may be co-processed within a period of time, for example within 3 months, following addition of at least a first portion of at least one of one or more component additives, for example within a time of 2 months, 1 months, 3 weeks, 2 weeks, 1 week, or withing a time of 3 days at least a first portion of the at least a first portion of at least one of one or more component additives.

In certain embodiments, for example, a petroleum fraction (for example a vacuum gas oil) may be co-processed with a mixture of a biocrude oil and one or more component additives in a refinery conversion unit. In certain further embodiments, for example, one or more component additives may comprise a petroleum material obtained from recycle product stream or a stream from other unit operation in the refinery (for example the component additive may comprise the type of petroleum material present in the petroleum fraction). In certain embodiments, for example, the mixture may be a multi-phase mixture. In certain embodiments, for example, the mixture may be a blend. In certain embodiments, for example, the mixture may be an emulsion. In certain further embodiments, for example, the emulsion may be obtained by a mechanical emulsifier. In certain embodiments, the mixture and/or emulsion may further comprise a surfactant and/or emulsifier (for example one or more of the surfactants and/or emulsifiers identified herein).

In certain embodiments, for example, when the biocrude oil is derived from a liquid product of rapid thermal processing, at least a portion of one of the one or more component additives may be added to the biocrude oil by adding the one of the one or more component additives to a condensing chamber used to form at least a portion of the liquid product (for example by adding the at least a portion of the one or more component additives to a condensing chamber or a quench tower of the rapid thermal processing process). In certain embodiments, for example when the biocrude oil is a product of non-catalytic rapid thermal processing of a biomass (for example a cellulosic biomass) in a process comprising an upflow reactor, at least a portion of one of the one or more component additives may be introduced to the biomass and/or to the upflow reactor.

In certain embodiments, for example when the biocrude oil is derived from a liquid product of non-catalytic rapid thermal processing of a biomass (for example a cellulosic biomass), wherein the rapid thermal processing process comprises a conditioning step (for example a step of adding a chelating agent), at least a portion of one of one or more component additives may be mixed with the liquid product before the conditioning step. In certain embodiments, for example when the biocrude oil is derived from a liquid product of non-catalytic rapid thermal processing of a biomass (for example a cellulosic biomass), wherein the rapid thermal processing process comprises a conditioning step (for example a step of adding a chelating agent), at least a portion of one of one or more component additives may be mixed with the liquid product after the conditioning step (for example, after addition of the chelating agent and before or after a filtration of the liquid product to remove at least a portion of the chelating agent).

In certain embodiments, for example, one or more component additives may be introduced, for example during preparation of the biocrude oil, for example by a method comprising: rapidly pyrolying a cellulosic biomass in the presence of the one or more component additives, at least one of said one more component additives capable of capping and/or neutralizing at least one type of organic acid. Alternatively, or in addition, in certain embodiments at least one of the one or more component additives may be added, for example, during preparation of the biocrude oil, for example by a method comprising: (i) rapidly pyrolyzing a cellulosic feedstock to form a vapor stream; and (ii) contacting the stream with a quench media to form a liquid product, said quench media comprising one or more additives capable of capping and/or neutralizing at least one type of organic acid present in the liquid product. In certain further embodiments, for example, the vapor stream may be quenched by the quench media to a temperature of less than 100° C. in less than 1 second, for example less than 50° C. in less than 100 milliseconds. In certain embodiments, the method may further comprise pre-treating the cellulosic biomass with a water wash. In certain embodiments, the method may further comprise contacting the liquid product with a chelating agent, for example oxalic acid. In certain further embodiments, for example, the liquid product contacted with a chelating agent may be filtered.

Certain embodiments, for example, may provide a pathway for preparing one or more fuel, wherein said pathway may comprise co-processing a petroleum fraction with a biocrude oil and one or more component additives. In certain embodiments, for example, at least one of the one or more component additives may itself be a renewable identification number-compliant fuel (for example, ethanol). In certain embodiments, for example, co-processing of the at least one of the one or more component additives (for example one or more renewable identification number-compliant component additive) may satisfy at least a portion of a renewable volume obligation (for example a Renewable Volume Obligation, such as a Renewable Volume Obligation pursuant to an EPA regulation or mandate). In certain embodiments, for example, at least one of the one or more component additives may have an attached Renewable Identification Number. In certain further embodiments, for example, the attached Renewable Identification Number of the at least one of the one or more component may transfer to the one or more fuel product as a result of co-processing. In certain embodiments, for example, the attached Renewable Identification Number of the at least one of the one or more component may transfer to the one or more fuel product on an ethanol equivalent basis. In certain embodiments, for example, the quantity of the at least one of the one or more component additives (for example one or more renewable identification number-compliant component additive, such as ethanol) co-processed is at least 0.5 wt. % of the weight of the one or more cellulosic renewable identification number-compliant fuel, for example the at least one renewable identification number-compliant component additive co-processed is at least 1 wt. %, at least 2 wt. %, at least 5 wt. %, at least 9 wt. %, at least 10 wt. %, at least 11 wt. %, at least 15 wt. %, at least 20 wt. %, at least 30 wt. %, or the quantity of the at least one or more component additives co-processed is at least 50 wt. % of the weight of the one or more cellulosic renewable identification number-compliant fuel. In certain embodiments, for example, the quantity of the at least one of the one or more component additives (for example one or more renewable identification number-compliant component additive, such as ethanol) co-processed is in the range of 0.5-50 wt. % of the weight of the one or more cellulosic renewable identification number-compliant fuel, for example the quantity of the at least one of the one or more component additives co-processed is in the range of 1-5 wt. %, 5-9 wt. %, 9-10 wt. %, 9-11 wt. %, 10-12 wt. %, 12-15 wt. %, 15-20 wt. %, 20-30 wt. %, or the quantity of the at least one of the one or more component additives co-processed is in the range of 30-50 wt. % of the weight of the one or more cellulosic renewable identification number-compliant fuel.

Certain embodiments, for example, may provide a pathway for preparing one or more fuel, wherein said pathway may comprise preparing a biocrude oil and further co-processing the biocrude oil with a petroleum fraction. In certain embodiments, for example, preparation of the biocrude oil may comprise processing (for example by rapid thermal processing) a biomass (for example a cellulosic biomass) and one or more component additives. In certain embodiments, for example, at least one of the one or more component additives may itself be a renewable identification number-compliant fuel (for example, ethanol). In certain embodiments, for example, the processing of at least one of the one or more component additives (for example one or more renewable identification number-compliant component additive) may satisfy at least a portion of a renewable volume obligation (for example a Renewable Volume Obligation, such as a Renewable Volume Obligation pursuant to an EPA regulation or mandate). In certain embodiments, for example, the quantity of the at least one of the one or more component additives (for example one or more renewable identification number-compliant component additive, such as ethanol) processed is at least 0.5 wt. % of the weight of the one or more cellulosic renewable identification number-compliant fuel, for example the at least one renewable identification number-compliant component additive co-processed is at least 1 wt. %, at least 2 wt. %, at least 5 wt. %, at least 9 wt. %, at least 10 wt. %, at least 11 wt. %, at least 15 wt. %, at least 20 wt. %, at least 30 wt. %, or the quantity of the at least one or more component additives processed is at least 50 wt. % of the weight of the one or more cellulosic renewable identification number-compliant fuel. In certain embodiments, for example, the quantity of the at least one of the one or more component additives (for example one or more renewable identification number-compliant component additive, such as ethanol) processed is in the range of 0.5-50 wt. % of the weight of the one or more cellulosic renewable identification number-compliant fuel, for example the quantity of the at least one of the one or more component additives co-processed is in the range of 1-5 wt. %, 5-9 wt. %, 9-10 wt. %, 9-11 wt. %, 10-12 wt. %, 12-15 wt. %, 15-20 wt. %, 20-30 wt. %, or the quantity of the at least one of the one or more component additives processed is in the range of 30-50 wt. % of the weight of the one or more cellulosic renewable identification number-compliant fuel.

In certain embodiments, the reactants may further comprise one or more component additives present (whether as introduced or in a subsequent transformed state (for example reacted or partially reacted form)) in a range, for example, of 0.005-50 wt. %.

In certain embodiments, for example, the biocrude oil may contain, for example may be spiked with or may be pre-treated with, an alcohol component additive, for example the biocrude oil may be spiked with an amount of an alcohol additive in an amount in the range of 0.1-20 wt. % (for example, in the range of 1-2 wt. %, 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, or in the range of 15-20 wt. % of alcohol additive, for example one or more isomers of methanol, ethanol, propanol, butanol, or pentanol), relative to the weight of the biocrude oil (inclusive of the added alcohol additive). In certain further embodiments, for example, the alcohol additive may have a molecular weight of less than 100 g/mol, for example a molecular weight in the range of 80-100 g/mol, 65-80 g/mol, 50-65 g/mol, 40-50 g/mol, or in the range of 35-40 g/mol, or less than 38 g/mol, less than 47 g/mol, less than 61 g/mol, less than 75 g/mol, or less than 89 g/mol. In certain embodiments, for example, at least 75 wt. % of the alcohol additive may comprise one or more primary and/or secondary alcohols with a molecular weight, for example, of less than 100 g/mol. In certain embodiments, for example, the alcohol additive may have a viscosity of less than 2 cP at a temperature of 27° C.

In certain further embodiments, for example, the total alcohol content (exclusive of phenols and alcohols with a molecular weight greater than 100 g/mol) of the biocrude oil (for example, a biocrude oil following addition of the alcohol additive; or a biocrude oil without addition of any alcohol additive), may be an amount in the range of 2-30 wt. % (for example, in the range of 2-3 wt. %, 3-4 wt. %, 4-5 wt. %, 5-6 wt. %, 6-7 wt. %, 7-8 wt. %, 8-9 wt. %, 9-10 wt. %, 10-12 wt. %, 12-14 wt. %, 14-15 wt. %, 15-20 wt. %, or in the range of 20-30 wt. % total alcohol content, relative to the weight of the biocrude oil (inclusive of the total alcohol content).

In certain embodiments, for example, the biocrude oil may contain, for example may be spiked with or may be pre-treated with, a vegetable oil. In certain further embodiments, for example, may contain, for example may be spiked with or may be pre-treated with, 0.5-40 wt. % vegetable oil, for example in the range of 0.5-25 wt. %, 0.5-20 wt. %, 0.5-15 wt. %, 0.5-10 wt. % 0.5-5 wt. %, 0.5-2 wt. %, 2-20 wt. %, 2-5 wt. %, 5-20 wt. %, 5-15 wt. %, 5-10 wt. %, 25-50 wt. %, or may contain, for example may be spiked with or may be pre-treated with in the range of 2-10 wt. % vegetable oil, relative to the weight of the biocrude oil (inclusive of the weight of the vegetable oil).

In certain embodiments, for example, the biocrude oil may contain, for example may be spiked with or may be pre-treated with, a surfactant component additive. In certain embodiments, for, example, the biocrude oil may be pre-treated with or be spiked with in the range of 0.05-5 wt. % surfactant, inclusive of the weight of the surfactant, for example in the range of 0.05-2 wt %, 0.05-1 wt %, 0.5-4 wt. %, 0.5-3 wt. %, 0.5-2 wt. %, 0.5-1 wt. %, or in the range of 1-3 wt. % surfactant, inclusive of the weight of the surfactant. In certain embodiments, for example, the biocrude oil may contain, for example may be spiked with or may be pre-treated with, a emulsifier. In certain embodiments, for, example, the biocrude oil may be pre-treated with or be spiked with in the range of 0.05-5 wt. % emulsifier, inclusive of the weight of the emulsifier, for example in the range of 0.05-2 wt %, 0.05-1 wt %, 0.5-4 wt. %, 0.5-3 wt. %, 0.5-2 wt. %, 0.5-1 wt. %, or in the range of 1-3 wt. % emulsifier, inclusive of the weight of the emulsifier.

In certain embodiments, for example, the biocrude oil may contain, for example may be spiked with or may be pre-treated with, an animal- and/or plant-derived oil component additive (for example a vegetable oil). In certain embodiments, for example, the animal- and/or plant-derived oil may be present at a weight ratio relative to the biocrude oil of 0.5-50 wt. % (inclusive of the weight of the animal- and/or plant-derived oil), for example the one or more of the foregoing animal- and/or plant-derived oil may be present at a weight ratio in the range of 0.5-25 wt. %, 0.5-20 wt. %, 0.5-15 wt. %, 0.5-10 wt. % 0.5-5 wt. %, 0.5-2 wt. %, 2-20 wt. %, 2-5 wt. %, 5-20 wt. %, 5-15 wt. %, 5-10 wt. %, 25-50 wt. %, or at a weight ratio in the range of 2-10 wt. %, relative to the weight of the biocrude oil (inclusive of the weight of the animal- and/or plant-derived oil).

In certain embodiments, the biocrude oil of one or more or all of the above-noted embodiments may be an enhanced-stability biocrude oil for its intended use as a co-processing reactant (for example a co-processing feedstock). In certain further embodiments, for example, the enhanced-stability biocrude oil may have one or more features of low metal content, low ash content, low suspended solids, a low high molecular weight fraction, a low polymer content, a high thermal stability, a long shelf-life, a low viscosity, high ester content, a high pH, and less water content, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, for example, the enhanced-stability biocrude oil may have a low metal content, for example in the range of 10-95% less metal content, for example 10-75% less, 10-50% less, 10-20% less, 20-30% less, 30-40% less, or in the range of 40-70% less metal content, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, for example, the enhanced-stability biocrude oil may have a low ash content, for example in the range of 10-95% less ash content, for example 10-75% less, 10-50% less, 10-20% less, 20-30% less, 30-40% less, or in the range of 40-70% less ash content, In certain embodiments, for example, the enhanced-stability biocrude oil may have a low suspended solids content, for example in the range of 10-95% less suspended solids content, for example 10-75% less, 10-50% less, 10-20% less, 20-30% less, 30-40% less, or in the range of 40-70% less suspended solids content, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, for example, the enhanced-stability biocrude oil may have a low molecular weight fraction, for example in the range of 10-95% less compounds by weight having a molecular weight of greater than 750 g/mol, for example 10-75% less, 10-50% less, 10-20% less, 20-30% less, 30-40% less, or in the range of 40-70% less compounds having a molecular weight of greater than 750 g/mol, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, for example, the enhanced-stability biocrude oil may have a low polymer content, for example in the range of 10-95% less polymer compounds by weight having a molecular weight of greater than 500 g/mol, for example 10-75% less, 10-50% less, 10-20% less, 20-30% less, 30-40% less, or in the range of 40-70% less polymer compounds having a molecular weight of greater than 500 g/mol, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, for example, the enhanced-stability biocrude oil may have a high thermal stability, for example in the range of 10-1000% greater flash point on a ° C./° C. basis, for example 10-50%, 50-100%, 100-250%, 250-500%, 500-750%, or in the range of 750-1000% greater flash point, as determined by the Pensky-Martens closed cup flash point tester (e.g. ASTM D-93), relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, a biocrude oil (for example the enhanced-stability biocrude oil) may have a shelf-life following production during which it is suitable for co-processing with a petroleum fraction. In certain embodiments, the shelf-life may be defined as the time period during which the biocrude oil has a kinematic viscosity of less than 100 cSt at 40° C., for example less than 80 cSt, 60 cSt, or in the range of less than 40 cSt at 40° C.

In certain embodiments, for example, the enhanced-stability biocrude oil may have a long shelf-life during which it may be co-processed in a fluidized catalytic cracker, for example in the range of 10-200% longer shelf-life, for example 10-25% longer, 25-50% longer, 50-100% longer, 100-150% longer, or in the range of 150-200% longer shelf-life, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, for example, the shelf-life of the enhanced-stability crude oil may be at least 1 week, for example 2 weeks, 3 weeks, 1 month, 3 months, 6 months, 9 months, 12 months, or the shelf-life may be at least 18 months. In certain embodiments, the shelf-life of the enhanced-stability crude oil may be in the range of 1-2 weeks, 2-3 weeks, 3 weeks to 1 month, 1-3 months, 3-6 months, 6-9 months, 9-12 months, 12-15 months, or in the range of 15-18 months.

In certain embodiments, for example, the enhanced-stability biocrude oil may have a low dynamic viscosity, for example in the range of 10-95% lower dynamic viscosity, for example 10-75% lower dynamic viscosity, 10-50% lower dynamic viscosity, 10-20% lower dynamic viscosity, 20-30% lower dynamic viscosity, 30-40% lower dynamic viscosity, or in the range of 40-70% lower dynamic viscosity, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, for example, the enhanced-stability biocrude oil may have a high ester content, for example in the range of 10-95% higher ester content, for example 10-75% higher ester content, 10-50% higher ester content, 10-20% higher ester content, 20-30% higher ester content, 30-40% higher ester content, or in the range of 40-70% higher ester content, In certain embodiments, for example, the enhanced-stability biocrude oil may have a high pH, for example in the range of 10-95% higher pH, for example 10-75% higher pH, 10-50% higher pH, 10-20% higher pH, 20-30% higher pH, 30-40% higher pH, or in the range of 40-70% higher pH, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

In certain embodiments, for example, the enhanced-stability biocrude oil may have a low water content, for example in the range of 10-95% lower water content, for example 10-75% lower water content, 10-50% lower water content, 10-20% lower water content, 20-30% lower water content, 30-40% lower water content, or in the range of 40-70% lower water content, relative to a similarly formed renewable fuel oil (for example a renewable fuel oil formed from the same type of biomass, under the same reaction conditions, and condensed and processed in the same way) exclusive of any of the aforementioned conditioning steps, pre-treatment steps, and/or addition of any component additive.

Other features of the enhanced-stability biocrude oil are contemplated herein.

Certain embodiments, for example, may comprise introducing a biocrude oil (for example a product of a non-catalytic rapid thermal process) into a conversion unit (for example a conversion unit such as a fluidized catalytic cracker or a hydrotreater or a hydrocracking unit in a refinery) for co-processing with a petroleum fraction (for example a vacuum gas oil) introduced to the conversion unit. In certain further embodiments, for example, the biocrude oil introduced to the conversion unit may be mixed with one or more component additives (for example 0.5-5 wt. % ethanol and/or 5-20 wt. % vegetable oil, relative to the weight of the biocrude oil and inclusive of the added one or more component additives). In certain embodiments, one or more component additives may be directly introduced to the conversion unit (for example 0.5-5 wt. % ethanol and/or 5-20 wt. % vegetable oil, relative to the weight of the biocrude oil).

In certain embodiments, for example, the introduced weight of biocrude oil in a pre-determined time interval may be in the range of 0.005-20 wt. %, relative to the total weight of the biocrude oil, one or more component additives, and petroleum fraction introduced to the conversion unit over the pre-determined time interval (hereinafter the "total conversion unit feedstock input rate") for example in the range of 0.005-19 wt. %, 0.005-18 wt. %, 0.005-17 wt. %, 0.005-16 wt. %, 0.005-15 wt. %, 0.005-14 wt. %, 0.005-13 wt. %, 0.005-12 wt. %, 0.005-11 wt. %, 0.005-10 wt. %, 0.005-9 wt. %, 0.005-8 wt. %, 0.005-7 wt. %, 0.005-6 wt. %, 0.005-5 wt. %, 0.005-4 wt. %, 0.005-3 wt. %, 0.005-2 wt. %, 0.005-1 wt. %, 0.005-0.9 wt. %, 0.005-0.8 wt. %, 0.005-0.7 wt. %, 0.005-0.6 wt. %, 0.005-0.5 wt. %, 0.005-0.4 wt. %, 0.005-0.3 wt. %, 0.005-0.2 wt. %, 0.005-0.1 wt. %, 0.005-0.075 wt. %, 0.005-0.05 wt. %, 0.005-0.025 wt. %, 0.005-0.01 wt. %, 0.005-0.0075 wt. %, 0.005-0.0075 wt. %, 0.0075-0.01 wt. %, 0.01-0.025 wt. %, 0.025-0.05 wt. %, 0.05-0.075 wt. %, 0.075-0.1 wt. %, 0.1-0.2 wt. %, 0.2-0.3 wt. %, 0.3-0.4 wt. %, 0.4-0.5 wt. %, 0.5-0.6 wt. %, 0.6-0.7 wt. %, 0.7-0.8 wt. %, 0.8-0.9 wt. %, 0.9-1 wt. %, 1-2 wt. %, 2-3 wt. %, 3-4 wt. %, 4-5 wt. %, 5-6 wt. % 6-7 wt. %, 7-8 wt. %, 8-9 wt. %, 9-10 wt. %, 10-11 wt. %, 11-12 wt. %, 12-13 wt. %, 13-14 wt. %, 14-15 wt. %, 15-16 wt. %, 16-17 wt. %, 17-18 wt. %, 18-19 wt. %, 19-20 wt. %, 0.05-5.0 wt. %, 0.1-2.0 wt. %, 0.1-1 wt. %, 0.25-0.75 wt. %, 0.4-0.6, or the introduced weight of biocrude oil in the pre-determined time interval may be in the in the range of 0.5-3 wt. % relative to the total conversion unit feedstock input rate.

In certain embodiments, for example, the introduced volume of biocrude oil in a pre-determined time interval may be in the range of 0.005-20 vol. %, relative to the total volume of the biocrude oil, one or more component additives, and petroleum fraction introduced to the conversion unit over the pre-determined time interval (hereinafter the "total conversion unit feedstock input rate") for example in the range of 0.005-19 vol. %, 0.005-18 vol. %, 0.005-17 vol. %, 0.005-16 vol. %, 0.005-15 vol. %, 0.005-14 vol. %, 0.005-13 vol. %, 0.005-12 vol. %, 0.005-11 vol. %, 0.005-10 vol. %, 0.005-9 vol. %, 0.005-8 vol. %, 0.005-7 vol. %, 0.005-6 vol. %, 0.005-5 vol. %, 0.005-4 vol. %, 0.005-3 vol. %, 0.005-2 vol. %, 0.005-1 vol. %, 0.005-0.9 vol. %, 0.005-0.8 vol. %, 0.005-0.7 vol. %, 0.005-0.6 vol. %, 0.005-0.5 vol. %, 0.005-0.4 vol. %, 0.005-0.3 vol. %, 0.005-0.2 vol. %, 0.005-0.1 vol. %, 0.005-0.075 vol. %, 0.005-0.05 vol. %, 0.005-0.025 vol. %, 0.005-0.01 vol. %, 0.005-0.0075 vol. %, 0.005-0.0075 vol. %, 0.0075-0.01 vol. %, 0.01-0.025 vol. %, 0.025-0.05 vol. %, 0.05-0.075 vol. %, 0.075-0.1 vol. %, 0.1-0.2 vol. %, 0.2-0.3 vol. %, 0.3-0.4 vol. %, 0.4-0.5 vol. %, 0.5-0.6 vol. %, 0.6-0.7 vol. %, 0.7-0.8 vol. %, 0.8-0.9 vol. %, 0.9-1 vol. %, 1-2 vol. %, 2-3 vol. %, 3-4 vol. %, 4-5 vol. %, 5-6 vol. % 6-7 vol. %, 7-8 vol. %, 8-9 vol. %, 9-10 vol. %, 10-11 vol. %, 11-12 vol. %, 12-13 vol. %, 13-14 vol. %, 14-15 vol. %, 15-16 vol. %, 16-17 vol. %, 17-18 vol. %, 18-19 vol. %, 19-20 vol. %, 0.05-5.0 vol. %, 0.1-2.0 vol. %, 0.1-1 vol. %, 0.25-0.75 vol. %, 0.4-0.6, or the introduced volume of biocrude oil in the pre-determined time interval may be in the in the range of 0.5-3 vol. % relative to the total conversion unit feedstock input rate.

In certain embodiments, for example, the pre-determined time interval may be a continuous time interval, for example a continuous time interval in the range of 0.1-1 minute, 1-5 minutes, 5-10 minutes, 10-30 minutes, 30-60 minutes, 1-2 hours, 2-4 hours, 4-6 hours, 6-8 hours, 8-12 hours, 12-16 hours, 16-18 hours, 18-20 hours, 20-24 hours, 1-2 days, 2-4 days, 4-5 days, 5-7 days, 7-14 days, 14-21 days, 21-30 days, 21-31 days, 1-2 months, 2-3 months, 3-6 months, or a continuous time interval in the range of 6-12 months. In certain embodiments, the pre-determined time interval may be an average of a discrete plurality of continuous time intervals, for example an average of discrete time intervals taken over a period of 0.1-1 minute, 1-5 minutes, 5-10 minutes, 10-30 minutes, 30-60 minutes, 1-2 hours, 2-4 hours, 4-6 hours, 6-8 hours, 8-12 hours, 12-16 hours, 16-18 hours, 18-20 hours, 20-24 hours, 1-2 days, 2-4 days, 4-5 days, 5-7 days, 7-14 days, 14-21 days, 21-30 days, 21-31 days, 1-2 months, 2-3 months, 3-6 months, or a continuous time interval in the range of 6-12 months.

In certain embodiments, for example, the introduced amount of biocrude oil may be in the range of 0.005-20 wt. % relative to the total weight of biocrude oil and petroleum fraction co-processed in the conversion unit, such as 0.1-2 wt. %, 0.25-13 wt. %, 0.25-10 wt. %, 0.25-7 wt. %, 0.25-5 wt. %, or 0.5-1 wt. %, relative to the total weight of biocrude oil and petroleum fraction co-processed in the conversion unit. In certain embodiments, for example, the introduced weight of biocrude oil may be in the range of may be 0.25 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, relative to the total weight of biocrude oil and petroleum fraction co-processed in the conversion unit.

In certain embodiments, for example, the introduced amount of biocrude oil may be in the range of 0.005-20 vol. % relative to the total volume of biocrude oil and petroleum fraction co-processed in the conversion unit, such as 0.1-2 vol. %, 0.25-13 vol. %, 0.25-10 vol. %, 0.25-7 vol. %, 0.25-5 vol. %, or 0.5-1 vol. %, relative to the total volume of biocrude oil and petroleum fraction co-processed in the conversion unit. In certain embodiments, for example, the introduced volume of biocrude oil may be in the range of may be 0.25 vol. %, 0.5 vol. %, 1 vol. %, 2 vol. %, 3 vol. %, 4 vol. %, 5 vol. %, 6 vol. %, 7 vol. %, 8 vol. %, 9 vol. %, 10 vol. %, 11 vol. %, 12 vol. %, 13 vol. %, 14 vol. %, 15 vol. %, 16 vol. %, 17 vol. %, 18 vol. %, 19 vol. %, 20 vol. %, relative to the total volume of biocrude oil and petroleum fraction co-processed in the conversion unit.

In certain embodiments, the biocrude oil may be contacted with a petroleum material prior to introduction to the conversion unit to form, for example, a mixture, a colloidal mixture, a suspension, a 2-part mixture, a blend, a solution, or an emulsion. In certain embodiments, the contacted biocrude oil and petroleum material may form a pre-blend. In certain embodiments, the pre-blend may be formed inline, for example with a stream of the petroleum material, for example using one or more of a blender, a high shear mixer, an in-line mixer, a static mixer, a recycle system (inclusive of one or more recycle streams in a refinery or a product stream comprising a heavy cycle oil, a distillate oil, and/or a light cycle oil), an ultrasonic mixer, a mix atomizer, a surfactant, an emulsifier and/or other another mixing aid. In certain embodiments, the pre-blend may be formed using one or more of a blender, a high shear mixer, an in-line mixer, a static mixer, a recycle system (inclusive of one or more recycle streams in a refinery or a product stream comprising a heavy cycle oil, a distillate oil, and/or a light cycle oil), an ultrasonic mixer, a mix atomizer, a surfactant, an emulsifier and/or other another mixing aid. In certain further embodiments, the petroleum material may be a gasoline, a light cycle oil, gas oil, a blend of gas oils, a heavy gas oil, a light gas oil, or a vacuum gas oil or other petroleum materials and/or blends. In certain embodiments, the biocrude oil may be contacted with the petroleum material in the presence of one or more surfactant (for example one or more of the surfactants described herein). In certain embodiments, the weight ratio of the biocrude oil to the petroleum material may be in the range of 0.005-100, for example in the range of 0.005-0.01, 0.01-0.025, 0.025-0.05, 0.05-0.075, 0.075-0.1, 0.1-0.25, 0.25-0.5, 0.5-1, 1-2, 2-4, 4-8, 8-10, 10-25, 25-50, 50-75, or in the range of 75-100. In certain embodiments, the weight ratio of the petroleum material to the biocrude oil may be in the range of 0.005-100, for example in the range of 0.005-0.01, 0.01-0.025, 0.025-0.05, 0.05-0.075, 0.075-0.1, 0.1-0.25, 0.25-0.5, 0.5-1, 1-2, 2-4, 4-8, 8-10, 10-25, 25-50, 50-75, or in the range of 75-100.

In addition to the numerous advantages of processing BCO along with petroleum-containing feed stream (or petroleum fraction feedstock) noted herein, by introducing the BCO material in-line as a pre-mixture, improved mixing with the petroleum feedstock may be achieved and improved yields of desirable products obtained. Pre-mixing of BCO with a petroleum feedstock may also result in limiting the production of undesirable products such as coke and char.

In certain embodiments, the water content of the biocrude oil may be in the range of 0.05 wt. % to 40 wt. %, relative to the weight of the biocrude oil inclusive of the water, for example the water content of the biocrude oil may be in the range of 1 wt. % to 35 wt. %, such as 5 wt. % to 35 wt. %, 10 wt. % to 30 wt. %, 10 wt. % to 20 wt. %, 10 wt. % to 15 wt. %, 15 wt. % to 25 wt. %, 15 wt. % to 20 wt. %, 20 wt. % to 35 wt. %, 20 wt. % to 30 wt. %, 20 wt. % to 25 wt. %, 25 wt. % to 30 wt. %, or the water content of the biocrude oil may be in the range of 30 wt. % to 35 wt. %, relative to the weight of the biocrude oil inclusive of the water. In certain embodiments, the water content of the biocrude oil may be at least 10 wt. %, relative to the weight of the biocrude oil inclusive of the water, at least 15 wt. %, at least 20 wt. %, at least 23 wt. %, at least 25 wt. %, at least 28 wt. %, at least 30 wt. %, at least 31 wt. %, at least 32 wt. %, at least 33 wt. %, or the water content of the biocrude oil may be at least at least 35 wt. %, relative to the weight of the biocrude oil inclusive of the water. In certain embodiments, the water content of the biocrude oil may be less than 38 wt. %, relative to the weight of the biocrude oil inclusive of the water, for example the water content of the biocrude oil may be less than 35 wt. %, relative to the weight of the biocrude oil inclusive of the water, less than 34 wt. %, less than 30 wt. %, less than 25 wt. %, less than 20 wt. %, or the water content of the biocrude oil may be less than less than 15 wt. %, relative to the weight of the biocrude oil inclusive of the water.

In certain embodiments, a biocrude oil may be introduced into a refinery system, such as an FCC, a hydrotreating unit, or a hydrocracker unit, in a range of between 0.05 wt. % and 20 wt. %, relative to the amount of a petroleum fraction feedstock introduced, such as between 0.05 wt. % and 15 wt. %, between 0.05 wt. % and 14 wt. %, between 0.05 wt. % and 13 wt. %, between 0.05 wt. % and 12 wt. %, between 0.05 wt. % and 11 wt. %, between 0.05 wt. % and 10 wt. %, between 0.05 wt. % and 9 wt. %, between 0.05 wt. % and 8 wt. %, between 0.05 wt. % and 7 wt. %, between 0.5 wt.

% and 20 wt. %, between 0.5 wt. % and 15 wt. %, between 0.5 wt. % and 10 wt. %, between 1 wt. % and 15 wt. %, between 2 wt. % and 12 wt. %, between 3 wt. % and 10 wt. %, between 4 wt. % and 9 wt. %, or between 7 wt. % and 15 wt. %, relative to the amount of a petroleum fraction feedstock introduced.

Certain embodiments, for example, may comprise co-processing a petroleum fraction, a biocrude oil, and one or more component additives as reactants in a conversion unit. In certain further embodiments, for example, the petroleum fraction may comprise 80-99.95 wt. % of the reactants, and the other reactants (inclusive of the biocrude oil and the one or more component additives) may comprise 20-0.05 wt. % of the reactants, for example the petroleum fraction may comprise 80-99.95 wt. % of the reactants, and the other reactants may comprise 20-0.05 wt. % of the reactants, the petroleum fraction may comprise 85-99.95 wt. % of the reactants, and the other reactants may comprise 15-0.05 wt. % of the reactants, the petroleum fraction may comprise 90-99.95 wt. % of the reactants, and the other reactants may comprise 10-0.05 wt. % of the reactants, the petroleum fraction may comprise 93-99.95 wt. % of the reactants, and the other reactants may comprise 7-0.05 wt. % of the reactants, the petroleum fraction may comprise 95-99.95 wt. % of the reactants, and the other reactants may comprise 5-0.05 wt. % of the reactants, the petroleum fraction may comprise 96-99.95 wt. % of the reactants, and the other reactants may comprise 4-0.05 wt. % of the reactants, the petroleum fraction may comprise 97-99.95 wt. % of the reactants, and the other reactants may comprise 3-0.05 wt. % of the reactants, the petroleum fraction may comprise 98-99.95 wt. % of the reactants, and the other reactants may comprise 2-0.05 wt. % of the reactants, the petroleum fraction may comprise 98.25-99.95 wt. % of the reactants, and the other reactants may comprise 1.75-0.05 wt. % of the reactants, the petroleum fraction may comprise 98.5-99.95 wt. % of the reactants, and the other reactants may comprise 1.5-0.05 wt. % of the reactants, the petroleum fraction may comprise 98.75-99.95 wt. % of the reactants, and the other reactants may comprise 1.25-0.05 wt. % of the reactants, the petroleum fraction may comprise 99-99.95 wt. % of the reactants, and the other reactants may comprise 1-0.05 wt. % of the reactants, the petroleum fraction may comprise 99.1-99.95 wt. % of the reactants, and the other reactants may comprise 0.9-0.05 wt. % of the reactants, the petroleum fraction may comprise 99.2-99.95 wt. % of the reactants, and the other reactants may comprise 0.8-0.05 wt. % of the reactants, the petroleum fraction may comprise 99.3-99.95 wt. % of the reactants, and the other reactants may comprise 0.7-0.05 wt. % of the reactants, the petroleum fraction may comprise 99.4-99.95 wt. % of the reactants, and the other reactants may comprise 0.6-0.05 wt. % of the reactants, the petroleum fraction may comprise 99.5-99.95 wt. % of the reactants, and the other reactants may comprise 0.5-0.05 wt. % of the reactants, the petroleum fraction may comprise 99.6-99.95 wt. % of the reactants, and the other reactants may comprise 0.4-0.05 wt. % of the reactants, the petroleum fraction may comprise 99.7-99.95 wt. % of the reactants, and the other reactants may comprise 0.3-0.05 wt. % of the reactants, the petroleum fraction may comprise 99.8-99.95 wt. % of the reactants, and the other reactants may comprise 0.2-0.05 wt. % of the reactants, the petroleum fraction may comprise 99.9-99.95 wt. % of the reactants, and the other reactants may comprise 0.1-0.05 wt. % of the reactants, the petroleum fraction may comprise 99.925-99.95 wt. % of the reactants, and the other reactants (inclusive of the biocrude oil and the one or more component additives) may comprise 0.075-0.05 wt. % of the reactants.

In certain embodiments, for example, the petroleum fraction may comprise 80-99.95 vol. % of the reactants, and the other reactants (inclusive of the biocrude oil and the one or more component additives) may comprise 20-0.05 vol. % of the reactants, for example the petroleum fraction may comprise 80-99.95 vol. % of the reactants, and the other reactants may comprise 20-0.05 vol. % of the reactants, the petroleum fraction may comprise 85-99.95 vol. % of the reactants, and the other reactants may comprise 15-0.05 vol. % of the reactants, the petroleum fraction may comprise 90-99.95 vol. % of the reactants, and the other reactants may comprise 10-0.05 vol. % of the reactants, the petroleum fraction may comprise 93-99.95 vol. % of the reactants, and the other reactants may comprise 7-0.05 vol. % of the reactants, the petroleum fraction may comprise 95-99.95 vol. % of the reactants, and the other reactants may comprise 5-0.05 vol. % of the reactants, the petroleum fraction may comprise 96-99.95 vol. % of the reactants, and the other reactants may comprise 4-0.05 vol. % of the reactants, the petroleum fraction may comprise 97-99.95 vol. % of the reactants, and the other reactants may comprise 3-0.05 vol. % of the reactants, the petroleum fraction may comprise 98-99.95 vol. % of the reactants, and the other reactants may comprise 2-0.05 vol. % of the reactants, the petroleum fraction may comprise 98.25-99.95 vol. % of the reactants, and the other reactants may comprise 1.75-0.05 vol. % of the reactants, the petroleum fraction may comprise 98.5-99.95 vol. % of the reactants, and the other reactants may comprise 1.5-0.05 vol. % of the reactants, the petroleum fraction may comprise 98.75-99.95 vol. % of the reactants, and the other reactants may comprise 1.25-0.05 vol. % of the reactants, the petroleum fraction may comprise 99-99.95 vol. % of the reactants, and the other reactants may comprise 1-0.05 vol. % of the reactants, the petroleum fraction may comprise 99.1-99.95 vol. % of the reactants, and the other reactants may comprise 0.9-0.05 vol. % of the reactants, the petroleum fraction may comprise 99.2-99.95 vol. % of the reactants, and the other reactants may comprise 0.8-0.05 vol. % of the reactants, the petroleum fraction may comprise 99.3-99.95 vol. % of the reactants, and the other reactants may comprise 0.7-0.05 vol. % of the reactants, the petroleum fraction may comprise 99.4-99.95 vol. % of the reactants, and the other reactants may comprise 0.6-0.05 vol. % of the reactants, the petroleum fraction may comprise 99.5-99.95 vol. % of the reactants, and the other reactants may comprise 0.5-0.05 vol. % of the reactants, the petroleum fraction may comprise 99.6-99.95 vol. % of the reactants, and the other reactants may comprise 0.4-0.05 vol. % of the reactants, the petroleum fraction may comprise 99.7-99.95 vol. % of the reactants, and the other reactants may comprise 0.3-0.05 vol. % of the reactants, the petroleum fraction may comprise 99.8-99.95 vol. % of the reactants, and the other reactants may comprise 0.2-0.05 vol. % of the reactants, the petroleum fraction may comprise 99.9-99.95 vol. % of the reactants, and the other reactants may comprise 0.1-0.05 vol. % of the reactants, the petroleum fraction may comprise 99.925-99.95 vol. % of the reactants, and the other reactants (inclusive of the biocrude oil and the one or more component additives) may comprise 0.075-0.05 vol. % of the reactants.

In certain embodiments, for example, an amount of a biocrude oil and optionally one or more component additives may be contacted with a vacuum gas oil prior to introduction to a conversion unit. In certain further embodiments, for example, the contacted biocrude oil and vacuum gas oil may form a blend, a mixture, a single phase mixture, a two-phase mixture, a dispersion, a suspension, or an emulsion. In certain embodiments, for example, the vacuum gas oil by be a refinergy fluidized catalytic cracker feedstock. In certain embodiments, for example, the contacted biocrude oil and vacuum gas oil may have a measured Total Acid Number less than 2.0, for example a Total Acid Number in a range of 0.05-2, 0.05-1, 0.05-0.25, 0.05-0.5, 0.5-1, or in the range of 1-2.

In certain embodiments, for example, a petroleum fraction may be co-processed with a biocrude oil and one or more component additives (inclusive of any component additive that may have undergone a chemical reaction as a result of being contacted with the biocrude oil and/or the petroleum fraction) in a conversion unit in the presence of a catalyst. In certain embodiments, for example, the conversion unit may be a fluidized catalytic cracker. In certain embodiments, for example, the catalyst may comprise a hydrogen form of zeolite, for example a hydrogen form of zeolites typically used in fluidized catalytic crackers. In certain embodiments, for example, the catalyst may comprise a powerful solid-based acid. In certain further embodiments, for example, the catalyst may be configured to catalyze an acid-catalyzed reaction, an isomerisation, an alkylation, and/or a cracking reaction. Without being bound by any particular theory, for example, in certain embodiments, the catalyst may have a specific activation modality based on quantum-chemical Lewis acid site reactions. In certain embodiments, for example, the biocrude oil and/or one or more component additives may interact synergistically with the catalyst to preferentially yield an improved (more desirable) distribution of cracking products. In certain further embodiments, the biocrude oil and/or one or more component additives may interact synergistically with the catalyst to preferentially yield an improved (more desirable) distribution of cracking products by increasing the acidity (for example the Total Acid Number) of the material contacted with the catalyst.

In certain embodiments, for example, a biocrude oil, at least a first component additive, and a petroleum fraction may be introduced to a conversion unit through the same introduction port. In certain further embodiments, for example, at least a second component additive may be introduced into the conversion unit through a second port. In certain embodiments, for example, a biocrude oil and at least a first component additive may be pre-contacted and introduced together into a conversion unit through a first port and a petroleum fraction may be introduced through a second port. In certain embodiments, for example, a biocrude oil and a petroleum fraction may be pre-contacted and introduced together into a conversion unit through a first port and at least a first of one or more component additives may be introduced into the conversion unit through a second port. In certain embodiments, for example, at least one of the one or more component additives may be pre-contacted and introduced together into a conversion unit through a first port and at least a first of one or more biocrude oil may be introduced into the conversion unit through a second port. In certain embodiments, at least one of the one or more component additives is pulsed into the conversion unit. In certain embodiments, at least a portion of the biocrude oil is pulsed into the conversion unit. In certain embodiments, at least a portion of a first component additive is pulsed into the conversion unit.

Certain embodiments, for example, may provide an assembly for introducing a biocrude oil optionally containing one or more component additives (for example 2-5 wt. % ethanol relative to the weight of the biocrude oil) into a catalytic conversion unit, said conversion unit comprising, for example, a refinery fluidized catalytic cracker or a field upgrader operation. In certain further embodiments, for example, the conversion unit may have a catalyst contact time of a period of seconds, for example 0.5 to 15 seconds, such as 1 second, 1.5 seconds, 2 seconds, 2.5 seconds, 3 seconds, 3.5 seconds, 4 seconds, 5 seconds and time periods approximating these times for example approximately 3-5 seconds.

Certain embodiments may provide, for example, a system for producing one or more fuel, said system comprising: a production facility for producing a biocrude oil (for example a biocrude oil produced by non-catalytic rapid thermal processing and optionally conditioned); and a refinery system configured to co-process the biocrude oil with a petroleum fraction and optionally one or more component additives, wherein the refinery system may be selected from a conversion unit consisting of a fluid catalytic cracker, a coker, a field upgrader system, a lube oil refinery facility, a hydrocracker, a hydrotreating unit, and a desulfurization unit. In certain further embodiments, the production facility is co-located with the refinery system. In certain embodiments, the biocrude oil is transported (for example by tanker truck, railcar or pipeline) from the production facility to the refinery system. In certain embodiments, the refinery system comprises storage and/or intermediate storage (for example temporary storage of a bio-oil following addition of a component additive) for the biocrude oil. In certain embodiments, the biocrude oil introduced to the refinery system comprises at least a portion of one of one or more component additives. In certain embodiments, at least a portion of one of one or more component additives is contacted (for example mixed) with the biocrude oil after the biocrude oil is introduced to the refinery system.

Certain embodiments may provide, for example, an apparatus for co-processing a petroleum fraction with a biocrude oil and optionally one or more component additives. In certain embodiments, for example, the apparatus may comprise a fluid catalytic cracker, a coker, a field upgrader system, a lube oil refinery facility, a hydrocracker, a hydrotreating unit, a refinery system, and a desulfurization unit.

In certain embodiments, for example, the apparatus may comprise a retro-fitted fluidized catalytic cracker refinery system having one or more retro-fitted ports for introducing a biocrude oil and/or one or more component additives. The retro-fitted port, for example, may be stainless steel port, such as a 304 or 316 stainless steel port, titanium or some other alloy or combination of high durability, high corrosive environment material.

Certain embodiments may provide, for example, a system comprising an apparatus, and a method of using the same, for example a refinery system, such as a fluidized catalytic cracker, a fluidized catalytic cracker refinery system, a coker, a coking unit, a field upgrader unit, a hydrotreater, a hydrotreatment unit, a hydrocracker, a hydrocracking unit, a desulfurization unit, or a retro-fitted refinery system, in conjunction with providing, injecting, introducing, or processing a biocrude oil and one or more component additives, inclusive of one or more component additives that is not pre-mixed with either the biocrude oil or the petroleum fraction, one or more component additives that is pre-mixed with the biocrude oil and/or the petroleum fraction, and one or more component additives that is at least partially reacted with at least a portion of the biocrude oil and/or the petroleum fraction (for example an acylation reaction). In certain embodiments, for example, a refinery system for processing a petroleum fraction feedstock with a biocrude oil and one or more component additives may include a retro-fitted refinery system, a fluidized catalytic cracker, a retro-fitted fluidized catalytic cracker, a coker, a retro-fitted coker, a field upgrader unit, a hydrotreater, a retro-fitted hydrotreater, a hydrocracker, or a retro-fitted hydrocracker.

Certain embodiments may provide, for example, producing a plurality of fuel products comprising co-processing a plurality of reactants comprising a biocrude oil, one or more component additives, and a petroleum fraction in a fluidized catalytic cracker. In certain embodiments, for example, the presence of the biocrude oil and/or the one or more component additives may increase the average total acid number of material (taken as a whole) contacting a catalyst (for example a zeolite Lewis acid catalyst) present in the fluidized catalytic cracker. In certain further embodiments, the zeolite catalyst may comprise a hydrogen form of the zeolite (for example ZSM-5). Without being bound by any particular theory, it is believed that the increased average total acid number experience by such a zeolite catalyst may increase yield of certain products (for example light products, for example gasoline) of the plurality of fuel products relative to the yield of certain other products (for example heavy products, for example heavy cycle oil and clarified slurry oil) of the plurality of fuel products. In certain further embodiments the certain other products may be less desireable relative to the certain products. In certain embodiments, for example, the weight ratio of gasoline to heavy cycle oil may be increased in the range of 0.5-50%, for example in the range of 0.5-25%, 1-25%, 1-15%, 2-15%, 2-10%, 2-5%, 3-15%, 3-10%, or 3-5% or the weight ratio of gasoline to heavy cycle oil may be increased in the range of 0.5-3%.

In certain embodiments, the weight ratio of the total amount of the plurality of reactants (inclusive of the petroleum fraction, the biocrude oil, and one or more component additives (and further inclusive of the introducing all of the reactants separately or introducing any two or more reactants together into the fluidized catalytic cracker)) introduced to the fluidized catalytic cracker to the weight of catalyst utilized in the fluidized catalytic cracker (for example, the catalyst-to-oil ratio, i.e., the weight of catalyst that is contacted with said plurality of reactants) may be in the range of between 4:1 to 15:1. For example, the catalyst-to-oil ratio may be in the range of between 4:1 to 13:1, such as between 5:1 to 10:1, between 5:1 to 9:1, between 6:1 to 8:1, between 4:1 to 7:1, or between 6:1 to 7:1. For example, the catalyst-to-oil ratio may be 4:1, such as 5:1, 6:1, 7:1, 8:1, 9:1, 10:1, 11:1, 12:1, 13:1, 14:1, or 15:1.

In certain embodiments, for example, a contact time of the catalyst with the reactants may comprise a residence time in riser of the fluidized catalytic cracker and a separate residence time in a riser termination system. In certain further embodiments, for example, the riser residence time may be the range of 2-3 seconds residence time in the termination system may in the range of 1-2 seconds, resulting in a total catalyst contact time in the range of 3-5 seconds. In certain embodiments, for example, the total contact time may be greater than 2 seconds, for example greater than 3 seconds, greater than 4 seconds, for example in the range of 3-7 seconds, 2-4 seconds, 3-4 seconds, or in the range of 3-5 seconds. In certain embodiments, for example, the total contact time may be greater than 3 seconds, for example a total contact time in the range of 3-7 seconds or a total contact time in the range of 3-5 seconds.

In certain embodiments, for example, the total contact time of the biocrude oil and/or one or more component additives may be less than the total contact time of the petroleum fraction. In certain further embodiments, for example, the total contact time of at least a portion of the biocrude oil and/or at least a portion of one of the one or more component additives may be in the range of 1-95% less than the total contact time of at least a portion of the petroleum fraction, for example in the range of 1-75% less, 5-50% less, 5-25% less, 5-10% less, or the total contact time of the at least a portion of the biocrude oil and/or at least a portion of one of the one or more component additives may be in the range of 25-75% less than less than the total contact time of at least a portion of the petroleum fraction. In certain embodiments, for example, the at least a portion of the biocrude oil and/or at least a portion of one of the one or more component additives may be introduced downstream of at least a portion of the petroleum fraction.

In certain embodiments, for example, the total contact time of the biocrude oil and/or one or more component additives may be greater than the total contact time of the petroleum fraction. In certain further embodiments, for example, the total contact time of at least a portion of the biocrude oil and/or at least a portion of one of the one or more component additives may be in the range of 1-95% greater than the total contact time of at least a portion of the petroleum fraction, for example in the range of 1-75% less, 5-50% less, 5-25% less, 5-10% less, or the total contact time of the at least a portion of the biocrude oil and/or at least a portion of one of the one or more component additives may be in the range of 25-75% greater than greater than the total contact time of at least a portion of the petroleum fraction. In certain embodiments, for example, the at least a portion of the biocrude oil and/or at least a portion of one of the one or more component additives may be introduced upstream of at least a portion of the petroleum fraction.

Certain embodiments, for example, may comprise co-processing in the range of 90-99.95 wt. % of a petroleum fraction and 0.05-10 wt. % of a biocrude oil in a fluidized catalytic cracker wherein the total contact time with the catalyst is greater than 3 seconds, and wherein said biocrude oil comprises a product of non-catalytic rapid thermal processing and the biocrude oil and in the range of 2-10 wt. % ethanol component additive (relative to the weight of the biocrude oil, inclusive of the weight of the ethanol). Certain embodiments, for example, may comprise co-processing in the range of 97.5-99.95 wt. % of a petroleum fraction and 0.05-2.5 wt. % of a biocrude oil in a fluidized catalytic cracker wherein the total contact time with the catalyst is greater than 3 seconds, and wherein said biocrude oil comprises a product of non-catalytic rapid thermal processing and the biocrude oil and 2-5 wt. % ethanol component additive (relative to the weight of the biocrude oil, inclusive of the weight of the ethanol).

FIG. 1 is a schematic flow diagram of a "side-by-side" fluidized catalytic cracker process configured to co-process a petroleum fraction with a biocrude oil and one or more component additives 101. The fluidized catalytic cracker may have two or more injection points for example a first injection point for the petroleum fraction feedstock and a second injection point for the biocrude oil and the one or more component additives. The second injection point may be an added and/or retrofitted injection point. Alternatively, the fluidized catalytic cracker may have a one or more injection point that co-inject two or more of the petroleum fraction, biocrude oil, and one or more component additives.

FIGS. 2A & B illustrate feed inlet port 201 configured to introduce a petroleum fraction into a fluidized catalytic cracker and feed inlet ports 102 or retro-fitted injectors 201 configured to introduce biocrude oil feedstock and one or more component additives 101 either upstream or downstream of the petroleum fraction.

FIG. 3 illustrates a riser quench system injecting a biocrude oil and one or more component additives above the riser above petroleum fraction injection nozzles 201. Recycle material may act as a heat sink as it may be vaporized by the catalyst. At constant riser outlet temperature, quench may increase the catalyst-to-oil ratio because the riser outlet temperature control point may be downstream of the quench location. Introduction of the quench oil may also increases the temperature in the mix zone and lower section of the riser, as shown in FIG. 3. In certain embodiments, for example, the biocrude oil feedstock and one or more component additives may be injected into the quench line of the riser.

In certain embodiments, for example, the petroleum fraction may comprise vanadium, nickel, sodium and/or iron contaminants. In certain further embodiments, the biocrude oil may comprise less vanadium, nickel, sodium and/or iron contaminants, on a weight basis relative to the petroleum fraction, for example in the range of 25-100% less, for example 25-75% less, 25-99.999% less, 25-50% less, 95-99.9999% less, or in the range of 90-100% less. In certain embodiments, for example, co-processing a petroleum fraction with a biocrude oil in the presence of a catalyst (for example a zeolite fluidized catalytic cracking catalyst) may increase the useful life of the catalyst relative to processing without the biocrude oil, for example co-processing a petroleum fraction with 0.5-5 wt. % biocrude oil (relative to the combined weight of the biocrude oil, the petroleum fraction, and one or more component additives) may increase the useful life of the catalyst in the range of 1-50%, for example in the range of 1-25%, 1-10%, or in the range of 1-5%.

In certain embodiments, for example, co-processing a petroleum fraction with a biocrude oil in the presence of a catalyst (for example a zeolite fluidized catalytic cracking catalyst) may increase the conversion of the fluidized catalytic cracking reactants into liquid fuel products relative to processing without the biocrude oil, for example co-processing a petroleum fraction with 0.5-5 wt. % biocrude oil (relative to the combined weight of the biocrude oil, the petroleum fraction, and one or more component additives) may increase the conversion rate into liquid fuel products in the range of 1-25%, for example in the range of 1-15%, 1-10%, or in the range of 1-5%.

FIG. 4 illustrates a coking unit for use with the present system, according to one embodiment. A coker or coker unit may be a type of conversion unit that may be used in an oil refinery processing unit that converts the biocrude oil feedstock 101. The process thermally cracks the long chain hydrocarbon molecules in the residual oil feed into shorter chain molecules.

Certain embodiments, for example, may comprise injecting the biocrude oil and one or more component additives into a riser of a fluid catalytic cracking unit where the injected biocrude oil and one or more component additives may contact a catalyst. In certain embodiments, for example, the biocrude oil and one or more component additives may be injected upstream of a petroleum fraction (for example, vacuum gas oil) inlet port of the fluidized catalytic cracking unit. In certain embodiments, for example, the biocrude oil and one or more component additives may be injected downstream of a petroleum fraction (for example, vacuum gas oil) inlet port of the fluidized catalytic cracking unit. In certain embodiments, for example, the biocrude oil may be injected upstream and the one or more component additives may be injected downstream of a petroleum fraction (for example, vacuum gas oil) inlet port of the fluidized catalytic cracking unit. In certain embodiments, for example, the biocrude oil may be injected downstream and the one or more component additives may be injected upstream of a petroleum fraction (for example, vacuum gas oil) inlet port of the fluidized catalytic cracking unit. In certain embodiments, for example, the biocrude oil and/or one or more component additives may be injected into a riser quench line of a fluid catalytic cracking unit. In certain embodiments, for example, the biocrude oil and/or one or more component additives may be injected into a second riser of a two-riser fluid catalytic cracking unit.

FIG. 5 illustrates an exemplary upgraded feed injection wherein feed nozzles are modified to inject biocrude oil (for example unconditioned biocrude oil, conditioned biocrude oil, or biocrude oil containing one or more component additives) 101, whereby, for example, the feed nozzles may comprise stainless steel, or other appropriate metallurgy.

FIG. 6 illustrates a fluidized catalytic cracker with dual risers 201 configured to co-process a petroleum fraction, a biocrude oil, and one or more component additives in the presence of a catalyst. The dual riser system may comprise a least a first input element for introducing a petroleum fraction and at least a second input element for introducing a biocrude oil (and optionally one or more component additives, such that they can contact the catalyst and be co-processed. In certain configurations, for example, the at least a second input element may be one or more retro-fitted input elements.

Certain embodiments, for example, may comprise a fluidized catalytic cracker unit wherein steam and/or a vaporized component additive is injected to lift cracking catalyst as well provide dilution media for residence time control. In certain embodiments, for example, lift steam may enter a fluidized catalytic cracker riser unit from the bottom of the unit and/or through nozzles on the side of the reactor. In certain further embodiments, for example, the nozzles may be located below, above, or co-located with the injection point of the biocrude oil, the petroleum fraction, or a combination of the petroleum fraction and the biocrude oil.

Certain embodiments, for example, may comprise a biocrude storage and delivery system for introducing a biocrude oil to a conversion unit (for example a fluidized catalytic cracking unit, for example a fluidized catalytic cracking unit present in a refinery). In certain embodiments, for example, the biocrude oil delivery system may comprise one or more of a storage tank, a pump, a pre-heater, and a transfer line. Certain embodiments, for example, may comprise a storage and delivery system for introducing one or more component additives to a conversion unit (for example a fluidized catalytic cracking unit, for example a fluidized catalytic cracking unit present in a refinery). In certain embodiments, for example, the one or more component additives delivery system may comprise one or more of a storage tank, a pump, a pre-heater, and a transfer line. Certain embodiments may provide a contacting system for contacting (for example mixing) one or more of a biocrude oil, one or more component additives, a petroleum fraction, and optionally additional petroleum material.

Certain embodiments, for example, may comprise introducing biocrude oil and/or one or more component additives (for example ethanol) into a lift steam line proximate the bottom of a riser of a fluidized catalytic cracker, for example below the mid-point of the riser.

Certain embodiments, for example, may comprise introducing biocrude oil and/or one or more component additives (for example ethanol) into a velocity steam line of a fluidized catalytic cracker. In certain embodiments, for example, the velocity steam line may be located upstream of an injection point of a petroleum fraction. In certain embodiments, for example, the velocity steam line may be located downstream of an injection point of a petroleum fraction.

In certain further embodiments, for example, the biocrude oil and/or one or more component additives may be introduced through an atomizing nozzle that may be inserted into one or more steam line or may be introduced into one or more recycle lift vapor line.

Certain embodiments, for example, may comprise controlling the addition rate of a biocrude oil (inclusive of a biocrude oil that has been contacted with one or more component additives) to a conversion unit at least partially independently of the addition rate of a petroleum fraction and/or a further one or more component additives. In certain further embodiments, for example, at least a portion of the biocrude oil may be introduced through the same injection nozzle as the petroleum fraction. In certain embodiments, for example, at least a portion of the biocrude oil may be introduced through the a different injection nozzle than the petroleum fraction.

Certain embodiments, for example, may comprise controlling the addition rate of a component additive (inclusive of one or more component additives that has been contacted with a biocrude oil) to a conversion unit at least partially independently of the addition rate of a petroleum fraction and/or a further one or more component additives. In certain further embodiments, for example, at least a portion of the one or more component additives oil may be introduced through the same injection nozzle as the petroleum fraction. In certain embodiments, for example, at least a portion of the one or more component additives may be introduced through the a different injection nozzle than the petroleum fraction.

A coke may either be fuel grade (high in sulphur and metals) or anode grade (low in sulphur and metals). The raw coke directly out of a coker may be often referred to as green coke. In this context, "green" means unprocessed. The further processing of green coke by calcining in a rotary kiln removes residual volatile hydrocarbons from the coke. A calcined petroleum coke may be further processed in an anode baking oven in order to produce anode coke of the desired shape and physical properties. The anodes are mainly used in the aluminum and steel industry.

Crude oil extracted from field operations, such as the Western Canadian oil sands, may be pre-processed before it may be fit for pipeline transport and utilization in conventional refineries. This pre-processing may be called 'upgrading' (performed by a field upgrader unit), the key components of which are as follows:

Removal of water, sand, physical waste, and lighter products;
Hydrotreating; and
Hydrogenation through carbon rejection or catalytic hydrocracking (HCR).

As carbon rejection may be very inefficient and wasteful in most cases, catalytic hydrocracking may be preferred in some cases.

Hydrotreating and hydrocracking together may be known as hydroprocessing. The big challenge in hydroprocessing may be to deal with the impurities found in heavy crude, as they poison the catalysts over time. Many efforts have been made to deal with this to ensure high activity and long life of a catalyst. Catalyst materials and pore size distributions are key parameters that need to be optimized to handle these challenges and this varies from place to place, depending on the kind of feedstock present.

Hydrocracking may be a catalytic cracking process assisted by the presence of an elevated partial pressure of hydrogen gas. Similar to the hydrotreater, the function of hydrogen may be the purification of the hydrocarbon stream from sulfur and nitrogen hetero-atoms.

In certain embodiments, a biocrude oil may be introduced into the field upgrading operations. Methods as previously described may be employed to feed the biocrude oil into any of the unit operations associated with field upgrader systems.

In certain embodiments, a biocrude oil may be introduced into a lube oil refinery facility. Specifically biocrude oil may be introduced into the hydrotreater section of the refinery where gasoline and other transportation fuels are produced. Some biocrude oils such as vegetable oil may have properties that enable the blending, substitution or improvement to the lube oil products.

In certain embodiments, the processing of the petroleum fraction feedstock with the biocrude oil has a substantially equivalent or greater performance in preparing the fuel product, relative to processing solely the petroleum fraction feedstock in the absence of the biocrude oil. For example, processing a up to 20 vol. % of BCO with the remainder petroleum fraction feedstock, for example 2:98, 5:95, 10:90 weight ratio of biocrude oil to the petroleum fraction feedstock may have a substantially equivalent or greater performance in the resulting the fuel products, relative to processing solely the petroleum fraction feedstock in the absence of the biocrude oil. For example, processing in the range of between a 20:80 to 0.05:99.95 weight ratio of biocrude oil with petroleum fraction feedstock may resulting in an weight percent increase in gasoline of more than 0.1 vol. %, for example 0.5 vol. %, 1.0 vol. %, 1.5 vol. %, 2.0 vol. % or more, relative to processing solely the petroleum fraction feedstock in the absence of the biocrude oil.

In certain embodiments, the method may include introducing, injecting, feeding, co-feeding, a biocrude oil into a refinery system via a mixing zone, a nozzle, a retro-fitted port, a retro-fitted nozzle, a velocity steam line, or a live-tap. For example, the method may comprise processing a petroleum fraction feedstock with a biocrude oil. In certain embodiments, the processing may comprise co-injecting the petroleum fraction feedstock and the biocrude oil, such as co-feeding, independently or separately introducing, injecting, feeding, or co-feeding, the petroleum fraction feedstock and the biocrude oil into a refinery system. For example, the petroleum fraction feedstock and the biocrude oil may be provided, introduced, injected, fed, or co-fed proximate to each other into the reactor, reaction zone, reaction riser of the refinery system. In certain embodiments, the biocrude oil may be provided, introduced, injected, fed, co-fed into the reactor, reaction zone, or reaction riser of the refinery system proximate, upstream, or downstream to the delivery or injection point of the petroleum fraction feedstock. In certain embodiments, the petroleum fraction feedstock and the biocrude oil come in contact with each other upon introduction, delivery, injection, feeding, co-feeding into the refinery system, into the reactor, into the reaction zone, or into the reaction riser. In certain embodiments, the petroleum fraction feedstock and the biocrude oil come in contact with each other subsequent to entering the refinery system, the reactor, the reaction zone, or the reaction riser. In certain embodiments, the petroleum fraction feedstock and the biocrude oil make first contact with each other subsequent to entering into, introduction into, injection into, feeding into, or co-feeding into the refinery system, the reactor, the reaction zone, or the reaction riser. In certain embodiments, the petroleum fraction feedstock and the biocrude oil are co-blended prior to injection into the refinery system.

The petroleum fraction feedstock and the biocrude oil may be introduced into the refinery system through different or similar delivery systems. For example, the petroleum fraction feedstock and the biocrude oil may be introduced into the refinery system through one or more independent or separate injection nozzles. The petroleum fraction feedstock and the biocrude oil may be introduced into the refinery system proximate or near to each other in a FCC reactor riser in the refinery system. The biocrude oil may be introduced into the refinery system above, below, near, or proximate the introduction point of the fossil fuel feedstock in the refinery system. In certain embodiments, one or more injection nozzles may be located in a FCC reactor riser in the refinery system suitable for introducing the fossil fuel feedstock or the biocrude oil. The biocrude oil may be introduced into the refinery system through a lift steam line located at the bottom of the FCC reactor riser. In certain embodiments, the petroleum fraction feedstock may be introduced into the refinery system at a first injection point and the biocrude oil may be introduced into the refinery system at a second injection point. For example, the first injection point may be upstream of the second injection point, the first injection point may be downstream of the second injection point, the first injection point may be proximate to the second injection point, the first injection point and the second injection point may be located in a reactor riser, such as an FCC reactor riser. In certain embodiments, a biocrude oil may be introduced below a reactor riser, such as an FCC reactor riser, during conversion of the petroleum fraction feedstock. For example, a biocrude oil may be injected via a quench riser system upstream, downstream, or proximate, from the introduction point of the petroleum fraction feedstock. In certain embodiments, a biocrude oil may be injected via a quench riser system located above, below, or proximate, a petroleum fraction feedstock injection nozzle.

In certain embodiments, the one or more fuel product may comprise a product of a fluidized catalytic cracker having a petroleum fraction and a biocrude oil as reactants, for example, a product of a fluidized catalytic cracker processing a petroleum fraction and a biocrude oil, a product of a fluidized catalytic cracker wherein the fluidized catalytic cracker receives a petroleum fraction and a biocrude oil, a processed product from a mixture of a petroleum fraction feedstock and a biocrude oil that have been in contact with a catalyst.

In certain embodiments, for example, one or more fuel product may be obtained from a fluidized catalytic cracker product composition resulting from contacting a catalyst with a feedstock comprising a biocrude oil, for example a fuel composition derived from a petroleum fraction feedstock, and a biocrude oil feedstock, such as a fuel composition derived from 80-99.95 vol. % of a petroleum fraction feedstock, and 0.05-20 vol. % of a biocrude oil feedstock, or a fuel composition derived from 80-99.95 vol. % of a petroleum fraction feedstock, and 20-0.05 vol. % of a biocrude oil.

In certain embodiments, for example, a method of processing a petroleum fraction with a substituted amount of a biocrude oil in the presence of a catalyst may result in an increased or improved yield of transportation fuel for example, and increase of at least 0.5 vol. %, relative to the identical process on an equivalent energy or carbon content basis of the feedstream wherein the petroleum fraction is not substituted with the biocrude oil. For example, the improved or increased transportation fuel yield may be a gasoline, a diesel fuel, a liquefied petroleum gas, a heating oil, a jet fuel, an light cycle oil, a transportation fuel, and/or a power fuel.

In certain embodiments, for example, a method of improving or increasing petroleum conversion, relative to an equivalent energy input of a fraction of the petroleum, in a refinery may comprise processing a lesser amount of the fraction of the petroleum with a biocrude oil in the presence of a catalyst. For example, the method of improving or increasing petroleum fraction feedstock conversion may comprise processing the petroleum fraction feedstock with a biocrude oil feedstock in the presence of a catalyst. In certain embodiments, a method of improving or increasing fuel yield from a petroleum feedstock, may comprise processing a fraction of the petroleum with a biocrude oil in the presence of a catalyst. For example, the improved or increased fuel yield may be a gasoline, a diesel fuel, a liquefied petroleum gas, a heating oil, a jet fuel, an light cycle oil, a transportation fuel, or a power fuel.

In certain embodiments, for example, a method of preparing a fuel may comprise processing a petroleum fraction feedstock with a biocrude oil feedstock in the presence of a catalyst. In certain embodiments, for example, the method of preparing a fuel may comprise providing a biocrude oil feedstock for processing with a petroleum fraction feedstock in the presence of a catalyst. In certain embodiments, for example, the method of preparing a fuel may comprises: i) processing a petroleum fraction feedstock with a biocrude oil feedstock in the presence of a catalyst; and ii) optionally, adjusting feed addition rates of the petroleum fraction feedstock, the biocrude oil feedstock, or both, to target a particular fuel product profile, riser temperature, or reaction zone temperature; or iii) optionally, adjusting catalyst to combined petroleum fraction feedstock and biocrude oil feedstock ratio (catalyst:oil ratio) to target a particular fuel product profile, riser temperature, or reaction zone temperature; wherein the catalyst:oil ratio may be a weight ratio or a volume ratio.

In certain embodiments, for example, a method of preparing a fuel may comprise: i) processing a petroleum fraction feedstock with a biocrude oil feedstock in the presence of a catalyst; ii) adjusting feed addition rates of the petroleum fraction feedstock, the biocrude oil feedstock, or both, to target a particular fuel product profile, riser temperature, or reaction zone temperature; and iii) optionally, adjusting catalyst to combined petroleum fraction feedstock and biocrude oil feedstock ratio (catalyst:oil ratio) to target a particular fuel product profile, riser temperature, or reaction zone temperature; wherein the catalyst:oil ratio may be a weight ratio or a volume ratio. For example, the method of preparing a fuel may comprises: i) processing a petroleum fraction feedstock with a biocrude oil feedstock in the presence of a catalyst; ii) optionally, adjusting feed addition rates of the petroleum fraction feedstock, the biocrude oil feedstock, or both, to target a particular fuel product profile, riser temperature, or reaction zone temperature; and iii) adjusting catalyst to combined petroleum fraction feedstock and biocrude oil feedstock ratio (catalyst:oil ratio) to target a particular fuel product profile, riser temperature, or reaction zone temperature; wherein the catalyst:oil ratio may be a weight ratio or a volume ratio. In certain embodiments, for example, a method of preparing a fuel may comprise: i) processing a petroleum fraction feedstock with a biocrude oil feedstock in the presence of a catalyst; ii) adjusting feed addition rates of the petroleum fraction feedstock, the biocrude oil feedstock, or both, to target a particular fuel product profile, riser temperature, or reaction zone temperature; and iii) adjusting catalyst to combined petroleum fraction feedstock and biocrude oil feedstock ratio (catalyst:oil ratio) to target a particular fuel product profile, riser temperature, or reaction zone temperature; wherein the catalyst:oil ratio may be a weight ratio or a volume ratio. For example, the method may include increasing or decreasing the vol. % or vol. % of the biocrude oil to favor a particular fuel product profile, such as favoring an increased yield of gasoline, diesel fuel, liquefied petroleum gas, heating oil, jet fuel, or light cycle oil, such as gasoline, light cycle oil, or gasoline and light cycle oil. In certain embodiments, for example, the method may include increasing or decreasing the catalyst:oil ratio to favor a particular fuel product profile, such as favoring an increased yield of gasoline, diesel fuel, liquefied petroleum gas, heating oil, jet fuel, or light cycle oil, such as gasoline, light cycle oil, or gasoline and light cycle oil. In certain embodiments, for example, the method of preparing a fuel product having at least 70 vol. % of gasoline and light cycle oil may comprise the following steps: i) processing a petroleum fraction feedstock with a biocrude oil feedstock in the presence of a catalyst; and ii) optionally, adjusting feed addition rates of the petroleum fraction feedstock, the biocrude oil feedstock, or both, to target a particular fuel product profile, riser temperature, or reaction zone temperature; or iii) optionally, adjusting catalyst to combined petroleum fraction feedstock and biocrude oil feedstock ratio (catalyst:oil ratio) to target a particular fuel product profile, riser temperature, or reaction zone temperature; wherein the catalyst:oil ratio may be a weight ratio or a volume ratio. In certain embodiments, for example, the fuel prepared may be a gasoline, a diesel fuel, a liquefied petroleum gas, a heating oil, a jet fuel, an light cycle oil, a transportation fuel, or a power fuel.

According to one embodiment, advantages may be achieved by utilizing a low molecular weight BCO in the BCO/VGO mixture. In one embodiment, PC-BCO may be derived by collecting liquid from the primary condenser of a rapid thermal processing process. In one embodiment, the SC-BCO may be derived by collecting liquid from the secondary condenser of a RTP process. In one embodiment, the BCO utilized in the BCO/VGO mixture is BCO collected from both the primary and secondary condensers of the rapid thermal processing process.

According to certain embodiments, the use of an BCO/VGO mixture in the co-processing process allows co-processing to be readily achieved in existing refinery infrastructure. According to one embodiment, feeding an BCO/VGO mixture into a refinery system via an already existent feed means, for example, a mixing zone, a nozzle, a velocity steam line, or a slurry line. In one embodiment, an BCO/VGO mixture may be introduced into the lift steam line at proximate the bottom of the FCC reactor riser, for example below the mid-point of the riser. In an alternative embodiment, the an BCO/VGO mixture may be introduced into the velocity steam line that could be located either upstream or downstream of the hydrocarbon injection point. According to a further embodiment, an BCO/VGO mixture may be introduced through an atomizing nozzle that may be inserted into the one or multiple steam lines or may be introduced into the recycle lift vapor line or lines. According to a further embodiment, an BCO/VGO mixture may be introduced through an unused slurry line. According to a an alternative embodiment, an BCO/VGO mixture may be introduced through a retrofitted nozzle.

Certain embodiments may provide, for example, producing a plurality of quantities of fuel products derived from co-processing a quantity of reactants in a conversion unit, said quantity of reactants comprising a quanitity of a petroleum fraction with a quantity of a biocrude oil. In certain embodiments, for example, the plurality of quanitites of fuel products may have a total conversion rate defined as the ratio of (a) the sum totals weight of a plurality of quantities of fuel products; divided by (b) the sum total weight of the quantity of reactants.

In certain embodiments, for example, the quantity of the biocrude oil co-processed at an observed total conversion rate may increase one or more of the plurality of quantities of fuel products produced, relative to the one or more of the plurality of quantities of fuel products produced by the quantity of the petroleum fraction at the same total conversion rate in the absence of the quantity of the biocrude oil. In certain further embodiments, for example, the quantity may be a weight. In certain embodiments, the quantity may be a volume. In certain embodiments, for example, the biocrude oil utilization with respect to one of the plurality of quantities of fuel products may positive, said biocrude oil utilization defined as [(a)−(b)]/(c), wherein (a) is the volume units of the one of the plurality of quantities of fuel products derived in the presence of the quantity biocrude oil at a given total conversion rate; (b) is the volume units of the one of the plurality of quantities of fuel products derived in the absence of the biocrude oil but at the same total conversion rate; and (c) is the volume units of the quantity of the biocrude oil. In certain embodiments, for example, the biocrude oil utilization with respect to one of the plurality of quantities of fuel products may negative.

In certain embodiments, for example, the plurality of quantities of fuel products may comprise a quantity of a liquefied natural gas fraction (inclusive, for example, of total 3-carbon and 4-carbon compounds), a quantity of a motor gas fuel (inclusive, for example, of compounds having 5 or more carbon atoms up to a boiling point of 430° F.), a quantity of a light cycle oil (inclusive, for example, of compounds having a boiling point in the range of 430-650° F.), and a quantity of a distillate oil (inclusive, for example, of compounds having a boiling point greater than 650° F.).

In certain embodiments, for example, the biocrude oil utilization with respect to the quantity of the liquefied natural gas fraction may be positive, for example in the range of 1 to 50%, for example in the rate of 5 to 45%, 5 to 40%, 5 to 35%, 5 to 30%, 5 to 25%, 5 to 20%, 10 to 50%, 10 to 40%, 10 to 30%, 10 to 20%, 20 to 50%, 20 to 40%, 20 to 30%, 30 to 50%, or in the range of 40 to 50%. In certain embodiments, for example, the biocrude oil utilization with respect to the quantity of the liquefied natural gas fraction may be negative, for example in the range of −1 to −50%, for example in the rate of −5 to −45%, −5 to −40%, −5 to −35%, −5 to −30%, −5 to −25%, −5 to −20%, −10 to −50%, −10 to −40%, −10 to −30%, −10 to −20%, −20 to −50%, −20 to −40%, −20 to −30%, −30 to −50%, or in the range of −40 to −50%.

In certain embodiments, for example, the biocrude oil utilization with respect to the quantity of the motor gas fuel may be positive, for example in the range of 1 to 50%, for example in the rate of 5 to 45%, 5 to 40%, 5 to 35%, 5 to 30%, 5 to 25%, 5 to 20%, 10 to 50%, 10 to 40%, 10 to 30%, 10 to 20%, 20 to 50%, 20 to 40%, 20 to 30%, 30 to 50%, or in the range of 40 to 50%. In certain embodiments, for example, the biocrude oil utilization with respect to the quantity of the motor gas fuel may be negative, for example in the range of −1 to −50%, for example in the rate of −5 to −45%, −5 to −40%, −5 to −35%, −5 to −30%, −5 to −25%, −5 to −20%, −10 to −50%, −10 to −40%, −10 to −30%, −10 to −20%, −20 to −50%, −20 to −40%, −20 to −30%, −30 to −50%, or in the range of −40 to −50%.

In certain embodiments, for example, the biocrude oil utilization with respect to the quantity of the light cycle oil may be positive, for example in the range of 1 to 50%, for example in the rate of 5 to 45%, 5 to 40%, 5 to 35%, 5 to 30%, 5 to 25%, 5 to 20%, 10 to 50%, 10 to 40%, 10 to 30%, 10 to 20%, 20 to 50%, 20 to 40%, 20 to 30%, 30 to 50%, or in the range of 40 to 50%. In certain embodiments, for example, the biocrude oil utilization with respect to the quantity of the light cycle oil may be negative, for example in the range of −1 to −50%, for example in the rate of −5 to −45%, −5 to −40%, −5 to −35%, −5 to −30%, −5 to −25%, −5 to −20%, −10 to −50%, −10 to −40%, −10 to −30%, −10 to −20%, −20 to −50%, −20 to −40%, −20 to −30%, −30 to −50%, or in the range of −40 to −50%.

In certain embodiments, for example, the biocrude oil utilization with respect to the quantity of the diesel oil may be positive, for example in the range of 1% to 50%, for example in the rate of 5% to 45%, 5% to 40%, 5% to 35%, 5% to 30%, 5% to 25%, 5% to 20%, 10% to 50%, 10% to 40%, 10% to 30%, 10% to 20%, 20% to 50%, 20% to 40%, 20% to 30%, 30% to 50%, or in the range of 40% to 50%. In certain embodiments, for example, the biocrude oil utilization with respect to the quantity of the diesel oil may be negative, for example in the range of −1 to −50%, for example in the rate of −5% to −45%, −5% to −40%, −5% to −35%, −5% to −30%, −5% to −25%, −5% to −20%, −10% to −50%, −10% to −40%, −10% to −30%, −10% to −20%, −20% to −50%, −20% to −40%, −20% to −30%, −30% to −50%, or in the range of −40% to −50%.

In certain embodiments, for example, co-processing 98 wt. % vacuum gas oil and 2 wt % biocrude oil in a fluidized catalytic cracker to form a plurality of fuel products comprising a liquefied natural gas fraction, a motor gas fraction, a light cycle oil, and a diesel oil may result in liquefied natural gas biocrude oil utilization in the range of −15% to −25%, a motor gas fuel biocrude oil utilization in the range of 20% to 30%, a light cycle oil biocrude oil utilization in the range of 1% to 10%, and a distillate oil biocrude oil utilization rate in the range of 25% to 35%.

In certain embodiments, the reactants may further comprise one or more component additives. In certain embodiments, for example, a biocrude oil utilization with respect to one or more of the plurality of quantities of fuel products may be changed due to the presence of the one or more component additives. In certain embodiments, the presence of 0.05-20 wt % (for example 1-10 wt. %, or 2-5 wt %) of one or more component additives (for example 2 wt. % ethanol), relative to the quantity of the biocrude oil and the quantity of the one or more component additives (not inclusive of the quantity of the petroleum fraction), may result in an increase in the biocrude oil utilization relative to the quantity of motor gas oil and the quantity of light cycle oil, and may result in decrease in the biocrude oil utilization relative to the quantity of the liquefied natural gas fraction and the quantity of the distillate oil. In certain embodiments for example, 2-5 wt. % of the one or more component additives may increase the motor gas biocrude oil utilization by 15 to 25 percentage points (for example from 25% to 40%), increase the light cycle oil biocrude oil utilization by 15 to 25 percentage point (for example from 1% to 16%) reduce the liquefied natural gas fraction biocrude oil utilization by 10 to 20 percentage points (for example from −20% to −40%), and reduce the distillate oil biocrude oil utilization by 10 to 20 percentage point (for example from 30% to 20%).

EXAMPLES

Example 1

A series of vacuum gas oil (VGO)/biocrude oil (BCO) co-processing experiments were performed in a fluid catalytic cracking pilot plant (modeled in-line with the teachings presented in Bollas, et al., "Modeling Small-Diameter FCC Riser Reactors and Hydrodynamic and Kinetic Approach", *Ind. Eng. Chem. Res.* 41: 5410-19 (2002)).

In each of the experiments in the series, 98 vol. % VGO was co-processed with 2 vol. % BCO. The biocrude oil (BCO) utilized in the Examples below was produced from rapid thermal processing of a wood residue feedstock in a commercial fast pyrolysis process, according to any one of U.S. Pat. Nos. 7,905,990, 5,961,786, and 5,792,340, each of which is herein incorporated by reference in their entirety) and the BCO was spiked with either 0, 2, or 5 vol. % ethanol (due to the presence of ethanol in the BCO, the vol. % VGO and BCO varied slightly in each experiment—see Table 32). The results are presented in Table 32 below.

TABLE 32

| VGO/BCO (with Varied Ethanol Amounts) Co-Processed in FCC Reactor | | | | | |
|---|---|---|---|---|---|
| | Product Mix (in gallons per 100 gallons of Feed Stock) | Normalized Product Mix (based on Conversion, wt. %) | Calculated Product Mix (per 100 Gallons of VGO) | Calculated Product Mix (per 100 Gallons of BCO) | Percent of Product Mix Attributable to BCO |
| COMPARATIVE EXPERIMENT A: BCO Spiked With 0 vol. % Ethanol | | | | | |
| VGO in Feed, vol. % | | | | 98.5% | |
| BCO in Feed, vol. % | | | | 1.5% | |
| Conversion, wt. % | | | | 73.3% | |
| Total C3 and C4 | 23.8 | 24.46 | 24.1 | −0.3 | −19.9% |
| Mogas (C5 up to 430° F.) | 60.8 | 61.37 | 60.45 | 0.37 | 24.8% |
| light cycle oil (430-650° F.) | 19.59 | 19.85 | 19.56 | 0.03 | 1.8% |
| Distillate Oil (>650° F.) | 7.01 | 6.68 | 6.59 | 0.42 | 28.5% |

Percent of Total Product Mix Attributable to BCO Based on Total Vol. % of BCO in Feedstock    35.2%

TABLE 32-continued

VGO/BCO (with Varied Ethanol Amounts) Co-Processed in FCC Reactor

| | Product Mix (in gallons per 100 gallons of Feed Stock) | Normalized Product Mix (based on Conversion, wt. %) | Calculated Product Mix (per 100 Gallons of VGO) | Calculated Product Mix (per 100 Gallons of BCO) | Percent of Product Mix Attributable to BCO |
|---|---|---|---|---|---|
| EXPERIMENT 1: BCO Spiked With 2 vol. % Ethanol | | | | | |
| VGO in Feed, vol. % | | | 98.5% | | |
| BCO in Feed, vol. % | | | 1.5% | | |
| Conversion, wt. % | | | 73.8% | | |
| Total C3 and C4 | 23.93 | 24.83 | 24.46 | −0.52 | −34.9% |
| Mogas (C5 up to 430° F.) | 61.38 | 61.68 | 60.76 | 0.62 | 41.7% |
| light cycle oil (430-650° F.) | 19.55 | 19.54 | 19.25 | 0.30 | 20.2% |
| Distillate Oil (>650° F.) | 6.56 | 6.46 | 6.36 | 0.20 | 13.4% |
| Percent of Total Product Mix Attributable to BCO Based on Total Vol. % of BCO in Feedstock | | | | | 40.4% |
| EXPERIMENT 2: BCO Spiked With 5 vol. % Ethanol | | | | | |
| VGO in Feed, vol. % | | | 98.5% | | |
| BCO in Feed, vol. % | | | 1.5% | | |
| Conversion, wt. % | | | 70.9% | | |
| Total C3 and C4 | 22.32 | 23.14 | 22.79 | −0.47 | −30.9% |
| Mogas (C5 to 430° F.) | 59.64 | 59.89 | 58.98 | 0.66 | 43.8% |
| light cycle oil (430-650° F.) | 20.99 | 21.01 | 20.69 | 0.3 | 20% |
| Distillate Oil (>650° F.) | 7.89 | 7.76 | 7.65 | 0.25 | 16.3% |
| Percent of Total Product Mix Attributable to BCO Based on Total Vol. % of BCO in Feedstock | | | | | 49.3% |

Table Notes:
A) The Conversion weight % is an interpolated value derived from several experimental runs.
B) The calculated results are based on the Normalized Product Mix
C) Percentage of Product Mix Attributable to BCO is calculated based the Product Mix value divided by vol % of BCO.

In the description above, for purposes of explanation only, specific embodiments have been presented and/or exemplified. It should be understood that variations of various aspects of an embodiment may be combined with other stated components, embodiments, ranges, types, etc. For example, there are embodiments that discuss the processing of an biocrude oil and it should be understood that any and all of the types of biocrude oils discussed and/or presented herein may be substituted and/or combined into such embodiments even though an embodiment may not be specifically presented with the particular type of biocrude oil in the description.

While numerous embodiments of the present invention have been shown and described herein, it will be obvious to those skilled in the art that such embodiments are provided by way of example only. It is intended that the following claims or future claims that may be added and/or amended in this or future containing applications, in this or other countries and territories, define the scope of the invention and that methods and structures and products and uses within the scope of these claims and their equivalents be covered thereby.

What is claimed is:

1. A method for preparing liquid fuel products, comprising: co-processing a plurality of reactants in a catalytic cracker, said plurality of reactants comprising:
    i) 93-99.95 vol. % of a petroleum fraction; and
    ii) 0.05-7 vol. % of a biocrude oil derived from a cellulosic biomass, said biocrude oil having one or more alcohol additives in the range of 0.1-20 wt. % relative to the total weight of the biocrude oil and alcohol additive.

2. The method of claim 1, wherein the biocrude additionally comprises a vegetable oil additive.

3. The method of claim 2, wherein the vegetable oil comprises 2-20 wt. % of the biocrude oil.

4. The method of claim 1, wherein the one or more alcohol additives comprises predominately ethanol.

5. The method of claim 1, wherein at least 75 vol. % of the alcohol additive comprises one or more primary and/or secondary alcohol with a molecular weight of less than 100 g/mole.

6. The method of claim 1, wherein the alcohol additive has a viscosity of less than 2 cP at a temperature of 27° C.

7. The method of claim 1, wherein the alcohol additive comprises at least 2 vol. % ethanol, relative to the weight of the biocrude oil.

8. The method of claim 1, wherein:
    i) the petroleum fraction comprises a vacuum gas oil;
    ii) the plurality of reactants comprise 0.05-2 vol. % of the biocrude oil;
    iii) the biocrude oil is the product of a mechanical and thermal conversion of a cellulosic biomass comprising grinding and non-catalytic rapid thermal processing; and
    iv) the alcohol additive is at least 2 vol. % ethanol, relative to the weight of the biocrude oil.

9. The method of claim 1, wherein each 100 gallons of the plurality of reactants produces at least 70 gallons of the liquid fuel products, said liquid fuel products comprising:
    i) a motor gas having a boiling point up to 430° F.;
    ii) a light cycle oil having a boiling point up in the range of 430-650° F.; and
    iii) a distillate oil having a boiling point greater than 650° F.

10. The method of claim 9, wherein each 100 gallons of the plurality of reactants produces:
    i) at least 40 gallons of the motor gas; and
    ii) at least 20 gallons of the light cycle oil.

11. The method of claim 1, further comprising adding a portion of the one or more alcohol additives to the biocrude oil, followed several days later by addition of at least a further portion of the one or more alcohol additives to the biocrude oil prior to co-processing.

12. The method of claim 1, wherein at least a portion of the one or more alcohol additives is added to the biocrude oil within 1 day of being formed.

13. The method of claim 1, wherein the biocrude oil is co-processed within 2 weeks following addition of at least a portion of the one or more alcohol additives.

14. The method of claim 1, wherein the biocrude oil is a liquid product of non-catalytic rapid thermal processing.

15. The method of claim 14, wherein at least a portion of the one or more alcohol additives is added to a condensing chamber during the rapid thermal processing.

16. The method of claim 14, wherein at least a portion of the one or more alcohol additives is added to a fast pyrolysis upflow reactor during the rapid thermal processing.

17. The method of claim 14, wherein the non-catalytic rapid thermal processing comprises: contacting the biocrude oil product with a chelating agent.

18. The method of claim 14, wherein the non-catalytic rapid thermal processing comprises: pre-treating the cellulosic biomass with a water wash.

19. A method for preparing a fuel, comprising: co-processing a plurality of reactants in a catalytic cracker, said plurality of reactants comprising:
  i) 93-99.95 vol. % of a petroleum fraction; and
  ii) 0.05-7 vol. % of a biocrude oil product of a mechanical and thermal conversion of a cellulosic biomass comprising grinding and non-catalytic rapid thermal processing, said biocrude oil product having:
    a) a non-phenolic alcohol content of at least 7 vol. %; and
    b) a viscosity reducing component of at least 2 vol. % comprising one or more sub-components having a molecular weight of less than 100 g/mole.

20. The method of claim 19, wherein the cellulosic biomass has a holocellulose content of at least 65 vol. % and a lignin content of no more than 30 vol. %.

21. A method for generating at least one Cellulosic-Renewable Identification Number, comprising: co-processing a plurality of reactants in at least one approved fuel pathway comprising fluidized catalytic cracking under the Renewable Fuel Standard program, said plurality of reactants comprising:
  i) 93-99.95 vol. % of a petroleum fraction; and
  ii) 0.05-7 vol. % of a biocrude oil derived from a liquid product of rapid thermal processing of a cellulosic biomass, said biocrude oil having an alcohol additive in the range of 0.1-20 wt. % relative to the total weight of the biocrude oil and alcohol additive.

22. The method of claim 21, wherein the at least one Cellulosic-Renewable Identification Number attaches to a gasoline or diesel fuel.

23. The method of claim 21, wherein the at least one Cellulosic-Renewable Identification Number is derived at least in part from the quantity of alcohol additive.

* * * * *